(12) United States Patent
Cote et al.

(10) Patent No.: US 9,420,198 B2
(45) Date of Patent: Aug. 16, 2016

(54) OPERATING A DEVICE TO CAPTURE HIGH DYNAMIC RANGE IMAGES

(71) Applicant: Apple Inc., Cupertino, CA (US)

(72) Inventors: Guy Cote, San Jose, CA (US); Garrett M. Johnson, San Francisco, CA (US); James Edmund Orr, IV, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/537,746

(22) Filed: Nov. 10, 2014

(65) Prior Publication Data

US 2015/0062382 A1 Mar. 5, 2015

Related U.S. Application Data

(63) Continuation of application No. 12/876,100, filed on Sep. 3, 2010, now Pat. No. 8,885,978.

(60) Provisional application No. 61/361,516, filed on Jul. 5, 2010, provisional application No. 61/361,525, filed on Jul. 6, 2010, provisional application No. 61/378,933, filed on Aug. 31, 2010.

(51) Int. Cl.
*G06K 9/00* (2006.01)
*H04N 5/235* (2006.01)
(Continued)

(52) U.S. Cl.
CPC ............ *H04N 5/2355* (2013.01); *G06T 5/50* (2013.01); *G06T 7/0026* (2013.01); *H04N 5/2351* (2013.01); *H04N 5/2352* (2013.01); *H04N 5/23258* (2013.01); *G06T 2207/10144* (2013.01); *G06T 2207/10152* (2013.01); *G06T 2207/20016* (2013.01); *G06T 2207/20021* (2013.01); *G06T 2207/20208* (2013.01)

(58) Field of Classification Search
None
See application file for complete search history.

(56) References Cited

U.S. PATENT DOCUMENTS 3,620,747 A 11/1971 Marchant et al.
3,647,463 A 3/1972 Taber et al.
(Continued)

FOREIGN PATENT DOCUMENTS

JP H09-107499 4/1997
JP H10262182 9/1998
(Continued)

OTHER PUBLICATIONS

"Multi-exposure Imaging on Mobile Devices", Gelfand et al., Oct. 25-29, 2010, pp. 823-826.
(Continued)

*Primary Examiner* — Hadi Akhavannik
(74) *Attorney, Agent, or Firm* — Robert C. Kowert; Meyertons, Hood, Kivlin, Kowert & Goetzel, P.C.

(57) ABSTRACT

Some embodiments provide a method of operating a device to capture an image of a high dynamic range (HDR) scene. Upon the device entering an HDR mode, the method captures and stores multiple images at a first image exposure level. Upon receiving a command to capture the HDR scene, the method captures a first image at a second image exposure level. The method selects a second image from the captured plurality of images. The method composites the first and second images to produce a composite image that captures the HDR scene. In some embodiments, the method captures multiple images at multiple different exposure levels.

20 Claims, 20 Drawing Sheets

(51) Int. Cl.
*G06T 5/50* (2006.01)
*G06T 7/00* (2006.01)
*H04N 5/232* (2006.01)

(56) References Cited

U.S. PATENT DOCUMENTS

| | | | |
|---|---|---|---|
| 3,663,228 | A | 5/1972 | Wyckoff |
| 3,888,676 | A | 6/1975 | Evans |
| 4,647,975 | A | 3/1987 | Alston et al. |
| 4,777,122 | A | 10/1988 | Beltramini |
| 5,144,442 | A | 9/1992 | Ginosar et al. |
| 5,162,914 | A | 11/1992 | Takahashi et al. |
| 5,323,204 | A | 6/1994 | Wheeler et al. |
| 5,325,449 | A | 6/1994 | Burt et al. |
| 5,627,905 | A | 5/1997 | Sebok et al. |
| 5,828,793 | A | 10/1998 | Mann |
| 6,104,441 | A | 8/2000 | Wee et al. |
| 6,266,103 | B1 | 7/2001 | Barton et al. |
| 6,459,822 | B1 | 10/2002 | Hathaway et al. |
| 6,535,650 | B1 | 3/2003 | Poulo et al. |
| 6,549,643 | B1 | 4/2003 | Toklu et al. |
| 6,900,840 | B1 | 5/2005 | Schinner et al. |
| 7,023,913 | B1 | 4/2006 | Monroe |
| 7,280,753 | B2 | 10/2007 | Oya et al. |
| 7,612,804 | B1 | 11/2009 | Marcu et al. |
| 7,912,337 | B2 | 3/2011 | Souchard |
| 7,962,034 | B2 | 6/2011 | Wernersson |
| 8,228,400 | B2 | 7/2012 | Liu et al. |
| 8,699,821 | B2 | 4/2014 | Orr, IV et al. |
| 8,760,537 | B2 | 6/2014 | Johnson et al. |
| 8,885,978 | B2 | 11/2014 | Cote et al. |
| 2001/0010555 | A1 | 8/2001 | Driscoll, Jr. |
| 2003/0090593 | A1 | 5/2003 | Xiong |
| 2003/0095189 | A1 | 5/2003 | Liu et al. |
| 2003/0098919 | A1 | 5/2003 | Liu et al. |
| 2004/0085340 | A1 | 5/2004 | Dimitrova et al. |
| 2004/0114799 | A1 | 6/2004 | Xu |
| 2004/0239775 | A1 | 12/2004 | Washisu |
| 2005/0041883 | A1 | 2/2005 | Maurer et al. |
| 2006/0140510 | A1 | 6/2006 | Wallace et al. |
| 2006/0177150 | A1 | 8/2006 | Uyttendaele et al. |
| 2006/0262363 | A1 | 11/2006 | Henley |
| 2007/0024742 | A1 | 2/2007 | Raskar et al. |
| 2008/0075385 | A1* | 3/2008 | David ............... G06K 9/40 382/275 |
| 2008/0094486 | A1 | 4/2008 | Fuh et al. |
| 2008/0240607 | A1 | 10/2008 | Sun et al. |
| 2008/0309810 | A1 | 12/2008 | Smith et al. |
| 2008/0316354 | A1 | 12/2008 | Nilehn et al. |
| 2009/0021595 | A1* | 1/2009 | Zandifar ............ G01N 21/8851 348/222.1 |
| 2009/0033755 | A1 | 2/2009 | Friedhoff et al. |
| 2009/0102945 | A1 | 4/2009 | Chen |
| 2009/0202176 | A1 | 8/2009 | Hwang et al. |
| 2009/0274387 | A1 | 11/2009 | Jin |
| 2010/0157078 | A1 | 6/2010 | Atanassov et al. |
| 2011/0116767 | A1 | 5/2011 | Souchard |
| 2011/0311202 | A1 | 12/2011 | Souchard |
| 2012/0002899 | A1 | 1/2012 | Orr, IV et al. |

FOREIGN PATENT DOCUMENTS

| | | |
|---|---|---|
| JP | 2000228747 | 8/2000 |
| JP | 2008-181196 | 8/2008 |
| WO | 2010123923 | 10/2010 |
| WO | 2012006251 | 1/2012 |
| WO | 2012006252 | 1/2012 |
| WO | 2012006253 | 1/2012 |

OTHER PUBLICATIONS

"High Dynamic Range Imaging on Mobile Devices", Bilcu et al., Sep. 2008, pp. 1312-1315.
"Noise-Optimal Capture for High Dynamic Range Photography", Hasinoff et al., 2010, pp. 553-560.
"High Dynamic Range Video", Kang et al., Jul. 2003, pp. 319-325.
"Recovering High Dynamic Range Radiance Maps from Photographs", Debevec, Paul E., et al., 1997, pp. 369-378.
"Stabilizing Image Sequences Taken by the Camcorder Mounted on a Moving Vehicle", Liang, Yu-Ming, et al., Oct. 2003, pp. 90-95.
"Fast, Robust Image Registration for Compositing High Dynamic Range Photographs from Handheld Exposures", Ward, Greg., 2003, pp. 17-30.
Adams, Andrew, et al., "Viewfinder Alignment," Computer Graphics Forum, Apr. 1, 2008, pp. 597-606, vol. 27, No. 2.
Akyuz, Ahmet Oguz, et al., "Noise Reduction in High Dynamic Range Imaging," Journal of Visual Communication and Image Representation, Sep. 5, 2007, pp. 366-376, vol. 18, No. 5.
Asari, K. Vijayan, et al., "Nonlinear Enhancement of Extremely High Contrast Images for Visibility Improvement," Computer Vision, Graphics and Image Processing Lecture Notes in Computer Science, Jan. 1, 2007, pp. 240-251.
Bilcu, Radu Ciprian, et al., "High Dynamic Range Imaging on Mobile Devices," The 15th IEEE International Conference on Electronics, Circuits and Systems, Aug. 31, 2008, pp. 1312-1315.
Bovik, Al, "The Essential Guide to Image Processing," Jan. 1, 2009, pp. 61-63, 158-161.
German, Lukas, "High Dynamic Range Images from Multiple Exposures," Diploma Thesis, Jan. 26, 2006, pp. 1-52.
Granados, Miguel, et al., "Optimal HDR Reconstruction with Linear Digital Cameras," Proceedings of the IEEE Conference on Computer Vision and Pattern Recognition, Jun. 13-18, 2010, pp. 215-222.
Jacobs, Katrien, et al., "Automatic High-Dynamic Range Image Generation for Dynamic Scenes," IEEE Computer Graphics and Applications, Mar. 1, 2008, pp. 84-93, vol. 27, No. 2.
Kao, Wen-Chung, et al., "Integrating Image Fusion and Motion Stabilization for Capturing Still Images in High Dynamic Range Scenes," IEEE Tenth International Symposium on Consumer Electronics, Jun. 28, 2006, pp. 1-6.
Kuang, Jiangtao, et al., "Evaluating HDR Rendering Algorithms," ACM Transactions on Applied Perception, Jul. 1, 2007, pp. 1-30, vol. 4, No. 2, ACM.
Mann, Steve, "Compositing Multiple Pictures of the Same Scene," Proceedings of the 46th Annual Imaging Science & Technology Conference, May 9-14, 1993, pp. 1-4.
Mann, Steve, "Lightspace," Dec. 1992, pp. 1-7.
Mann, S., et al., "On Being 'Undigital' with Digital Cameras: Extending Dynamic Range by Combining Differently Exposed Pictures," Imaging Science and Technologies 481 Annual Conference Proceedings, May 1, 1995, pp. h 442-h 448.
Mertens, Tom, et al., "Exposure Fusion," 15"Pacific Conference on Computer Graphics and Applications, Oct. 29, 2007, pp. 382-390.
Mitsunaga, Tomoo, et al., "Radiometric Self Calibration," Proceedings of the IEEE Computer Society Conference on Computer Vision and Pattern Recognition, Jun. 23-25, 1999, pp. 374-380.
Petschnigg, Georg, et al., "Digital Photography with Flash and No-Flash Image Pairs," Proceedings of the ACM SIGGRAPH, Aug. 8, 2004, pp. 664-672.
Stockham, Jr., T.G., "Image Processing in the Context of a Visual Model," Proceedings of the Institute of Electrical and Electronics Engineers, Jul. 1972, pp. 828-842.
Unaldi, Numan, et al., "Nonlinear technique for the enhancement of extremely high contrast color images," Proceedings of the Society of Photographic Instrumentation Engineers, Month Unknown, 2008, 1pp. 1-11.
Wyckoff, C. W., et al., "A Study to Determine the Optimum Design of a Photographic Film for the Lunar Surface Hand-Held Camera," Jun. 2, 1965, pp. iii, v, vii, 17, and 115.
Wyckoff, Charles W., "An Experimental Extended Exposure Response Film", Mar. 1961, pp. 1-16, No. B-321.
Howard, Jack, "The Pentax K-7: The era of in-camera High Dynamic Range Imaging has arrived", May 20, 2009, pp. 1-2.

* cited by examiner

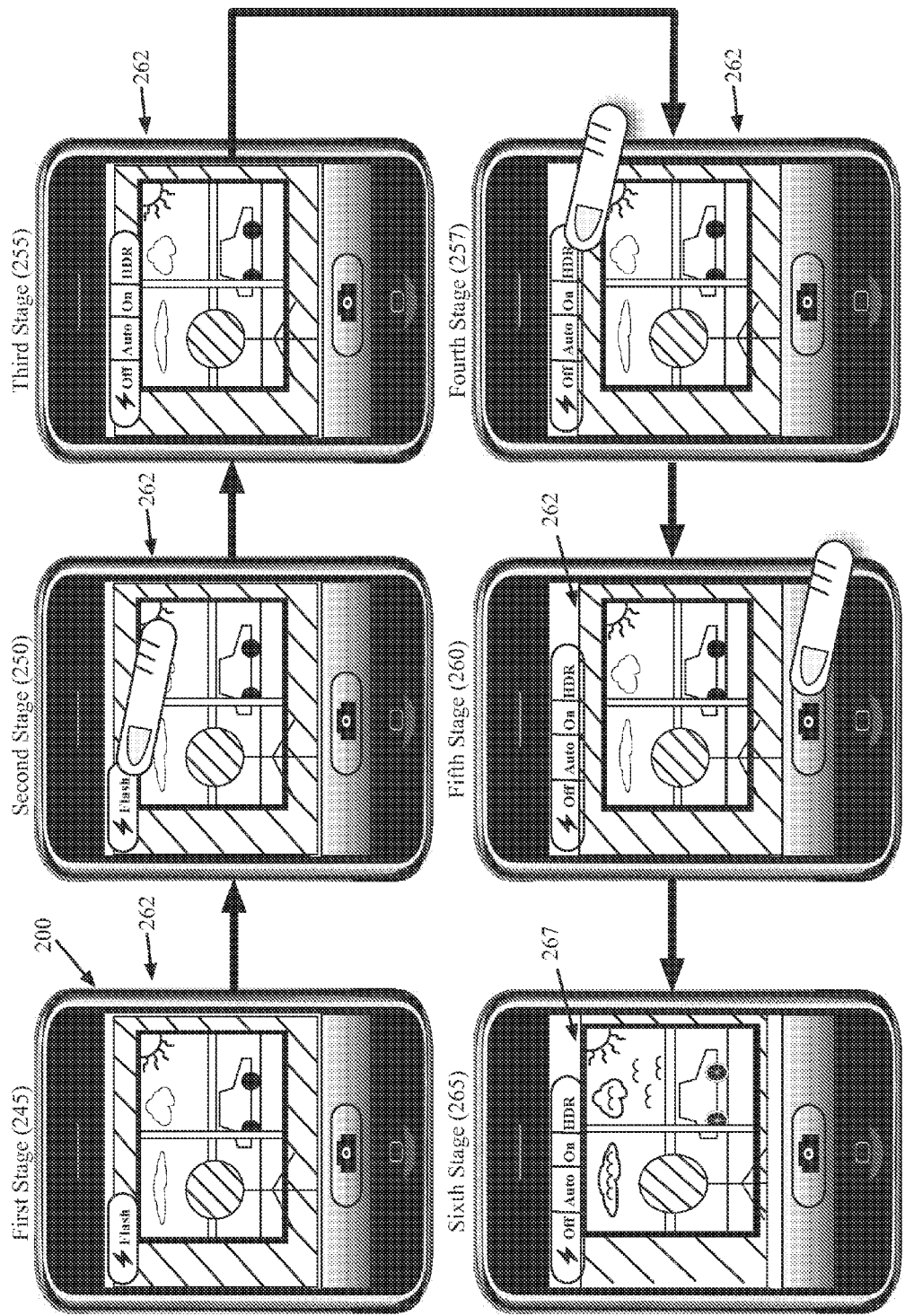

OPERATING A DEVICE TO CAPTURE HIGH DYNAMIC RANGE IMAGES

CLAIM OF BENEFIT TO PRIOR APPLICATIONS

This application is a continuation of U.S. patent application Ser. No. 12/876,100, filed Sep. 3, 2010, now U.S. Pat. No. 8,885,978, which claims benefit to U.S. Provisional Patent Application No. 61/361,516, filed Jul. 5, 2010, U.S. Provisional Patent Application No. 61/361,525, filed Jul. 6, 2010, and U.S. Provisional Patent Application No. 61/378,933, filed Aug. 31, 2010, all of which are incorporated herein by reference in their entirety.

BACKGROUND

In recent years, there has been a proliferation of digital cameras, as standalone devices and as parts of more complex devices, such as cellular phones, smart phones, other mobile computing devices, etc. With this proliferation, manufacturers have rapidly increased the technical features of the digital cameras on these devices. For instance, many mobile devices today typically include five megapixel cameras, which are often needed to produce high quality Images.

Unfortunately, even though the technical specifications of such cameras have improved, these cameras often cannot capture and produce high quality images because the image processing capabilities of these cameras have not matched their improving hardware capabilities. For instance, many cameras today still do a poor job of capturing and producing images with high dynamic range (HDR).

A classic example of an HDR scene is a person standing indoors in front of a window during daytime. Many cameras capturing such a scene produce an image that has a bright background with a dark foreground that does not show all the features of the person. The problem of capturing such an HDR scene by a mobile device's camera (e.g., by a phone's camera) is exacerbated by the small image sensors employed by such a camera.

BRIEF SUMMARY

Some embodiments of the invention provide a mobile device that captures and produces images with high dynamic ranges. To capture and produce a high dynamic range image, the mobile device of some embodiments includes novel image capture and processing modules. In some embodiments, the mobile device produces a high dynamic range (HDR) image by (1) having its image capture module rapidly capture a succession of images at different image exposure durations, and (2) having its image processing module composite these images to produce the HDR image.

To rapidly capture a succession of images, the image capture module of some embodiments takes two actions. First, after the mobile device enters its HDR mode or after it enters an image-capture mode (also referred to, below, as a camera mode), it starts capturing images at a particular frame rate. In some embodiments, the frame rate is about 15 frames per second (fps). In other embodiments, the initial frame rate is different under different lighting conditions (e.g., 15 fps for normal lighting conditions, 10 fps for darker conditions, etc.). This frame rate allows the camera to capture images at the normal exposure setting for the current lighting condition (i.e., allows the camera to capture each image with an exposure duration that the image capture module computes as the normal exposure duration for the current lighting condition). The image capture module stores each image that it captures at the particular frame rate in a frame buffer of the device. In some embodiments, the capture module writes to this frame buffer in a circular manner that allows the module to delete earlier stored frames before later stored frames when the buffer reaches its maximum storage capacity.

Second, when the mobile device enters a high dynamic range (HDR) mode, the image capture module computes the exposure durations for capturing an underexposed image and an overexposed image for the lighting condition under which the camera is capturing the images (referred to, below, as the current lighting condition). Different embodiments of the invention employ different techniques for computing the durations of the overexposed and underexposed images. For instance, some embodiments compute the duration of the overexposed and underexposed images based on a histogram of the normally exposed images that the device is capturing at the particular frame rate.

After the device enters its HDR mode, the device can be directed to take an HDR image (e.g., by the user of the device, by a timer on the device, by a remote user or timer, etc.) When the device is directed to take the HDR image, the image capture module of some embodiments then captures two images in quick succession. One image is an overexposed image that it captures based on the overexposed duration that it previously computed for the current lighting condition, while the other image is the underexposed image that it captures based on the underexposed duration that it previously computed for the current lighting condition. In different embodiments, the image capture module captures the overexposed and underexposed images in different orders (e.g., some embodiments capture the overexposed image first, while other embodiments capture the underexposed image first).

In addition to capturing the overexposed and underexposed images, the image capture module also retrieves an image that it captured earlier at the normal exposure duration and stored in its frame buffer. This module provides each of the three images to the image processing module. In some embodiments, the image capture module provides the three images in the color space in which the camera captured the images. For example, the image capture module of some embodiments captures and provides these images in the Y'CbCr (luma, blue-chroma, and red-chroma) color space. Some embodiments reverse gamma correct the camera's Y'CbCr (luma) images to YCbCr (luminance, blue-chroma, red-chroma) images before performing various image editing operations and then gamma correct the resulting YCbCr (luminance) image to a Y'CbCr (luma) image.

The image processing module then performs two operations. The first operation is an alignment of all three images with each other, as the camera might have moved during the time that it captured the three images. Different embodiments perform this alignment differently. For instance, to align two images, some embodiments perform a hierarchical search that tries to identify matching features in the two images. To identify matching features, some embodiments examine only the luma component (e.g., Y'-channel component for a Y'CbCr color space) of the two images. The luma component of an image is sometimes referred to herein as a "luma image" or as an "image". The two luma images are decimated by a certain factor (e.g., two) in each direction several times (e.g., six times) until several pairs of luma images are identified. Each pair of luma images is used for performing the search at a different level in the search hierarchy. At each level, a bitmap is generated for each luma image (e.g., by using the median luma value for that level to generate pixel values to 1 or 0 based on whether they are greater or less than the median value).

At each level, at least one bitmap is divided into several tiles with each tile encompassing several pixels. The tiles are used to identify corresponding matching tiles in the other bitmap, and thereby identify an offset between the two bitmaps. In some embodiments, some of the tiles are discarded when the tiles contain only white pixels, only black pixels, less than a threshold of white pixels, or less than a threshold of black pixels. These tiles are tiles that do not have a sufficient number of features (e.g., edges) that can be used to match up with other tiles. These tiles are discarded in order to speed up the process for comparing the tiles and thereby identifying the offset between the two pairs of bitmaps.

Based on the remaining tiles, the two bitmaps are compared at various different offsets in order to identify the offset that best aligns the two bitmaps at the current resolution level of the hierarchy. If the current resolution level of the hierarchy is not the highest resolution level of the hierarchy, the image processing module of some embodiments then uses the computed offset for the current resolution level of the hierarchy as the starting point for searching in the next level of the hierarchy. In this next level, the module again generates two bitmaps for the two different luma images for that level of the hierarchy, and then searches for an offset starting at the specified starting point for the search.

In the hierarchical comparison of the luma component of two images, the offset that is identified at the highest level of the hierarchy is the offset between the two images. Once the image processing module has determined this offset between one image (e.g., the regularly exposed image) and each of the other images (e.g., the overexposed image and the underexposed image), it uses these offsets to align the three images. For instance, in some embodiments, it uses these two offsets to crop the three images so that they all only include overlapping portions of the same scene. Alternatively, instead of cropping all three images, some embodiments only crop the overexposed and underexposed images and for the portions of these images that get cropped, use the data from the normally exposed image to generate the composite HDR image. Also, instead of cropping the images, other embodiments might use other operations (e.g., they might identify the union of the images) to address non-overlapping regions in the images. Some embodiments do not crop and instead repeat edge pixels. Repeating edge pixels leads to acceptable results since the offset between images is typically small.

Also, chroma is typically in a Y'CbCr 4:2:2 or 4:2:0 format. This means that the sampling of chroma is different than luma. In 4:2:2, chroma is half the horizontal size of luma, while in 4:2:0, chroma is half the horizontal size and half the vertical size of luma. Accordingly, when aligning the images, some embodiments adjust the vector for chroma based on this format.

After aligning the images, the image processing module performs its second operation, which is the compositing of the three aligned images to produce a composite HDR image. In different embodiments, the image processing module uses different techniques to composite the three images. For instance, some embodiments composite the three images by performing different sets of operations for the luma channel of these images than for the chroma channels of these images. Also, in generating the HDR composite image, some embodiments might produce luma and chroma values that exceed a desired range of values. Accordingly, while generating the HDR image, some embodiments concurrently perform scaling operations to ensure that the luma and chroma values of the HDR image are generated within their desired ranges.

One of ordinary skill in the art will realize that the image capture and processing operations can be implemented differently than those described above. For instance, instead of returning only one normally exposed image from the frame buffer, the image capture module of some embodiments returns several normally exposed images to the image processing module. From this group, the image processing module then selects the normally exposed image that is the sharpest and that best matches the captured overexposed and underexposed images. Alternatively, in some embodiments, the image capture module only returns one normally exposed image, but tries to ensure that this returned image is not blurred (i.e., is sharp). In different embodiments, the image capture module tries to ensure that the image is sharp in different ways. For instance, in some embodiments where the device has an accelerometer and/or gyroscope, the image capture module uses data recorded from the accelerometer and/or gyroscope to ascertain the likelihood of the blurriness of the normally exposed images in order to select a normally exposed image that is sharp. Alternatively, in some embodiments, rather than using normally exposed images from the frame buffer, after an HDR command is received, the mobile device takes one or more images at a normal exposure as well as the overexposed and underexposed images. In some such embodiments, the image processing module selects one of the normally exposed images (e.g., the sharpest, the last, etc.) to use for generating a composite HDR image.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF THE DRAWINGS

FIG. 2B illustrates the display of a preview image during the invocation of a high dynamic range (HDR) mode, and the taking of an HDR picture in this mode, in a mobile device of some embodiments.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Figure 1:
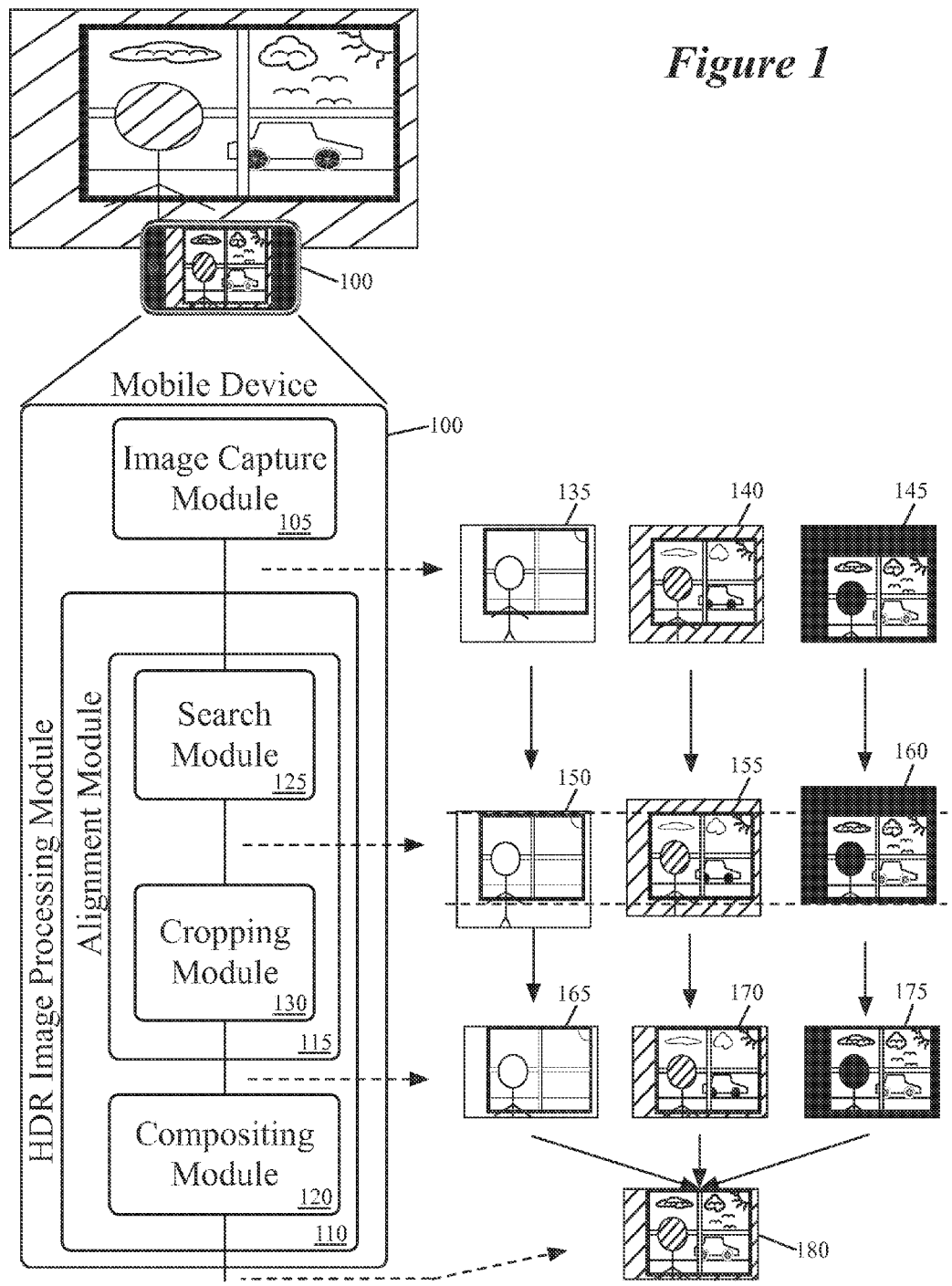
FIG. 1 illustrates a mobile device that captures and produces images with high dynamic ranges.

Some embodiments of the invention provide a mobile device that captures and produces images with high dynamic ranges. FIG. 1 illustrates one such mobile device 100. This mobile device can be a camera, a mobile phone, a smart phone, a personal digital assistant (PDA), a tablet personal computer (such as an iPad®), a laptop, or any other type of mobile computing device. FIG. 1 illustrates the mobile device 100 capturing a digital picture of a scene with a high dynamic range. In this scene, a person is standing in front of a window on a sunny day while a car is driving in the background.

FIG. 1 also illustrates that the mobile device 100 produces a high dynamic range image 180 by capturing, aligning and compositing three images 135, 140, and 145 that are captured at three different exposure settings. As shown in this figure, the mobile device 100 includes an image capture module 105 and an image processing module 110, which perform operations that allow the mobile device to capture and produce a high dynamic range image. In some embodiments, the mobile device produces a high dynamic range (HDR) image by (1) having its image capture module rapidly capture a succession of images at different image exposure durations, and (2) having its image processing module composite these images to produce the HDR image. While the description herein includes three images, one of ordinary skill in the art will realize that some embodiments use more than three images (e.g., some embodiments use five images very overexposed, overexposed, normal, underexposed and very underexposed). Some embodiments use variable numbers of images under various conditions.

To rapidly capture a succession of images, the image capture module of some embodiments takes two actions when the camera enters a high dynamic range (HDR) mode. First, it starts capturing images at a particular frame rate. In some embodiments, the frame rate is about 15 frames per second (fps). In other embodiments, the initial frame rate is different under different lighting conditions (e.g., 15 fps for normal lighting conditions, 10 fps for darker conditions, etc.). This frame rate allows the camera to capture images at the normal exposure setting for the current lighting condition (i.e., allows the camera to capture each image with an exposure duration that the image capture module computes as the normal exposure duration for the current lighting conditions). The image capture module stores each image that it captures at the particular frame rate in a frame buffer (not shown) of the device. In some embodiments, the capture module writes to this frame buffer in a circular manner that allows the module to delete earlier stored frames before later stored frames when the buffer reaches its maximum storage capacity.

Second, for the lighting condition under which the camera is capturing the images (referred to below as the current lighting condition), the image capture module computes the exposure durations for capturing an underexposed image and an overexposed image. For instance, some embodiments compute the duration of the overexposed and underexposed images based on the histogram of the normally exposed images that the device is capturing at the particular frame rate. For example, if the normally exposed image has a large number of saturated pixels, then the duration of the overexposed image is set to a smaller multiple of the normal exposure duration than it would be if the normally exposed image had fewer saturated pixels.

After the device enters its HDR mode, the device can be directed to take an HDR image (e.g., by the user of the device, by a timer on the device, by a remote user or timer, etc.) When the device is directed to take the HDR image, the image capture module of some embodiments then captures two images in quick succession. One image is an overexposed image that it captures based on the overexposed duration that it previously computed for the current lighting condition, while the other image is the underexposed image that it captures based on the underexposed duration that it previously computed for the current lighting condition. In different embodiments, the image capture module captures the overexposed and underexposed images in different orders (e.g., some embodiments capture the overexposed image first, while other embodiments capture the underexposed image first).

In addition to capturing the overexposed and underexposed images, the image capture module also retrieves an image that it captured earlier at the normal exposure duration and stored in its frame buffer (e.g., the most recent image taken before the HDR capture command). The image capture module 105 provides each of the three images to the image processing module 110. FIG. 1 illustrates these three images as an overexposed image 135, a normally exposed image 140, and an underexposed image 145 at the output of the image capture module 105. In some embodiments, the image capture module provides the three images in the color space in which the camera captured the images. For example, the image capture module of some embodiments captures and provides these images in the Y'CbCr color space.

The above description includes taking multiple images at a normal exposure duration before an HDR capture command is received and taking the overexposed and underexposed images after the HDR capture command is received. However, in some embodiments, multiple underexposed images are taken before the HDR capture command is received and the normally exposed and overexposed images are taken after the HDR capture command is received. Additionally, in some embodiments, multiple overexposed images are taken before the HDR capture command is received and the normally exposed and underexposed images are taken after the HDR capture command is received.

As shown in FIG. 1, the image processing module 110 in some embodiments includes (1) an alignment module 115 that aligns the three images that it receives and (2) a compositing module 120 that composites the three images that it receives to produce the HDR image 180. The alignment module aligns all three images with each other, as the camera might have moved during the time that it captured the three images.

As further shown in FIG. 1, the alignment module 115 in some embodiments includes (1) a search module 125 that compares the images to align them and (2) a cropping module 130 that crops one or more of the aligned images to only include the areas that overlap between the images. To align two images, the search module 125 performs a search that tries to identify matching features in the two images. To do this, some embodiments examine only the luma component (e.g., Y'-channel component for a Y'CbCr color space) of the two images.

In some embodiments, the search module 125 performs a hierarchical search that initially decimates two luma images by a certain factor (e.g., two) in each direction several times (e.g., six times) until several pairs of luma images are identified. Each pair of luma images is used for performing the search at a different level in the search hierarchy. At each level, a bitmap is generated for each luma image (e.g., by using the median luma value for that level to generate pixel values to 1 or 0 based on whether they are greater or less than the median value).

At each level, the search module divides at least one bitmap into several tiles with each tile encompassing several pixels. The module uses the tiles to identify corresponding matching tiles in the other bitmap, and thereby identify an offset between the two bitmaps. In some embodiments, the search module discards some of the tiles when the tiles contain only white pixels, only black pixels, less than a threshold of white pixels, or less than a threshold of black pixels. These tiles are tiles that do not have sufficient number of features (e.g., edges) that can be used to match up with other tiles. These tiles are discarded in order to speed up the process for comparing the tiles and thereby identifying the offset between the two pairs of bitmaps.

Based on the remaining tiles, the search module compares the two bitmaps at various different offsets in order to identify the offset that best aligns the two bitmaps at the current resolution level of the hierarchy. If the current resolution level of the hierarchy is not the highest resolution level of the hierarchy, the search module then uses the computed offset for the current resolution level of the hierarchy as the starting point for searching in the next level of the hierarchy. In this next level, the module again generates two bitmaps for the two different luma images for that level of the hierarchy, and then searches for an offset starting at the specified starting point for the search.

In the hierarchical comparison of the luma component of two images, the offset that is identified at the highest level of the hierarchy is the offset between the two images. Once the search module 125 completes its hierarchical searching of the two pairs of images, it identifies two offsets that define the translation of two of the images so that all three images are aligned. In the example illustrated in FIG. 1, the search module in some embodiments compares the luma component of the underexposed/overexposed image with the luma component of the regularly exposed image. This comparison identifies two offsets, one defining the translation between the underexposed luma image and normally exposed image, and the other defining the translation between the overexposed luma image and the normally exposed image. These two offsets, in turn, identify how the three images can be aligned as indicated by the dashed lines in FIG. 1 that identify the matching regions in the three luma images 150, 155 and 160.

Once the search module 125 has determined this offset between one image (e.g., the regularly exposed image) and each of the other images (e.g., the overexposed image and the underexposed image), the cropping module 130 uses these offsets to trim the three images. Specifically, in some embodiments, it uses these two offsets to crop the three images so that they all only include overlapping portions of the same scene. FIG. 1 illustrates the results of this cropping by showing the cropped, aligned images 165, 170 and 175. Instead of cropping all three images, some embodiments only crop the overexposed and underexposed images and for the portions of these images that get cropped, use the data from the normally exposed image to generate the composite HDR image. Alternatively, instead of cropping the images, other embodiments might use other operations (e.g., they might identify the union of the images) to address non-overlapping regions in the images. Some embodiments do not crop and instead repeat edge pixels. Repeating edge pixels leads to acceptable results since the offset between images is typically small.

Also, chroma is typically in a Y'CbCr 4:2:2 or 4:2:0 format. This means that the sampling of chroma is different than luma. In 4:2:2, chroma is half the horizontal size of luma, while in 4:2:0, chroma is half the horizontal size and half the vertical size of luma. Accordingly, when aligning the images, some embodiments adjust the vector for chroma based on this format.

As shown in this figure, the compositing module 120 receives the cropped, aligned images, which it then composites to produce the composite HDR image 180. In different embodiments, the compositing module uses different techniques to composite the three images. For instance, some embodiments composite the three images by performing different sets of operations for the luma channel of these images than for the chroma channels of these images. Also, in generating the HDR composite image, some embodiments might produce luma and chroma values that exceed a desired range of values. Accordingly, while generating the HDR image, the compositing module 120 of some embodiments concurrently performs scaling operations to ensure that the luma and chroma values of the HDR image are generated within their desired ranges.

One of ordinary skill in the art will realize that the image capture and processing operations can be implemented differently than those described above. For instance, instead of returning only one normally exposed image from the frame buffer (e.g., the most recent image), the image capture module of some embodiments returns several normally exposed images to the image processing module. From this group, the image processing module then selects the normally exposed image that is the sharpest and/or that best matches the captured overexposed and underexposed images. Alternatively, in some embodiments, the image capture module only returns one normally exposed image, but tries to ensure that this returned image is not blurred (i.e., is sharp). In different embodiments, the image capture module tries to ensure that the image is sharp in different ways. For instance, in some embodiments where the device has an accelerometer and/or gyroscope, the image capture module uses data recorded from the accelerometer and/or gyroscope to ascertain the likelihood of the blurriness (e.g., to quantify one or more motion related attributes) of the normally exposed images in order to select a normally exposed image that is sharp. In some embodiments, the image capture module selects the most recent image that is not likely to be blurred (e.g., has motion related attributes that are below a certain motion threshold). Instead of, or in addition to using motion detecting sensors, some embodiments determine which of multiple images is sharpest by using digital signal processing techniques to determine the frequency content of each image. In such embodiments, the image with the highest frequency content is identified as the sharpest image.

Alternatively, in some embodiments, rather than using normally exposed images from the frame buffer, after an HDR capture command is received, the mobile device takes one or more images at a normal exposure as well as the overexposed and underexposed images. In some such embodiments, the image processing module selects one of the normally exposed images (e.g., the sharpest, the last, etc.) to use for generating a composite HDR image.

Several more detailed embodiments of the invention are described below. Section I describes how the user interface of some embodiments allows a user to invoke an HDR mode and to capture an HDR image. Section II then describes the software architecture that the media device uses in some embodiments to capture and process HDR images. Next, Section III further describes the image capture module of the mobile device of some embodiments. Section IV then describes the image alignment process of the mobile device's image processing module in some embodiments. Section V next describes the image compositing process of the mobile device's image processing module in some embodiments. Lastly, Section VI describes a system architecture of the mobile device of some embodiments.

I. Invocation of HDR Mode and HDR Capture

Figure 2A:
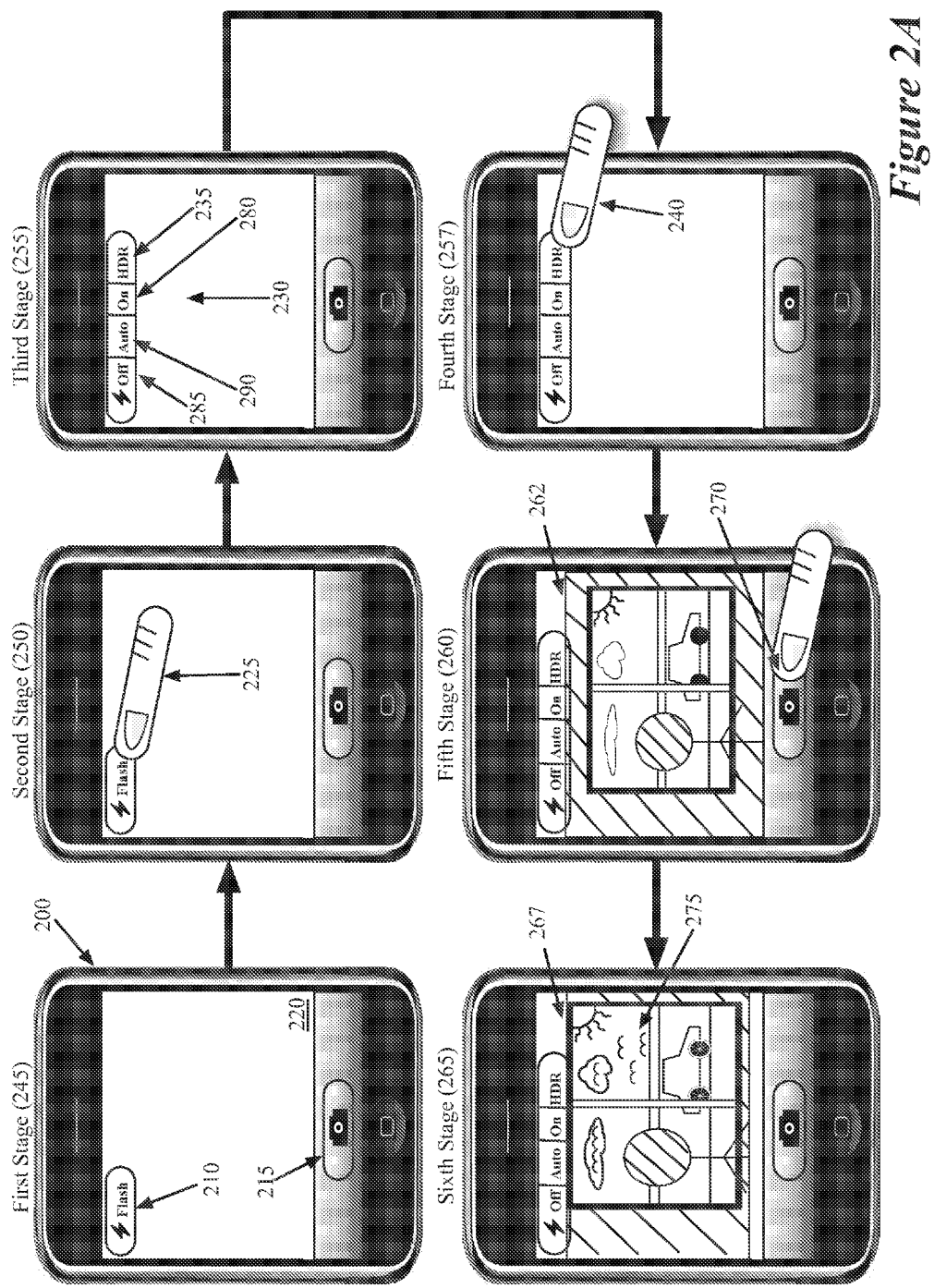
FIG. 2A illustrates the invocation of a high dynamic range (HDR) mode, and the taking of an HDR picture in this mode, in a mobile device of some embodiments.

In some embodiments, HDR mode is indicated by selection in a user interface (UI) of a mobile device. FIG. 2A illustrates the invocation of the HDR mode and the taking of an HDR picture during this mode, in a mobile device 200 of some embodiments. This figure illustrates these operations in six stages, 245, 250, 255, 257, 260, and 265 of the user interface of the device 200.

As shown in FIG. 2A, the mobile device 200 includes a display area 220, an image capture UI item 215, and a flash UI item 210. The display area 220 in some embodiments displays an image of a scene captured by a sensor of the mobile device when the mobile device has been placed in a mode to operate as a camera. The image capture UI item 215 is a user selectable item that once selected by a user, directs the mobile device to capture one or more images.

In some embodiments, the mobile device includes a flash for the camera. Accordingly, in these embodiments, the flash UI item 210 allows the user to turn the flash on or off. As further described below, the flash UI item 210 also allows a user to place the mobile device's camera in an HDR mode.

The operation of the mobile device 200 in capturing an HDR image will now be described. The first stage 245 shows the user interface of the mobile device after the device has been placed in an image capture mode. In some embodiments, a user can place the device in this mode by selecting a camera icon displayed in the display area 220. In some embodiments, when the device enters the camera mode, the device starts capturing images, storing these images temporarily in its frame buffer, and transiently displaying these images in the display area 220. However, in order to highlight the flash item 210 and the sequence of UI items displayed and operations performed, the first through fourth stages 245-257 in FIG. 2A do not show any of the images that are transiently displayed in the display area 220.

The second stage 250 shows the user selecting the flash UI item 210. As shown in FIG. 2A, the user can make this selection by touching (e.g., with a finger 225) the device's touch-screen display area at the location of the flash item 210. The user can also select this item through other UI selection techniques in some embodiments.

The third stage 255 shows that the selection of the flash item 210 results in the display of a flash menu 230. This menu has a selectable UI item 280 for turning on the flash, a selectable UI item 285 for turning off the flash, a selectable UI item 290 for setting the flash to an auto flash mode, and a selectable UI item 235 for turning on the HDR image-capture mode. While the selectable HDR-mode item 235 is shown for some embodiments to be part of the flash menu 230 in FIG. 2A, one of ordinary skill in the art will realize that this item 235 has a different placement in the UI of the device in some embodiments.

The fourth stage 257 illustrates a user's selection of the HDR mode-selection item 235. This selection is made by touching (e.g., with a finger 240) the location of this item on the mobile device's display touch screen. In some embodiments, the user can also select this mode through other UI selection techniques.

The fifth stage 260 illustrates a user selecting the image capture item 215 by touching (e.g., with a finger 270) the location of this item on the mobile device's display touch screen. As with other selectable items in the display area, the user can select the image-capture item in some embodiments through other UI selection techniques. The selection of the item 215 causes the device to capture an HDR image of the HDR scene (of a person standing in front of a window on a sunny day) that the user is viewing in the display area 220. Again, even before entering the HDR mode and receiving the selection of the image-capture item, the display area transiently displays the images, such as preview image 262, that the camera temporarily and repeatedly captures when it enters the camera mode. However, as mentioned above, these transiently displayed images are not shown in stages 245-257 of FIG. 2A in order not to obscure the display of the UI items and the selection of various UI items.

The sixth stage 265 illustrates the HDR image 267 that the camera captures and stores upon the selection of the image-capture item 215. This image in some embodiments is the image-processed digital picture that the device produces after having its image capture module capture several images at different exposures in sequence and having its image compositing modules composite these images. In some embodiments, the HDR image 267 includes details that are not visible in the preview image 262. For example, HDR image 267 includes birds 275.

As mentioned above, preview image 262 is not shown in the display in FIG. 2A in order not to obscure the display of the UI items and their selection. Accordingly FIG. 2B illustrates the display of a preview image 262 during the stages of the HDR capture operation described in relation to FIG. 2A.

II. Software Architecture

Figure 3:
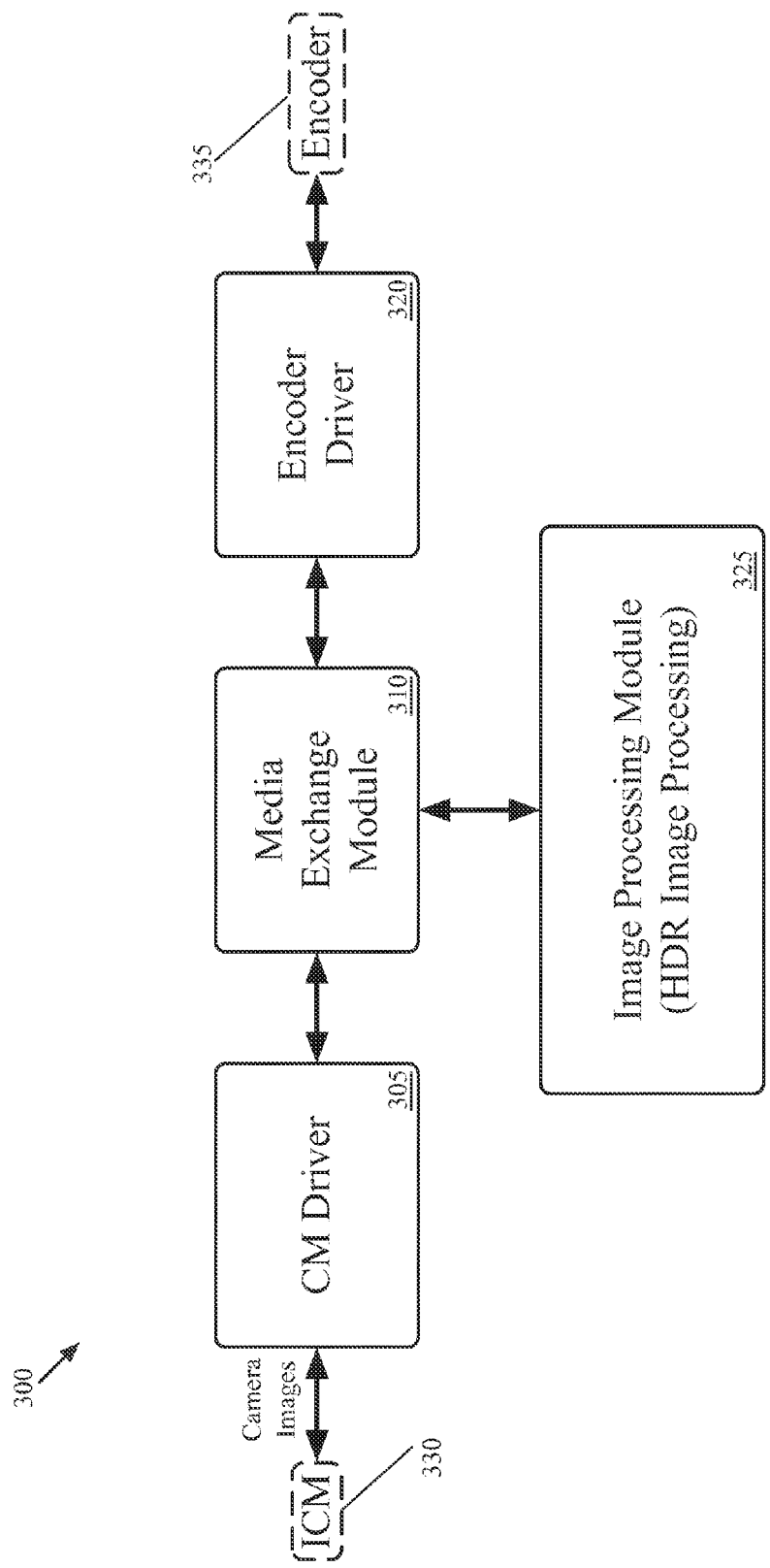
FIG. 3 conceptually illustrates the software architecture of the mobile device of some embodiments.

FIG. 3 conceptually illustrates the software architecture 300 of the mobile device of some embodiments. In some embodiments, this device can capture images of HDR scenes, can processes these images to produce HDR images, and can encode these images (e.g., as JPEG images). To do these operations, this device includes a capture module (CM) driver 305, a media exchange module 310, an encoder driver 320, and an image processing module 325, as shown in FIG. 3.

In some embodiments, the media exchange module 310 allows programs on the device that are consumers and producers of media content to exchange media content and instructions regarding the processing of the media content. Accordingly, in some embodiments, the media exchange module 310 routes instructions and media content between the image processing module 325 and the CM driver 305, and between the image processing module 325 and the encoder driver 320. To facilitate the routing of such instructions and media content, the media exchange module 310 of some embodiments provides a set of application programming interfaces (APIs) for the consumers and producers of media content to use. In some such embodiments, the media exchange module 310 is a set of one or more frameworks that is part of an operating system running on the mobile device. One example of such a media exchange module 310 is the Core Media framework provided by Apple Inc.

The image processing module 325 performs image processing on the images captured by the camera of the device. Examples of such operations include exposure adjustment operations, focus adjustment operations, perspective correction, image resizing, etc. In addition to these operations, the image processing module 325 performs HDR image processing operations. Specifically, in some embodiments, the module 325 includes the HDR image processing module 110 of FIG. 1. With this module 110, the module 325 performs the alignment and compositing operations that were described above by reference to FIG. 1.

Through the media exchange module 310, the image processing module 325 interfaces with the CM driver 305 and the encoder driver 320, as mentioned above. The CM driver 305 serves as a communication interface between an image capture module (ICM) 330 and the media exchange module 310. The ICM 330 is the component of the mobile device that is responsible for capturing a sequence of images at different resolutions that are needed to produce an HDR image.

From the image processing module 325 through the media exchange module 310, the CM driver 305 receives instructions that the device has entered an HDR mode and that an HDR image capture request has been made. The CM driver 305 relays such requests to the ICM 330, and in response receives the necessary set of images at different resolutions for producing the HDR image. The CM driver 305 then sends these images to the image processing module 325 through the media exchange module 310.

The encoder driver 320 serves as a communication interface between the media exchange module 310 and an encoder hardware 335 (e.g., an encoder chip, an encoding component on a system on chip, etc.). In some embodiments, the encoder driver 320 receives images (e.g., generated HDR images) and requests to encode the images from the image processing module 325 through the media exchange module 310. The encoder driver 320 sends the images to be encoded to the encoder 335, which then performs picture encoding (e.g., JPEG encoding) on the images. When the encoder driver 320 receives encoded images from the encoder 335, the encoder driver 320 sends the encoded images back to the image processing module 325 through the media exchange module 310.

In some embodiments, the image processing module 325 can perform different operations on the encoded images that it receives from the encoder. Examples of such operations include storing the encoded images in a storage of the device, transmitting the encoded images through a network interface of the device to another device, etc.

In some embodiments, some or all of the modules 305, 310, 320, and 325 are part of the operating system of the device. Other embodiments implement the media exchange module 310, the CM driver 305, and the encoder driver 320 as part of the operating system of the device, while having the image processing module 325 as an application that runs on the operating system. Still other implementations of the module 300 are possible.

Figure 4:
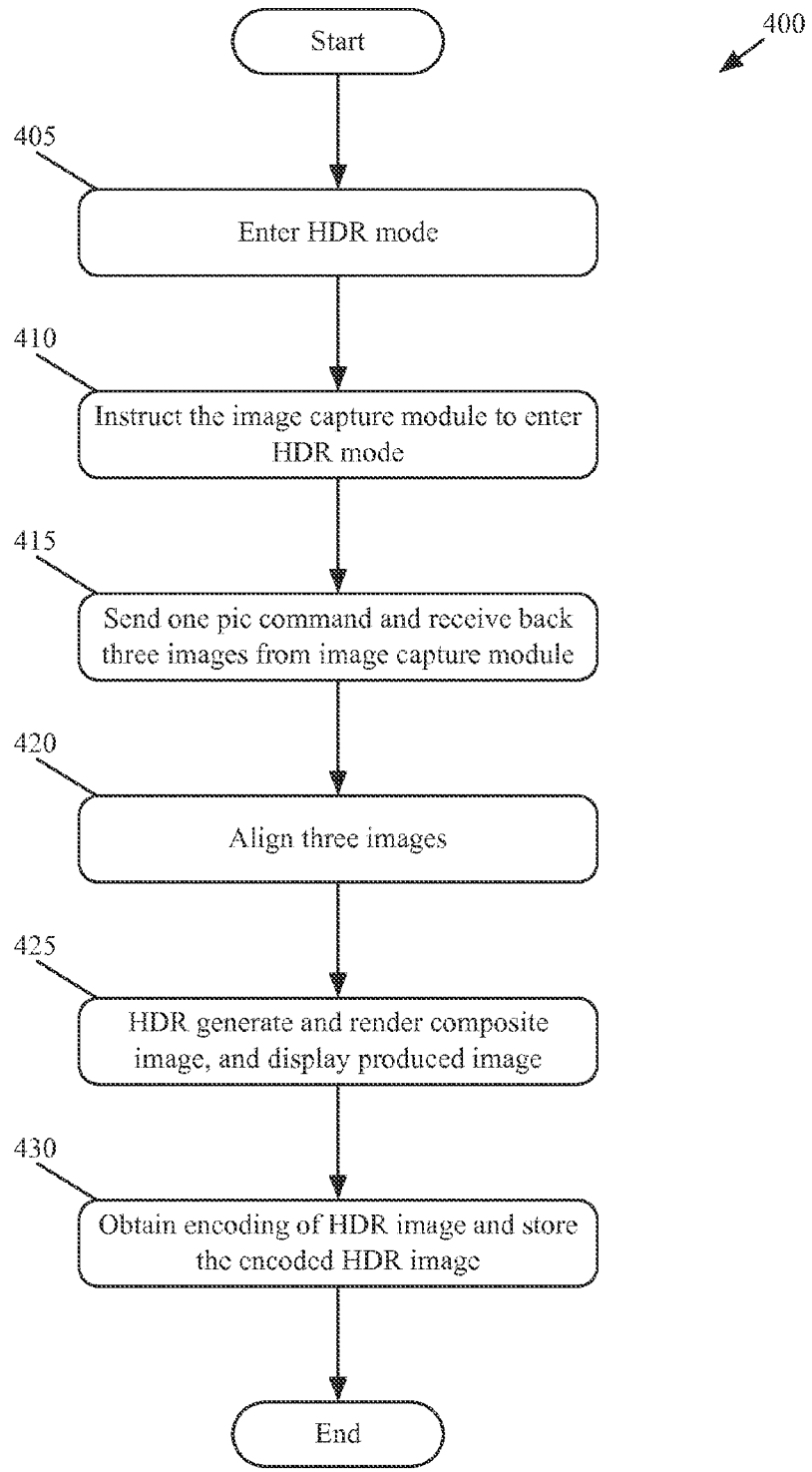
FIG. 4 illustrates the operation of an image processing module during an HDR image capture session.

The operation of the image processing module 325 during an HDR image capture session will now be described by reference to FIG. 4. This figure illustrates conceptually a process 400 that represents one series of operations that the image processing module 325 performs in some embodiments to produce an encoded HDR image. The image processing module 325 performs this process 400 each time the device enters the HDR mode (e.g., upon selection of the HDR selection item 235 in the example illustrated in FIG. 2A). Accordingly, as shown in FIG. 4, the image processing module 325 initially enters (at 405) the HDR mode.

Next, the module 325 instructs (at 410) the image capture module 330 to enter its HDR image capture mode through the media exchange module 310 and the CM driver 305. Upon receiving this instruction, the image capture module 330 computes the exposure durations for producing overexposed and underexposed images at the current lighting conditions, as mentioned above and further described below. Also, at this stage, the image capture module 330 is capturing normally exposed images and temporarily storing them in a frame buffer. To capture such images, the image capture module 330 computes exposure duration repeatedly while the device is in its camera mode operation.

After instructing the image capture module 330 to enter its HDR mode, the image processing module 325 instructs (at 415) the image capture module 330 that it has received a command to capture and produce an HDR image (e.g., upon selection of the picture capture item 215 in the example illustrated in FIG. 2A). This instruction is relayed to the image capture module 330 through the media exchange module 310 and the CM driver 305.

In response to this instruction, the image capture module 330 captures in quick succession an overexposed image that it captures based on the overexposed duration that it previously computed for the current lighting condition, and an underexposed image that it captures based on the underexposed duration that it previously computed for the current lighting condition. In addition to these images, the image capture module also retrieves an image that it captured earlier at the normal exposure duration and stored in its frame buffer.

Through the CM driver 305 and the media exchange module 310, the image processing module 325 receives (at 415) each of the three images from the image capture module 330. In some embodiments, the image processing module 325 receives the three images in the color space in which the camera captured the images. For example, the image capture module 330 of some embodiments captures and provides these images in the Y'CbCr color space.

The image processing module then aligns (at 420) all three images with each other, as the camera might have moved during the time that it captured the three images. As mentioned above and further described below, the image processing module uses a hierarchical search technique to pairwise align the overexposed and the underexposed images with the regularly exposed image.

After aligning the images, the image processing module composites (at 425) the image data in the three images to produce a composite HDR image. In different embodiments, the image processing module uses different techniques to composite the three images. For instance, some embodiments composite the three images by performing different sets of operations for the luma channel of these images than for the chroma channels of these images. Also, in generating the HDR composite image, some embodiments might produce luma and chroma values that exceed a desired range of values. Accordingly, while generating the HDR image, some embodiments concurrently perform scaling operations to ensure that the luma and chroma values of the HDR image are generated within their desired ranges.

After producing the HDR image, the image processing module displays (at 425) the generated HDR image. Next, this module directs (430) the encoder 335 (through the media exchange module 310 and the encoder driver 320) to encode the HDR image. The encoder in some embodiments encodes this image (e.g., encodes it into a JPEG format) and returns the encoded HDR image. The image processing module in some embodiments then stores (at 430) the encoded HDR image on a storage of the device. The image processing module of some embodiments can also perform other operations with the encoded HDR image. For instance, in some cases, the image processing module transmits the encoded generated image to another device through a network connection established by the network interface of the device.

One of ordinary skill in the art will realize that the image processing operations can be implemented differently than those described above. For instance, instead of only processing one normally exposed image, the image processing module of some embodiments examines several normally exposed images that the image capturing module returns. From this group, the image processing module selects the normally exposed image that is the sharpest and that best matches the captured overexposed and underexposed images. Alternatively, in some embodiments, rather than using normally exposed images from the frame buffer, after an HDR capture command is received, the mobile device takes one or more images at a normal exposure as well as the overexposed and underexposed images. In some such embodiments, the image processing module selects one of the normally exposed images (e.g., the sharpest, the last, etc.) to use for generating a composite HDR image. In some embodiments, the normally exposed images are taken after the HDR capture command rather than from the frame buffer.

One of ordinary skill in the art will understand that each method, taking the normal image from a frame buffer and taking the normal image after the HDR command is received, has some advantages over the other. The act of touching the HDR capture command icon moves the mobile device away from where it was when the images in the frame buffer were taken. In an image from the frame buffer is used, the movement of the mobile device caused by touching the HDR capture command icon will occur between the taking of the normally exposed image and the overexposed and underexposed images. If instead, a fresh normally exposed image is taken after the HDR capture command icon is touched, the movement caused by the touch will occur before the normal image is taken, rather than between the capture of the images. Accordingly, taking a fresh normally exposed image can reduce the amount of movement of the device during the capturing of the three exposures. Reducing the movement during the capturing of the images increases the overlapping area to be composited.

As mentioned above, some embodiments display recent images from the frame buffer as preview images, and use one of the preview images as the normally exposed image. A possible advantage of using a normal image from the frame buffer is that the image would look more like the preview image displayed before the HDR capture command is received. Another possible advantage to retrieving the normal image from the frame buffer is that the time between the HDR command being activated and the composite HDR image being displayed may be shorter (e.g., by the exposure time of the normally exposed image).

Because some embodiments use a newly captured normal exposure, rather than an image from the frame buffer, some of those embodiments do not take normally exposed preview images and store them in the frame buffer while the mobile device is in HDR mode. However, even among embodiments that use normally exposed images captured after the HDR command is received, some embodiments still take normally exposed preview images in order to collect data about the lighting conditions, determine what normal exposure time to use, what exposure values to use, etc.

III. Image Capture Module

Figure 5A:
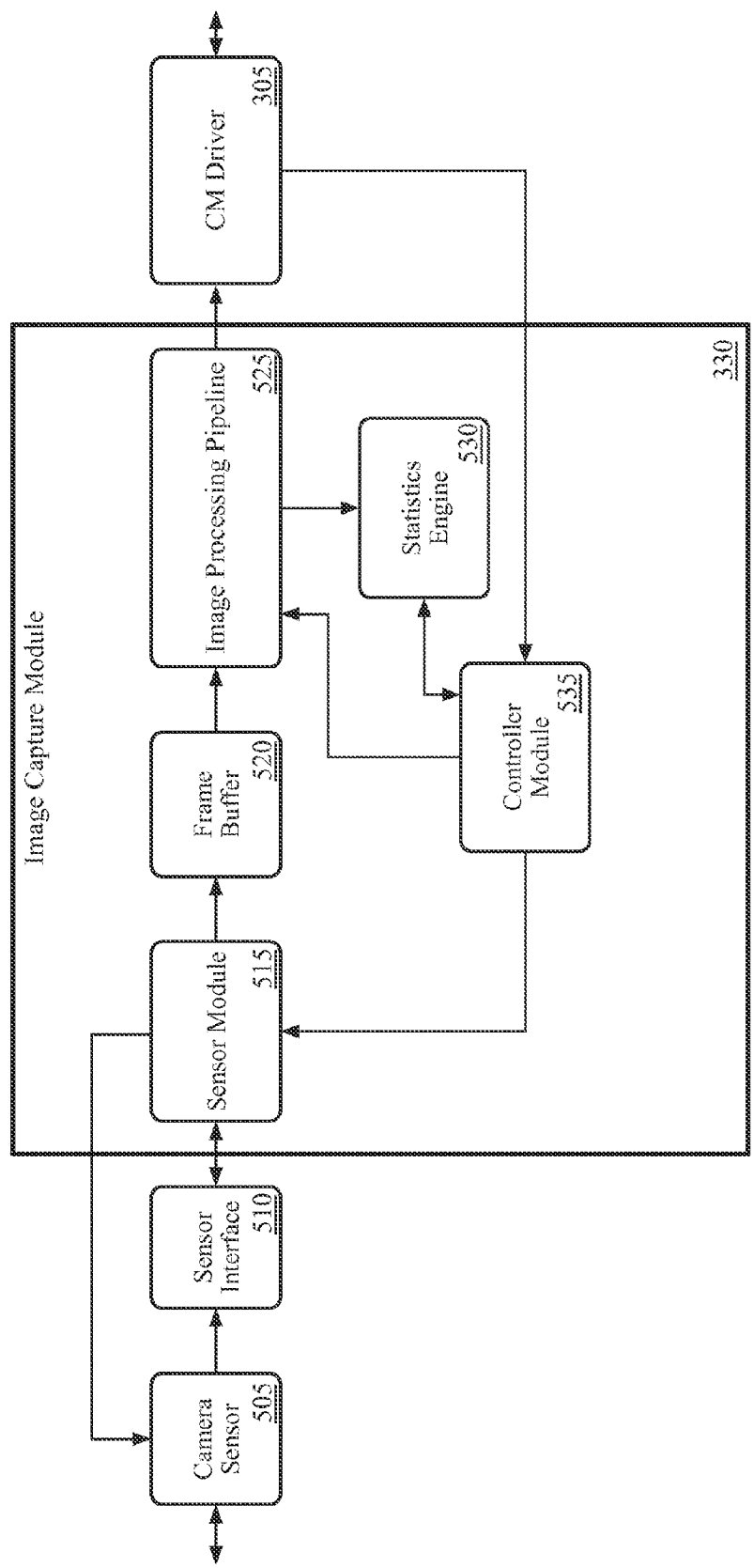
FIG. 5A illustrates the image capture module of some embodiments of the invention.

FIG. 5A illustrates the image capture module 330 of some embodiments of the invention. At the direction of the image processing module 325, the image capture module 330 directs the device's camera to capture images. For instance, as mentioned above, the image capture module 330 in some embodiments directs the camera to start capturing normally exposed images at a particular frame rate when the device enters its camera mode of operation. Also, when the device enters its HDR mode, the module 330 enters its HDR mode (at the direction of the image processing module 325) by computing exposure durations for taking overexposed and underexposed images. Subsequently, when it receives a capture image command while it is in its HDR mode, the image capture module 330 in some embodiments (1) takes two successive images, one with the overexposed duration and one with the underexposed duration, and (2) returns these two images along with one or more normally exposed images from its frame buffer.

As shown in FIG. 5A, the image capture module 330 includes a sensor module 515, a frame buffer 520, an image processing pipeline 525, a statistics engine 530 and a controller module 535. In some embodiments, all of the modules of the image capture module 330 are implemented in hardware (e.g., ASIC, FPGA, SOC with a microcontroller, etc.), while in other embodiments, some or all of the modules of the image capture module 330 are implemented in software.

The sensor module 515 communicatively couples to a sensor interface 510 and a camera sensor 505 of the device's camera. In some embodiments, the camera sensor 505 is a CMOS sensor and the sensor interface 510 is part of the camera sensor 505. The communicative coupling between the sensor module and the camera sensor/sensor interface is facilitated through any number of known sensor interfaces. Through this communicative coupling, the sensor module 515 can forward instructions to the camera to control various aspects of the camera's operations such as its power level, zoom level, focus, exposure level, etc. In some embodiments, these instructions typically originate from the controller module 535. Also, through its communicative coupling with the camera, the sensor module 515 can direct the camera sensor to start capturing images when the image processing module 325 requests the camera to start capturing images and the sensor module 515 receives this request through the controller module 535, as further described below.

In some embodiments, Bayer filters are superimposed over the camera sensor and thus the camera sensor outputs Bayer pattern images, which are stored in the sensor interface associated with the camera sensor. A Bayer pattern image is an image where each pixel only stores one color value: red, blue, or green. Through its coupling with the sensor interface 510, the sensor module 515 retrieves raw Bayer pattern images stored in the camera sensor interface 510. By controlling the rate at which the sensor module 515 retrieves images from a camera's sensor interface, the sensor module 515 can control the frame rate of the images that are being captured by a particular camera.

The sensor module 515 stores images that it retrieves from the sensor interface 510 in the frame buffer 520. The images stored in the frame buffer 520 are raw, unprocessed images. Before the image processing module 325 can process these images, the image processing pipeline 525 of the image capture module 330 needs to perform several pre-processing operations on them. Different embodiments perform different sets of pre-processing operations. For instance, in some embodiments, the image processing pipeline 525 includes a demosaicing module (not shown) that reconstructs a red, green, blue (RGB) image from a Bayer pattern image stored in the frame buffer 520, by interpolating the color values for each set of colors in the Bayer pattern image. Also, the image processing pipeline 525 of some embodiments includes a color space conversion module (not shown) that converts the RGB image to a Y'CbCr image. Examples of other modules that are included in the image processing pipeline 525 of some embodiments include modules that perform (1) bad pixel removal to attempt to correct bad pixels in the images retrieved from the frame buffer, (2) lens shading correction to correct for image defects caused by the camera lens, (3) white balance correction to adjust colors of the image to render neutral colors correctly, etc. As used herein, the converting from one format to another refers to using data from an image in one format to generate an image in a different format. In some embodiments, the new version of the image replaces the old image; in other embodiments both the old and new versions of the image are kept.

The statistics engine 530 collects image data at various stages of the image processing pipeline 525. Also, in different embodiments, this engine collects data differently from different stages of the image processing pipeline 525. The statistics engine 530 processes the collected data, and, based on the processed data, adjusts the operations of the camera sensor 505 through the controller module 535 and the sensor module 515. Examples of such operations include exposure and focus. In some embodiments, the exposure duration is determined by a combination of the sensor integration time and the sensor/capture module analog/digital gains. Although FIG. 5A shows the statistics engine 530 controlling the camera sensor 505 through the controller module 535, the statistics engine 530 in other embodiments controls the camera sensor through just the sensor module 515. Also, while the statistics engine 530 is shown to be separate from the controller module 535, the operation of this engine is performed by the controller module 535. In other words, the modularization of the statistics engine in FIG. 5A is a conceptualization of a series of operations that are performed by the image capture module 330.

The controller module 535 of some embodiments is a microcontroller that controls the operation of the image capture module 330. For instance, in some embodiments, the controller module 535 instructs the camera sensor 505 through the sensor module 515 to capture images. Also, in some embodiments, the controller module 535 controls (1) the operation of the camera sensors (e.g., exposure level) through the sensor module 515, (2) the operation of the image processing pipeline 525, and (3) a flash/strobe (not shown), which is part of the mobile device of some embodiments. Instead of receiving exposure settings from the controller module 535, or in conjunction with these settings, the camera sensor 505 or the sensor module 515 of some embodiments use default values for the camera sensor operations.

Some embodiments of the controller module 535 process instructions received from the statistics engine 530 and the capture module driver 305. In some embodiments, the instructions received from the capture module driver 305 are instructions from the mobile device (i.e., received from the local device) while in other embodiments the instructions received from the capture module driver 305 are instructions from another device. Based on the processed instructions, the controller module 535 can adjust the operation of the image capture module 330.

Figure 5B:
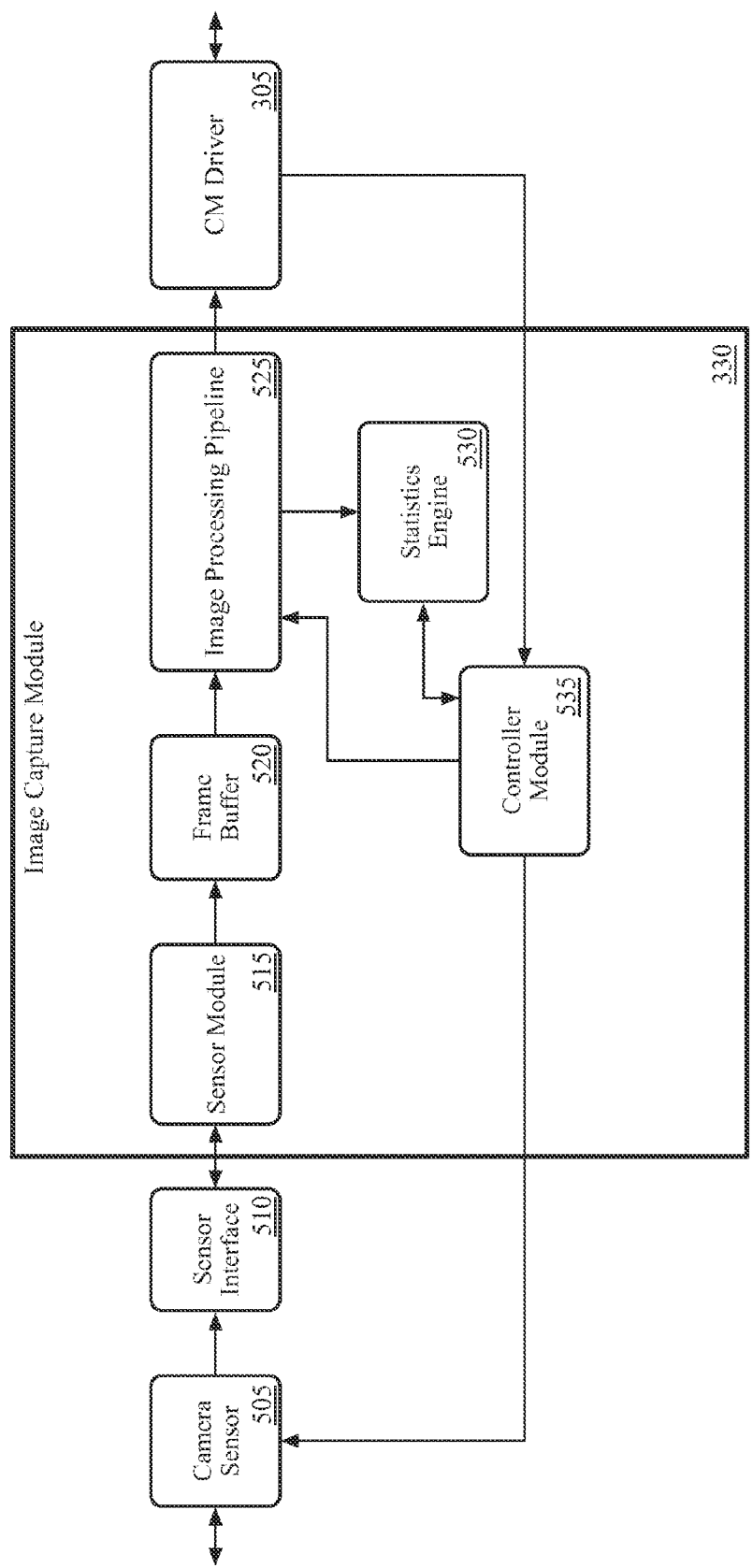
FIG. 5B illustrates the image capture module of some other embodiments of the invention.

FIG. 5B illustrates the image capture module 330 of some other embodiments of the invention. In FIG. 5B, the sensor module 515 does not control the camera sensor 505 directly and does not receive commands from the controller module 535. In this figure, the controller module 535 controls the camera sensor 505. In FIG. 5B, sensor module 515 passes data from the sensor interface 510 to the frame buffer 520, just as the sensor module 515 in FIG. 5A does.

Figure 6:
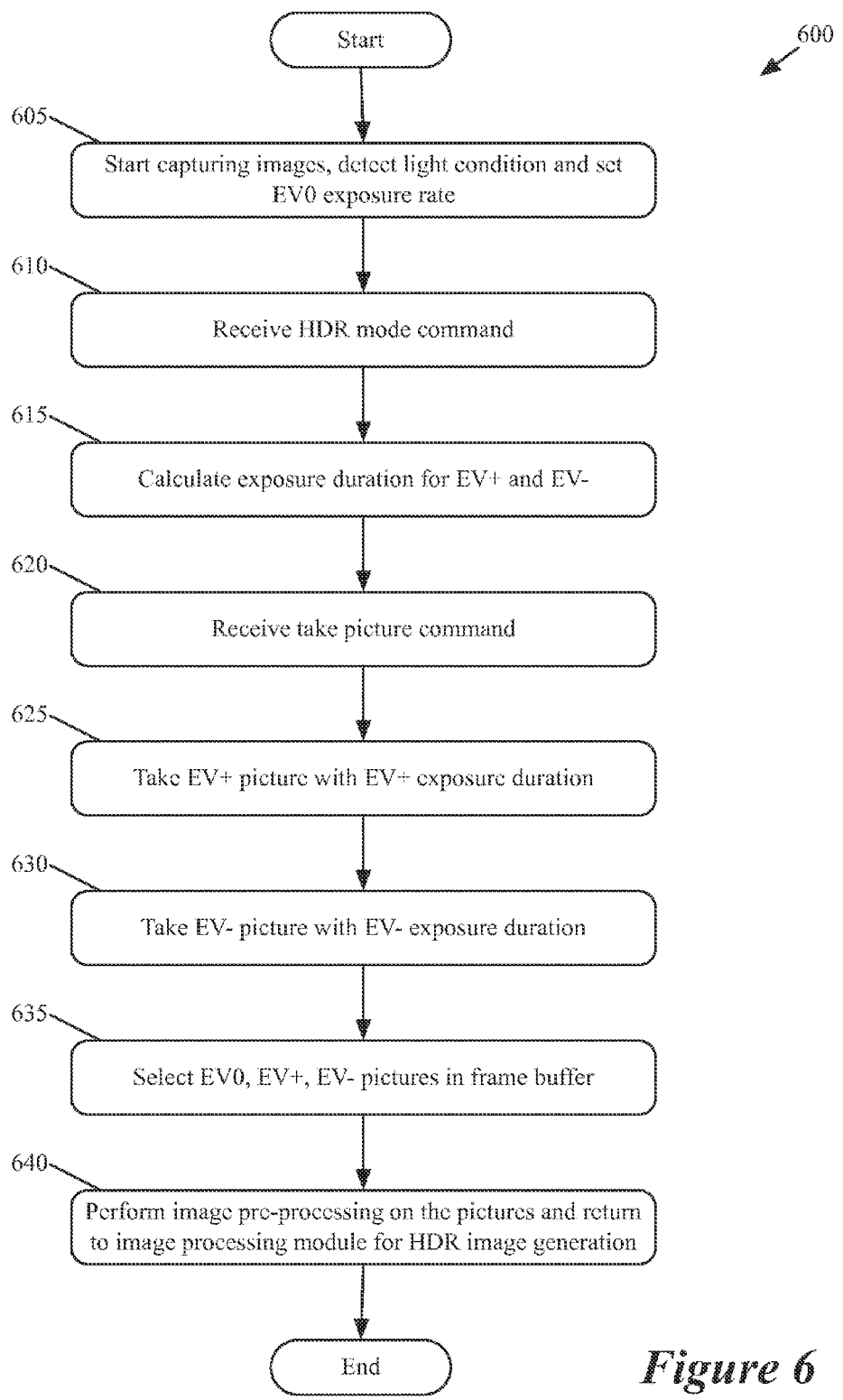
FIG. 6 illustrates a process that conceptually represents a series of operations of the image capture module during an HDR image capture session.

FIG. 6 illustrates a process 600 that conceptually represents a series of operations of the image capture module 330 during an HDR image capture session. This process starts each time that the device enters its image-capture mode. As shown in FIG. 6, this process initially starts (at 605) capturing images at a particular default rate. Based on one or more qualities (e.g., a histogram or a total light level) of one or more of the captured images, the controller module 535 in some embodiments detects (at 605) the current light condition. Based on the current light condition, the controller module defines (at 605) the exposure duration for capturing a normally exposed image (referred to below as an EV0 image) and relays (at 605) this exposure duration to the sensor module 515. In other embodiments, control logic associated with the camera sensor 505 or sensor module 515 detects the light condition and defines the exposure duration for the normal exposure (referred to as the EV0 exposure). In some embodiments, this control logic includes light detection circuits that can quantify the amount of light under which the device is operating.

Irrespective of where and how the normal exposure duration is calculated, the process 600 starts to capture images at the normal exposure duration and stores the captured images in the frame buffer. In some embodiments, the process 600 calculates the normal exposure duration repeatedly during the image-capture session to identify the normal exposure duration as the lighting condition changes.

After 605, the controller module 535 receives (at 610) an instruction that it has received an HDR mode command from the image processing module 325 through the CM driver 305 and the media exchange module 310. Based on this command, the controller module 535 computes (at 615) the exposure durations for taking an overexposed and underexposed image (taking an EV+ and EV− image) during the current lighting conditions. In some embodiments, the controller module performs the operation 615 repeatedly during the HDR-capture session to identify the overexposed and underexposed exposure duration as the lighting condition changes.

Next, at 620, the controller module 535 receives an instruction to take a picture. In response, the controller module 535 directs (at 625 and 630) the sensor module to capture one overexposed image at the overexposed duration and one underexposed image with the underexposed duration. The controller module 535 then directs (at 635) the image processing pipeline 525 to retrieve the captured EV+ and EV− images from the frame buffer along with one or more EV0 images in the frame buffer. As mentioned above, the image capture module returns several EV0 images to the image processing module 325 in some embodiments, in order to allow the module 325 to select the best EV0 image for aligning with the EV+ and EV− images. Alternatively, in some embodiments, the image capture module 330 only returns one normally exposed image, but tries to ensure that this returned image is not blurred (i.e., is sharp). In different embodiments, the image capture module 330 tries to ensure that the image is sharp in different ways. For instance, in some embodiments where the device has an accelerometer and/or gyroscope, the image capture module uses data recorded from the accelerometer and/or gyroscope to ascertain the likelihood of the blurriness of the normally exposed images in order to select a normally exposed image that is sharp.

In different embodiments, the controller module 535 directs (at 635) the image processing pipeline 525 to retrieve the overexposed, underexposed and normally exposed images differently. In some embodiments, the controller module 535 simply notifies the processing pipeline 525 that the overexposed and underexposed images are being captured, and the processing pipeline 525 retrieves the correct images from the frame buffer 520.

The image processing pipeline 525 pre-processes (at 640) each image retrieved from the frame buffer 520. The image capture module 330 returns (at 640) each retrieved and pre-processed image to the image processing module 325 for HDR image generation. After 640, the process ends if the device is no longer in the HDR-capture mode, or returns to 620 to wait for another "take picture" command.

The above description identifies the captured images as the source(s) of information about lighting conditions. However, in some embodiments, the camera sensor 505 determines the lighting conditions without generating image data. The mobile devices of some embodiments use additional sensors instead of or in addition to the camera sensor 505 to determine the lighting conditions.

IV. Image Alignment

A. Introduction

In order to make a composite image out of three images taken of a scene by a mobile device, the pixels in each image that show a particular part of the scene must be composited with the pixels in each of the other images that show that same part of the scene. If the mobile device does not move while the images are being taken, then the pixels that represent a particular part of a scene in each image will have the same coordinates in the image as the pixels that represent the same part of the scene in each of the other images. Such images can be characterized as aligned. However, if the mobile device moves during the taking of the images, the pixels that represent a particular part of a scene in one image will have slightly different coordinates than the pixels that represent the same part of the scene in the other images. In other words, images taken by a moving device will be out of alignment.

Before compositing the images, some embodiments compensate for the movement of the mobile device by aligning the images before compositing them. That is, the number of pixels by which the raw images are offset from each other in vertical and in horizontal directions are determined so that the mobile device can then combine pixels from each image that correspond to the same part of the scene even though the corresponding pixels do not have the same coordinates in each of the raw images. The offset that aligns corresponding pixels in two images can be characterized as an offset vector, measured in pixels.

An offset between two images taken of the same scene can be caused by rotation or translation of the mobile device while the images are taken. When a user commands a mobile device of some embodiments to take a high dynamic range picture, the mobile device takes three images in quick succession with very little time between taking each image. However, despite the small time between taking each of the images, the hand-held mobile device will most likely move slightly in the course of taking the three images. For example, the action of touching the mobile device to command it to take an HDR picture can move the device. Because of the movement of the mobile device, each image will be taken from a slightly different position. Because of the slight changes in position, the raw images will not be aligned with each other. Before the high-dynamic range process can composite the images taken at different exposures, the images must be aligned with each other (e.g., by the mobile device) by discovering the specific offset vectors that will bring the images into alignment. Such alignments are part of a process sometimes called "registration".

The number of pixels that an image is offset from another depends on how far the camera moves (by translation and rotation) while taking the images and the scale of the images (e.g., how many centimeters or degrees of the scene are represented by each pixel in an image). For instance, the camera's rotation or translation movement might cause two images of the scene to be 10 cm out of alignment (e.g., one image shows 10 cm more of the left side of the scene and 10 cm less of the right side of the scene than the other image). In such a case, if the scale of the images equates the length of 1 pixel in an image to 1 cm in the scene, then the images will be 10 pixels out of alignment. This scale is provided to explain how a change in position of the image relative to real world items in the scene can translate to a change in the image relative to the pixels that make up the image. In some embodiments, the mobile device does not measure the actual scale of the image.

The mobile device of some embodiments does not have an exact measure of how far the device has moved in the course of taking the picture. Therefore, the offset that will align the images in such embodiments is unknown when the images are taken. The mobile device of some embodiments will identify offsets that align two images by testing a range of offset vectors. The set of offset vectors in the range tested by a mobile device to determine whether they align a given pair of images is referred to herein as "potential offset vectors" or "potential offsets". The mobile device of some embodiments determines which potential offset vector will align the images by comparing the images (or bitmaps derived from the images) at different values of the offset vectors. The range of the potential offsets is limited in some embodiments to those offsets that would leave a substantial overlap between the images. Offsets that would not leave a substantial overlap are not tested in such embodiments because the compositing process works primarily on the overlapping portions of the images. The movement of a mobile device in the hands of a user who is trying to hold it steady while taking a picture is likely to be relatively small; therefore the aligning offset is often small relative to the size of the images. However, some embodiments test a larger range of offsets just in case the movement was larger than usual. In some embodiments, one or more external sensors (e.g., gyroscopes, motion sensors, etc.) are used to estimate the displacement and/or rotation of the mobile device. Such an estimate is used in some embodiments to determine a starting point for searching for offset vectors. In some embodiments the estimate is used to determine a range of offset vectors to search (e.g., if the mobile device is held very steady, the search range is narrower than if the mobile device is held less steady).

Even in embodiments that limit the range of potential offsets to those that leave a substantial overlap between the images, the number of potential offsets can be large. For example, if the potential offsets range from 0% to 6.4% of the width and height of an image that is 1000 pixels square, the potential offset vector could be between 0 and 64 pixels in any direction (up, down, left, or right). With that range of possible offset vectors, the total number of possible offset vectors is about 16,000 (approximately 128 vertical pixels by 128 horizontal pixels). When there are thousands of potential offset vectors to test, testing the potential offset vectors by directly comparing large images (or large bitmaps) at each possible offset vector requires a very large number of calculations.

To reduce the number of calculations performed to find the actual offset, some embodiments perform a hierarchical alignment process. The hierarchical alignment process of some embodiments generates versions of the images at lower resolutions. The lower resolution image contains the same scene, but with a larger scaling factor. For example, if a 1000×1000 (pixel×pixel) image represents a scene that is 10 m wide, then one pixel length in the image represents 1 cm in the scene. One pixel length in a 500×500 resolution image generated from the 1000×1000 image represents 2 cm in the scene. Similarly, one pixel length in a 250×250 resolution image generated from the 500×500 image represents 4 cm in the scene.

Because of the difference in scale (i.e., fewer pixels representing the same scene), the potential offset vectors at lower resolutions cover the same fraction of the image, but the absolute number of potential offset vectors is smaller. In the above example, dropping the resolution by a factor of four (from 1000 pixels square to 250 pixels square) would reduce the range of possible offsets from plus or minus 64 pixels to plus or minus 16 pixels (i.e., 64 pixels divided by 4). Such a reduction decreases the number of possible offset vectors by a factor of 16 (i.e., from about 16,000 possible offset vectors to about 1,000 possible offset vectors). Such a process finds the offset vector by starting with a first approximation and then determining the actual offset vector through successively finer approximations.

The processes of some embodiments calculate the successive approximations of an offset vector that aligns two images by generating reduced resolution versions of the raw images, generating 1-bit bitmaps from the lower resolution versions of the images, and aligning the bitmaps. The bitmaps are aligned starting with the lowest resolution bitmaps. To align the bitmaps, the processes compare two bitmaps to each other using various test offset vectors to determine the actual offset vector between the bitmaps. The processes of some embodiments compare a subset of the pixels in the bitmaps rather than comparing all the pixels in the bitmaps. In some such embodiments, before comparing two bitmaps, the processes divide one or both bitmaps into tiles and discards tiles that contain more than a threshold percentage of black pixels or more than a threshold percentage of white pixels. Such processes then compare the pixels in the remaining tiles to determine the offset vector between the bitmaps. The offset vector identified for each resolution of bitmaps is used as a starting point for testing offset vectors for the next higher resolution of bitmaps. These processes are further described in relation to FIGS. 7-11, below.

B. Production of Bitmaps for Alignment

Figure 7:
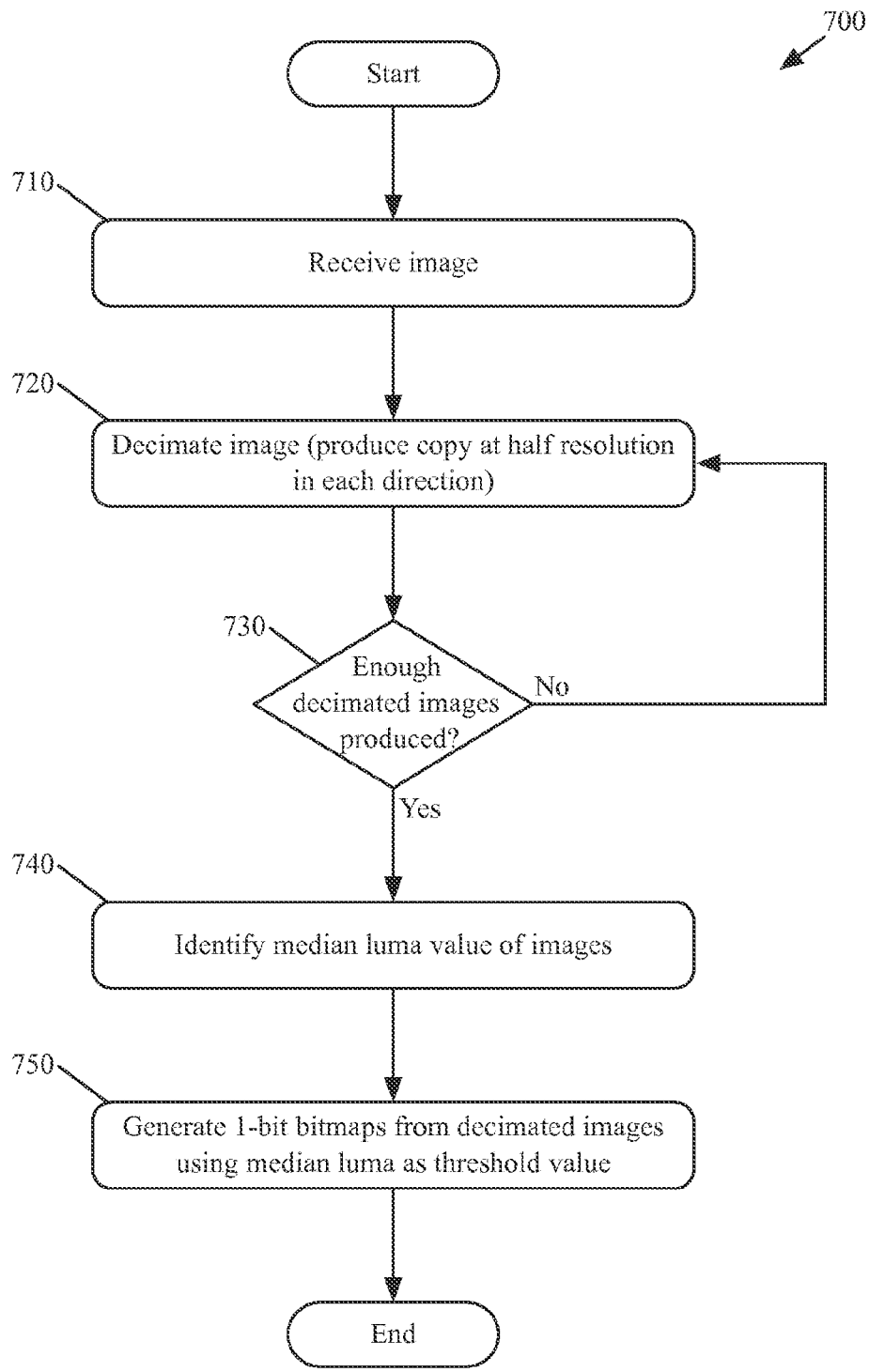
FIG. 7 illustrates a process of some embodiments for generating a series of bitmaps for aligning images.

Some embodiments produce multiple bitmaps to be used to search for the offset vector that will align two images. FIG. 7 illustrates a process 700 of some embodiments for generating such a series of bitmaps for aligning images. As used herein, the term "bitmap" refers to a version of an image with a color depth of one bit per pixel. Each pixel in such a bitmap can be represented as either black or white.

The process 700 receives (at 710) an original image. In some embodiments, the images are received from the camera of the mobile device. The camera operations of the mobile device of some embodiments are controlled by a program that is independent of a program that performs process 700. In some such embodiments, the image is received from the program that controls the camera operations. In other embodiments, a single program controls both the camera operations and performs the process 700. In some such operations the program that is implementing both the bitmap generation process 700 and the camera operations of the mobile device receives the images from the camera hardware. The programs of some embodiments receive images from a memory of the mobile device instead of or in addition to receiving images from the camera hardware. Different embodiments of the mobile device provide the image in different formats. In some embodiments, the images are represented in terms of a brightness value and a set of color values for each pixel. For instance, in some embodiments, the process receives the images in a Y'CbCr (luma, blue-chroma, and red-chroma) format. In some embodiments, the images are represented in terms of different color component values. Instead of or in addition to providing images in a luma/chroma format, the mobile device of some embodiments provides images in terms of different color component values. The color component values of some embodiments are provided in an RGB format (e.g., an sRGB image). In such embodiments, the process 700 converts the images to a luma image as part of the receiving operation.

The process decimates (at 720) the original luma image. The decimation of the original image creates a copy of the image at one half the resolution (in each dimension) of the original. For example, if the original image has a resolution of 1920×1280, the copy will have a resolution of 960×640.

Figure 9:
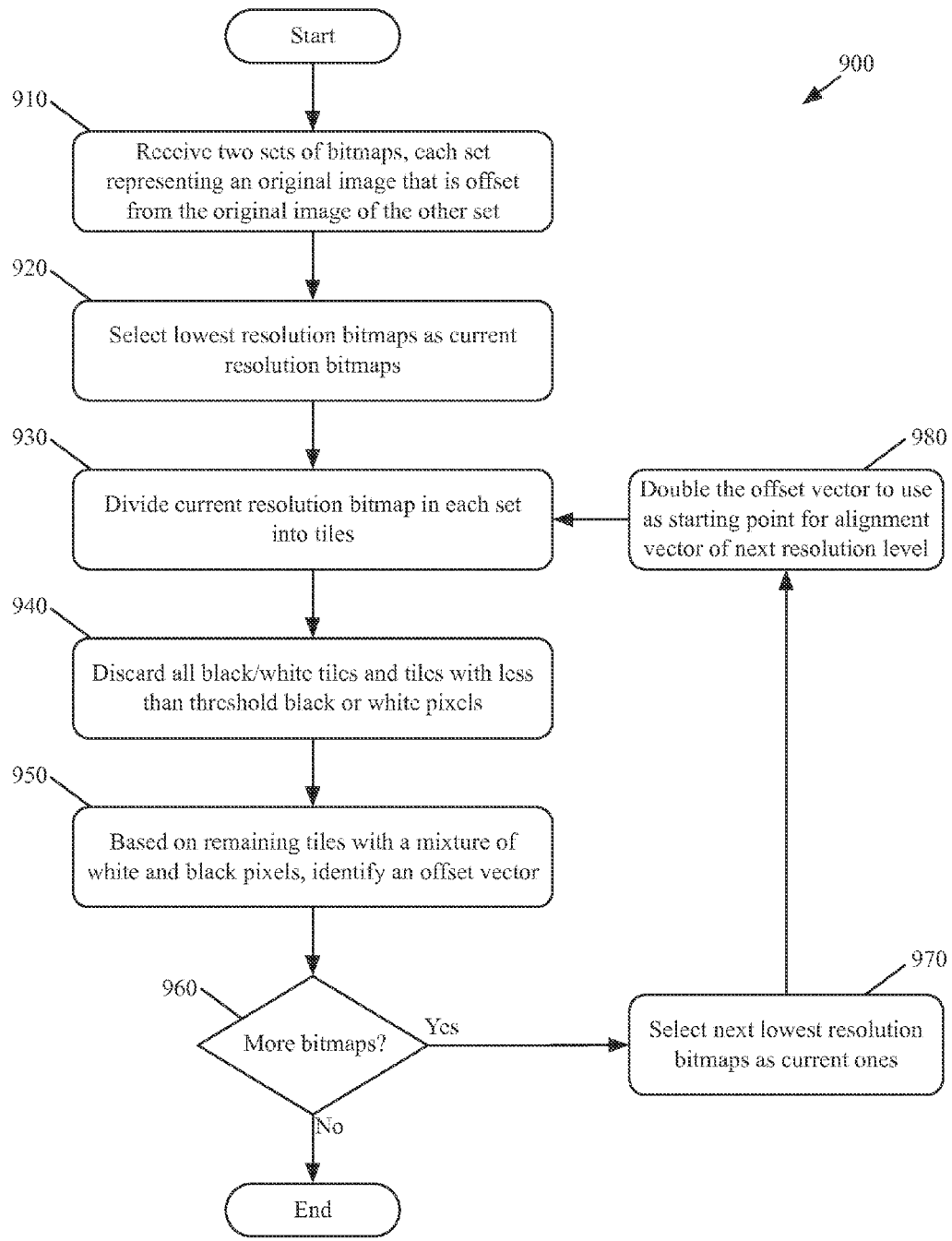
FIG. 9 illustrates a process of some embodiments for determining an offset vector that aligns two images.
Figure 10:
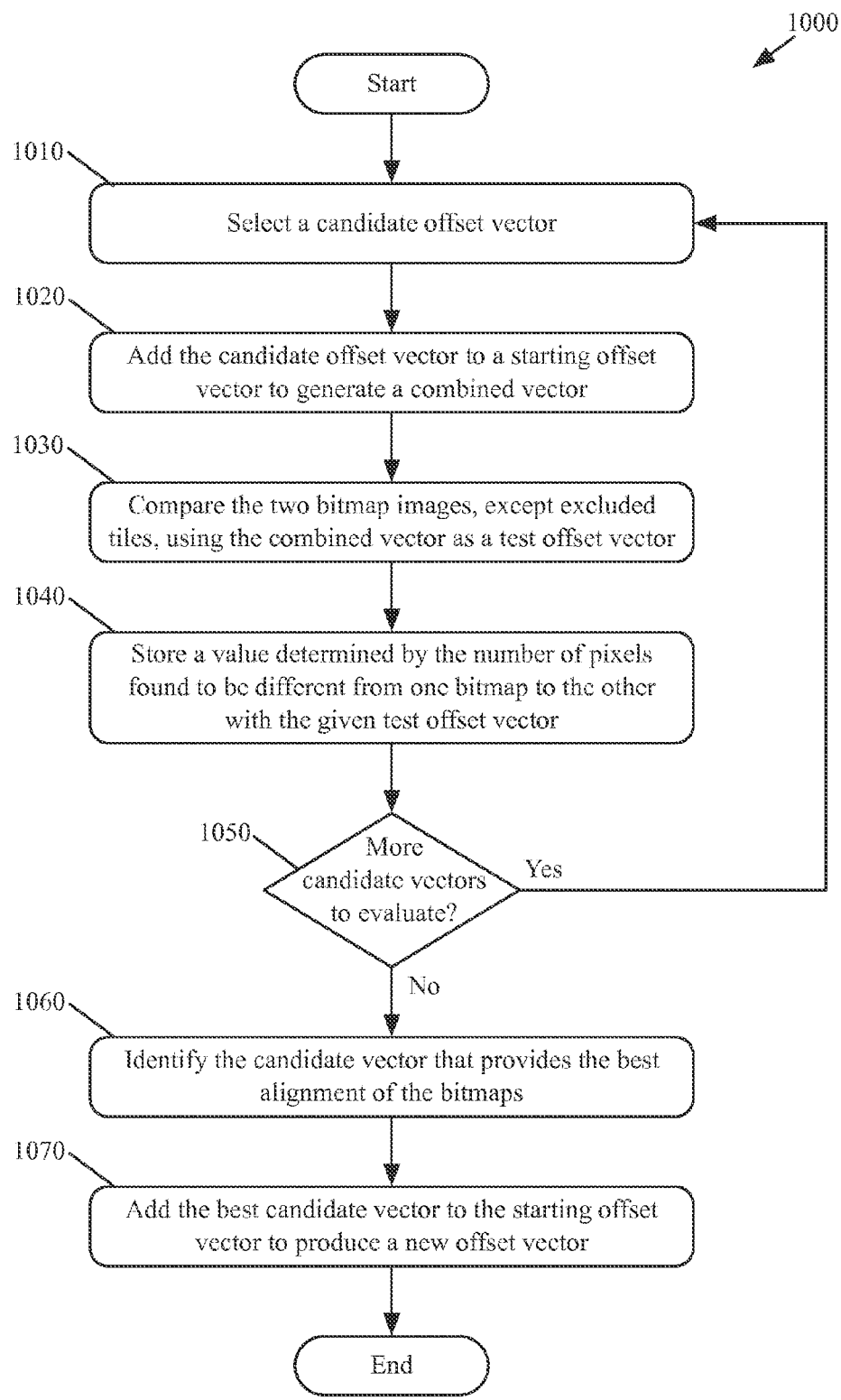
FIG. 10 illustrates a process for determining an offset vector for aligning two bitmaps.

The process 700 performs the decimation a particular number of times to generate a number of images with different resolution levels to use for successive approximations of the offset vector, e.g., in the process of FIGS. 9-10. Various embodiments decimate the images various numbers of times. In some embodiments, the number of decimations affects the range of potential offsets. The lower the resolution of a given image, the fewer the number of potential offset vectors there are for a given percentage of the image. Accordingly, in some embodiments, the larger the range of potential offsets to be tested, the more levels of decimation are used. The number of levels of decimation is pre-programmed in some embodiments. For example, some embodiments provide an original image and five levels of decimation, with the lowest resolution decimated image being ⅟32nd of the resolution of the original image (in each dimension) and having ⅟1024th the number of pixels. Some embodiments provide an original image and six levels of decimation, with the lowest resolution decimated image being ⅟64th of the resolution of the original image (in each dimension) and having ⅟4096th the number of pixels. The decrease in the resolution results in a corresponding decrease in the number of potential offset vectors in a given fraction of the image. Therefore, a 1 to 4096 reduction in the number of pixels decreases the number of potential offset vectors in a given fraction of the image by a factor of 4096.

The number of decimations is preset in some embodiments. However, local conditions, such as a shaky hand or low light levels, can affect the motion of the mobile device. Therefore, in addition to or instead of using a pre-set (default) number of decimations, some embodiments allow the user to determine the number of decimation levels or have the mobile device determine the number of decimation levels dynamically in response to one or more variables available at the times that the original images are taken. For example, when taking the three HDR images with longer total exposure times (e.g., in low light conditions) the user's hand has more time to move, and thus can move farther at the same speed. Some embodiments compensate for the additional movement by increasing the levels of decimation to compensate for the additional time to move. The mobile devices of some embodiments include motion sensors that provide at least some indication of how fast the user's hands are moving. In some such embodiments, faster motion of the mobile device during the capture of the images prompts the mobile device to produce more decimation levels.

Regardless of how the number of decimations is determined, there are a finite number of decimations. Accordingly, the process determines (at 730) whether the decimation has been repeated enough times to generate the desired number of decimated images. If the decimation has not been repeated enough times then the process returns to 720 to decimate the image produced in the previous round of decimation. Each repetition of the decimation (at 720) produces a new copy of the image at successively smaller resolutions. For example, if the decimation is performed six times starting from an original image with a resolution of 1920×1280, then the total number of images would be seven (including the original image) with resolutions 1920×1280 (original), 960×640 (first decimated image), 480×320 (second decimated image), 240×160 (third decimated image), 120×80 (fourth decimated image), 60×40 (fifth decimated image) and, 30×20 (sixth decimated image).

The decimation in some embodiments is performed by any known method of decimating images. For example, some embodiments use one or more of the following techniques: (1) grouping the pixels into n-by-n squares, where n is the decimation factor (e.g., 2) then averaging the values of the pixels in the squares, (2) a moving average filter, (3) a weighted moving average filter, (4) selecting one pixel value in every n-by-n group (e.g., the median pixel value or the pixel value at a particular location in the group, (5) using a least squares analysis technique, (6) sub-sampling, and (7) other decimation methods.

Once the process 700 determines (at 730) that the correct number of decimated images has been produced, from each image (i.e., the original luma image and each image resulting from the decimations), the process generates a 1-bit bitmap. Bitmap images are generated from the images because finding an offset between two bitmaps is computationally less intense than directly finding an offset between the images themselves. The operations of some embodiments for generating bitmaps compensate for differences in luma values that result from the different exposure levels of images to be compared. Despite the different luma values in each exposure, each exposure will show the brighter parts of the scene as being brighter than the darker parts of the scene. More specifically, the lighter (and darker) half of the pixels in one exposure will be a close match in shapes and positions for the lighter (and darker) half of the pixels in the other exposure. The median luma value of each image is used to separate the brighter half of the pixels in that image from the darker half of the pixels in that image. The median luma value of an image is the luma value for which half the pixels in the image have a lower luma value (or the same luma value) and half the pixels in the image have a higher luma value (or the same luma value). Therefore, a threshold operation performed on each image using the median luma value of that image will generate a bitmap that is approximately the same as the bitmaps produced by the other images, regardless of the different exposure times.

Accordingly, to prepare for the generation of a bitmap from a luma image, the process 700 identifies (at 740) a median luma value for each image (including the original and all decimated images). The median luma value will be used to generate the bitmaps. As mentioned above, by using the individual median luma value for each image, the alignment process 700 compensates for the different range of luma values in the differing exposures. One of ordinary skill in the art will understand that some embodiments might use other methods for generating the bitmaps. For example, the threshold of some embodiments is derived from the median luma value (e.g., the threshold is the median luma value divided by 2), but is not the median luma value. The threshold of some other embodiments is determined from some other characteristic of the image (e.g., the threshold is the mean of the luma range rather than the median of the lumas).

The process then generates (at 750) a 1-bit bitmap version of each image by performing a threshold operation using the median luma value of that image as the threshold value. A threshold operation on a pixel in a luma image generates a corresponding pixel in the bitmap. The threshold operation generates a white pixel in the bitmap if the corresponding pixel in the image is lighter than the threshold luma value and generates a black pixel in the bitmap if the corresponding pixel in the image is darker than the threshold luma value. Because the threshold luma value used in this operation is the median luma value of the image used to generate the bitmap, approximately half of the pixels in the bitmaps will be black and approximately half of the pixels will be white. The process 700 then ends.

The process 700 was described above as including several features. One of ordinary skill in the art will understand that not all of the features described above are found in every embodiment. Also, various embodiments of process 700 have other features in addition to or instead of one or more of the features described above. One of ordinary skill in the art will realize that some individual embodiments include multiple features that are implemented as alternatives to each other rather than implemented in the same operation. For example, the above described process acts on luma images. However, one of ordinary skill in the art will understand that some embodiments use luminance images (the luminance component of a YCbCr image) instead of luma images. Still other embodiments use luma images in some cases and use luminance images as an alternative in other cases. The above described process generates a separate bitmap from a luma image, but in some embodiments, a bitmap overwrites the corresponding luma image. The decimated images in some embodiments are overwritten during the bitmap generation process or deleted after their respective bitmaps have been generated in order to save memory.

Although the above described process 700 generates the bitmaps from the decimated images after all the decimated images have been produced, one of ordinary skill in the art will understand that some embodiments generate a bitmap from a decimated image after the decimated image is produced, but before all the decimated images have been produced. The above described embodiments decimate the images by a factor of 2. However, one of ordinary skill in the art will understand that some embodiments decimate the images by factors other than 2. In the above described process, each decimated image is generated from the next highest resolution decimated image. However, in some embodiments, decimated images are generated using images other than the next highest resolution decimated image (e.g., a decimated image can be produced from the original luma image or from a decimated image two resolution levels up). In the process described above, a black pixel in the bitmap corresponds to a darker-than-the-median pixel in the luma image and a white pixel in the bitmap corresponds to a lighter-than-the-median pixel in the luma image. However, one of ordinary skill in the art will understand that "black" and "white" represents an arbitrary choice of colors to represent two possible binary values of a pixel in the bitmap. In some embodiments, a darker pixel in the image will be represented in the bitmap as a binary value "0" and a lighter pixel in the image will be represented in the bitmap as a binary value "1". In other embodiments, a darker pixel in the image will be represented in the bitmap as a binary value "1" and a lighter pixel in the image will be represented in the bitmap as a binary value "0".

Figure 8:
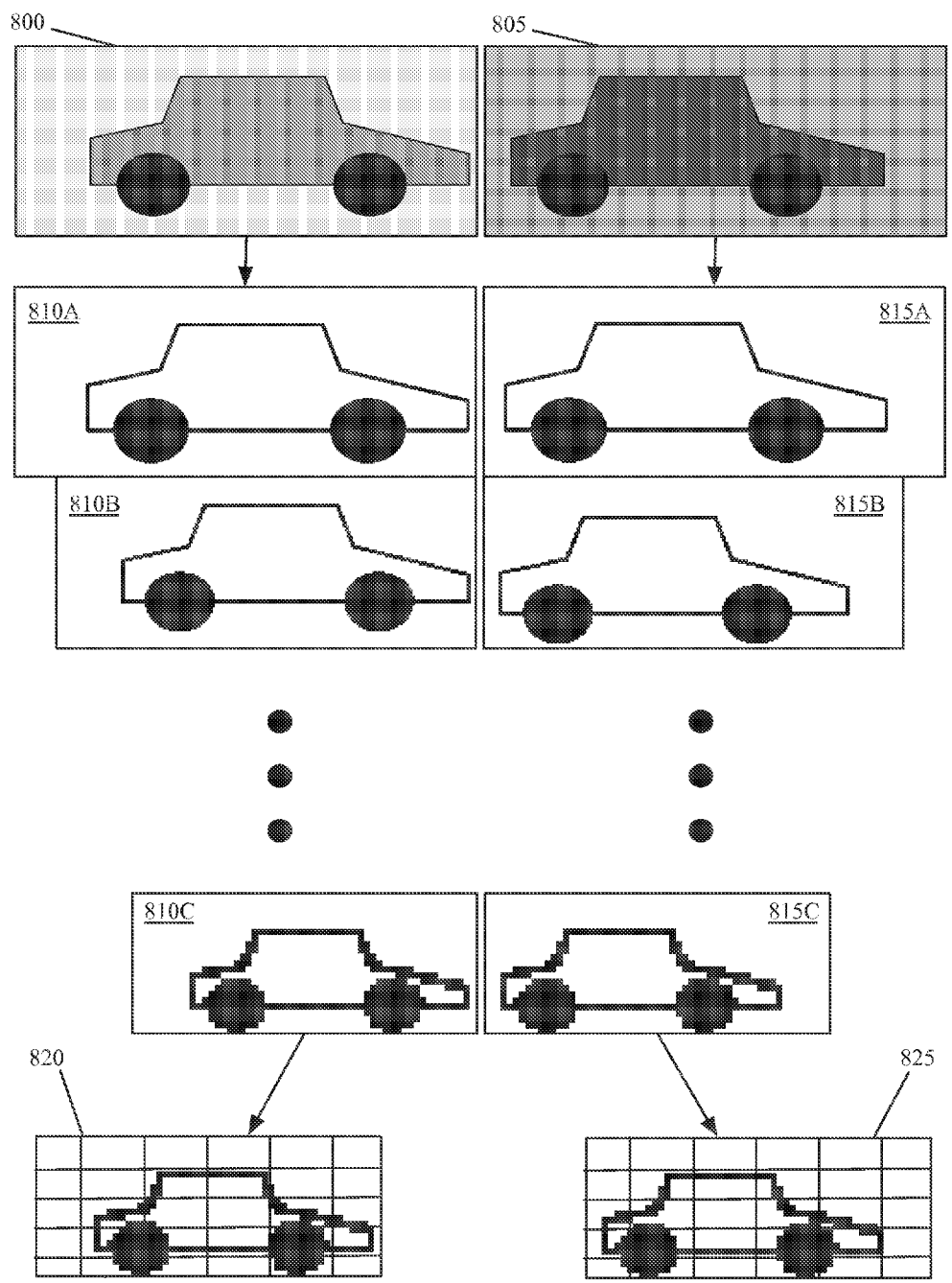
FIG. 8 illustrates examples of bitmaps made from decimated images of some embodiments.

FIG. 8 illustrates examples of bitmaps of some embodiments that can be used to search for alignments. The bitmaps have been generated from an image of a car. The bitmaps in FIG. 8 are not drawn to scale. The figure includes original images 800 and 805, bitmaps 810A-810C and 815A-815C, and tiled bitmaps 820 and 825. Original image 800 is an image taken with a medium duration exposure from the mobile device. Original image 805 is an image from the same mobile device taken with a shorter duration exposure. Bitmaps 810A-810C are bitmaps generated from copies (with different resolutions) of original image 800. Bitmaps 815A-815C are bitmaps generated from copies (with different resolutions) of original image 805. Tiled bitmap 820 is a copy of bitmap 810C that has been conceptually divided into tiles. Tiled bitmap 825 is a copy of bitmap 815C that has been conceptually divided into tiles.

The bitmaps in this figure with the same resolution can be compared to each other to search for the offset of the original images 800 and 805. The offset of images 800 and 805 is a vector that, when applied to one of the images, causes it to align with the other image. In this case, the car in image 800 is closer to the right side of its image while the car in image 805 is closer to the left side of its image. Therefore, applying an offset to image 805 that moved its pixels to the right by the correct amount would align it with image 800.

The bitmaps 810A and 815A are offset by the same amount as the images 800 and 805 because bitmaps 810A and 815A were generated directly from the original images. The offset of images 800 and 805 could be found by finding the offset of bitmaps 810A and 815A. However, finding the offset of bitmaps 810A and 815C simply by trying every possible offset to see if it aligns the bitmaps would be computationally expensive because of the large number of possible offsets to be checked to align two high resolution bitmaps. Therefore, the processes of some embodiments search for the correct alignment via a hierarchical process of successive approximations rather than trying all possible offset vectors for the high resolution bitmaps.

The lowered resolution of the bitmaps 810C and 815C results in fewer possible offsets to check when aligning bitmaps 810C and 815C. However, the lower number of possible offsets to check also means less accuracy in the offset found at that resolution. Specifically, an offset of one pixel between bitmaps 810C and 815C represents an offset of several pixels (e.g. 64 pixels) between original images 800 and 805, so an offset that aligns bitmaps 810C and 815C will not precisely specify an offset that align bitmaps 810A and 815A. However, an offset that aligns bitmaps 810C and 815C can be used as a first approximation of the offset that aligns bitmaps 810A and 815A. The offset that aligns bitmaps 810C and 815C is a starting point in the hierarchical process for finding offsets of higher resolution bitmaps.

The sets of successively larger bitmaps allow the value for the offset to be refined using each successively higher resolution bitmap. In FIG. 8, each consecutive bitmap in a given column of bitmaps conceptually represents a bitmap generated from an image with half the resolution of the image used to generate the previous bitmap in the column, so the offset of each bitmap is half the offset of the next highest resolution. For example, bitmap 810A was generated from an original image 800 with resolution 1920×1280 (original) and bitmap 810B was generated from a decimated copy (not shown) of original image 800 with resolution 960×640 (the first decimated image). An offset of 10 pixels to the right between bitmaps 810B and 815B represents an offset of 20 pixels (plus or minus one pixel) to the right between bitmaps 810A and 815A. When the offset for the larger resolution bitmaps 810A and 815A is found, the starting point for the search would be 20 pixels to the right. As further described with respect to FIGS. 9-11, below, the alignment process would then evaluate possible offsets within one pixel of the starting point to search for the actual offset at 19 pixels, 20 pixels, and 21 pixels to the right.

In FIG. 8, the ellipsis between bitmap 810B and 810C elides bitmaps of successively smaller resolutions, generated from decimated images each with half the resolution (in each dimension) of the preceding decimated image. As described with respect to FIG. 7, the decimation and generation of bitmaps continues for some particular number of levels of resolution (e.g., six levels). In FIG. 8, the bitmaps 810A-810C and 815A-815C and the original images 800 and 805 are not drawn to scale.

The embodiments described above generate each bitmap from a decimated image with the same resolution as the generated bitmap. Alternatively, in some embodiments a bitmap of a lower resolution can be generated from a higher resolution bitmap instead of from a decimated image. Generating bitmaps from higher resolution bitmaps is faster in some embodiments than generating bitmaps from decimated images. However, generating bitmaps from higher resolution bitmaps instead of from decimated images tends to generate artifacts in the bitmaps that can reduce the efficiency and/or accuracy of searches for offset vectors. Therefore this technique is not used in all embodiments.

Some embodiments align bitmaps by dividing one or both bitmaps into tiles and comparing the pixels in some or all of the tiles to corresponding pixels in the other bitmap to find an offset vector that causes the features of each image to line up. The short description below is for an embodiment that tiles one bitmap at each resolution.

The process of some embodiments compares the two bitmap images multiple times using multiple test offset vectors. The comparison systematically compares pixels in one bitmap (the "tiled bitmap") with the corresponding pixel in a second bitmap (the "target bitmap"). The process compares pixels in the tiled bitmap with pixels in the target bitmap that are offset by the offset vector. For each test offset vector, the process of some embodiments counts the number of corresponding pixels that are different from each other. The closer the test offset vector is to the actual offset between the two images, the smaller the number of pixels in the two bitmaps that are different from the tiled bitmap to the (shifted) target bitmap.

Some bitmaps generated from decimated images include tiles that are almost all black or almost all white. The omission of the tiles that are all black, almost all black, all white, or almost all white from the comparison speeds up the comparison without changing the identified offset vector in some embodiments. Therefore, some embodiments discard the black, almost all black, white, and almost all white tiles from the comparison.

Accordingly, the bitmaps of some embodiments are conceptually divided into tiles, such as tiled bitmaps 820 and 825, as part of a process (described in relation to FIGS. 9 and 10, below) for finding the offset vector. The each tile contains a number of pixels. In the process of some embodiments for finding the offset vector of two bitmaps, tiles that are all black or almost all black (e.g., the top half of the front wheel in tiled bitmap 820) with less than some threshold number of white tiles are ignored and tiles that are all white (e.g., the left and top edge tiles of tiled bitmap 820) or almost all white (e.g., the front windshield of tiled bitmap 820) with less than some threshold number of black tiles are ignored. That is, the pixels within those tiles are not included in the comparisons of the two bitmaps that are made while searching for an offset vector that brings those two bitmaps into alignment.

C. Hierarchical Alignment of Images

Once bitmaps are produced in multiple resolutions, some embodiments use the bitmaps to find offset vectors that align the images. FIGS. 9-10 illustrate a process 900 and a process 1000 of some embodiments for finding an offset vector that aligns two images. For clarity, the description of process 900 describes the alignment of two images with each other. However, in some embodiments, the process 900 receives three sets of bitmaps for the three original images of different exposures and aligns the three images. In aligning the three images, the process 900 first aligns two images and then aligns the third image with one of the other two images. Process 900 is a hierarchical process that finds the offset between two images by finding a gross approximation for the offset using a low resolution bitmap then narrows in on the actual offset value by finding successively closer approximations to the actual offset vector using successively larger resolution bitmaps. The process tests nine candidate offset vectors at each resolution to find which offset vector brings the bitmaps closest to alignment at that resolution.

Figure 11:
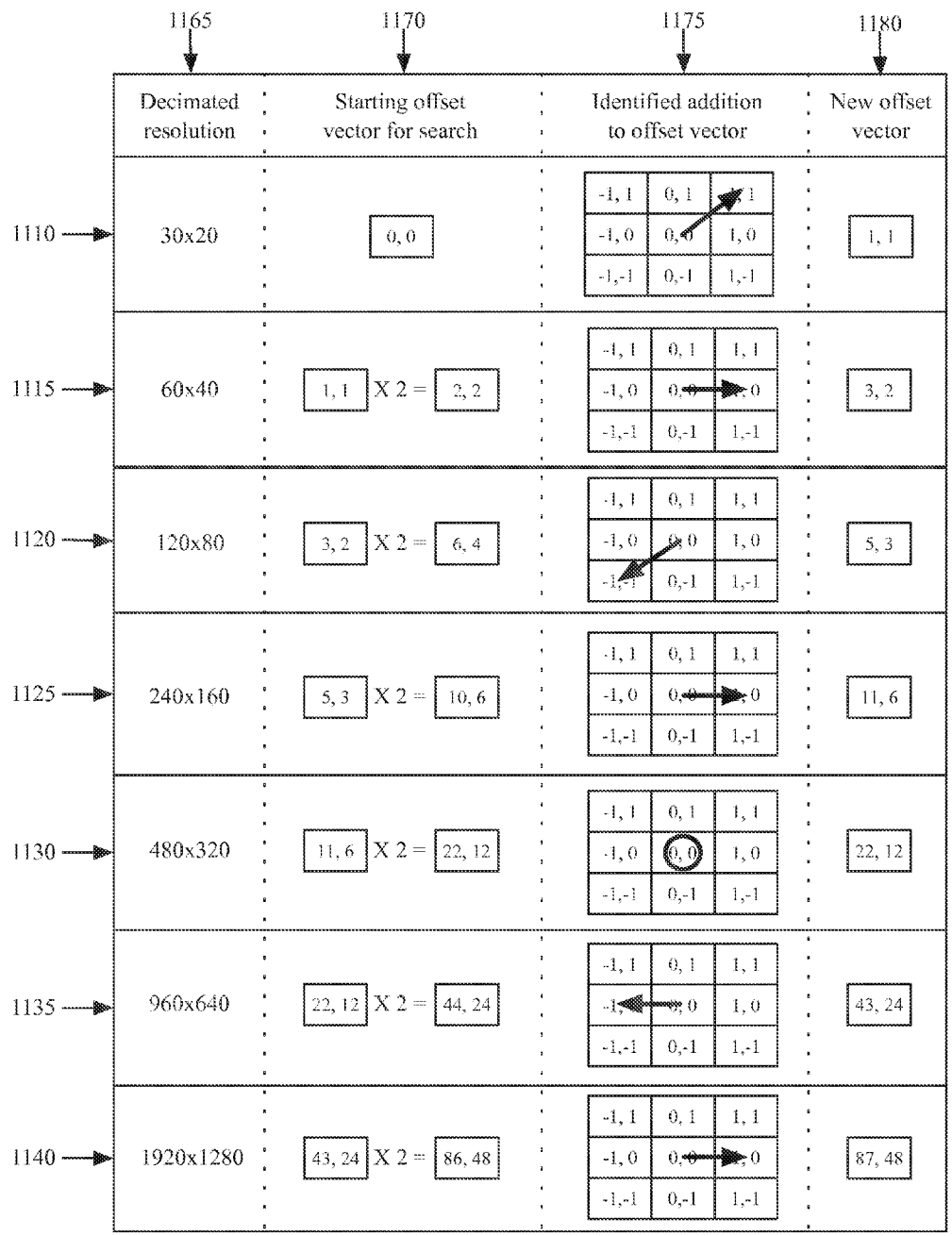
FIG. 11 illustrates an example of the determination of a final offset vector.

FIGS. 9-10 will be described with references to FIG. 11. FIG. 11 illustrates an example of finding an offset vector that aligns two images in some embodiments. This figure shows, one hierarchical level at a time, how an offset vector between two images is found by process 900. The figure includes rows/stages 1110-1140 and columns 1165-1180. Each of the stages 1110-1140 conceptually represents a hierarchical level in the identification of an offset vector between two images. Each of the columns 1165-1180 represents a significant feature of each stage. The stages 1110-1140 each include a decimated resolution (in column 1165), a starting offset vector (in column 1170), an identified addition to the offset vector (in column 1175), and a new offset vector (in column 1180).

The decimated resolution values of column 1165 identify the resolution of the bitmaps to be compared in each stage. This conceptually illustrates the selection of resolutions in process 900 (at 920 and 970). The starting offset vectors of column 1170 represent an offset vector that acts as an origin around which the candidate vectors will be tested. Each row of column 1175 includes nine candidate vectors. The arrows (and circle) in the various stages of column 1175 conceptually illustrate a candidate vector selected by process 1000 as the candidate offset vector that produces the best alignment of the bitmaps at that resolution. The new offset vectors of column 1180 represent the vector sums of the starting offset vector and the vector identified in column 1175 in the same stage. The offset vector in column 1180, in the final stage 1140 represents the offset of the two original, full resolution images.

In some embodiments, the process 900 uses bitmaps produced by a process such as process 700 of FIG. 7. The process 900 begins by receiving (at 910) two sets of bitmaps. Each set of bitmaps has been generated from an original image from the mobile device. The received sets of bitmaps include a range of resolutions each a factor of two smaller than the next larger resolution. The process 900 selects (at 920) the lowest resolution bitmaps as the current pair of bitmaps to work with (e.g., to find an offset vector that aligns the bitmaps). In the example in FIG. 11, stage 1110 represents the lowest hierarchical level. The resolution of the bitmap in stage 1110 is 30×20, as shown in column 1165.

As described above in relation to tiled bitmaps 820 and 825, the bitmaps can be conceptually divided into tiles. The process 900 divides (at 930) the current bitmap in each set into tiles. Some embodiments only divide one bitmap in each pair of bitmaps (with a common resolution) into tiles. Each tile contains a particular set of pixels. In this context, a tile is considered to contain a pixel when the pixel is within a range of locations identified by that tile. For example, using the lower left pixel of a bitmap as coordinate (0, 0), a particular tile could include all tiles with x-coordinates between 10 pixels and 19 pixels and y-coordinates between 20 pixels and 29 pixels. A pixel with coordinates (13, 25) would be a pixel in that tile and a pixel with coordinates (22, 25) would be a pixel in a different tile. One of ordinary skill in the art will understand that tiles can be different sizes in different embodiments and could even be different sizes in the same embodiments. For example, tiles in different resolutions could be different sizes. Tiles of some embodiments are different sizes relative to the resolution of the bitmaps.

Some tiles contain a significant number of both black pixels and white pixels. Other tiles contain all (or almost all) black pixels or all (or almost all) white pixels. To speed up later comparisons that find the offset vector that aligns two tiles, the process of some embodiments discards (at 940) all tiles that contain mostly one color of pixels (black or white). That is, when performing later comparisons to find how well a candidate offset vector aligns the two bitmaps, the process 900 will not include the pixels from the discarded tiles in those comparisons. In some embodiments, tiles are discarded if they have less than a threshold number of the minority color. The threshold number in some embodiments is 5% of the total number of pixels in the tile. In other embodiments, the threshold number of the minority color is some other percentage of the pixels in the tile. Only one of the pair of bitmaps has tiles discarded in some embodiments. In other embodiments, tiles are discarded from both bitmaps.

The process 900 identifies (at 950) an offset vector for aligning the two bitmaps of the current resolution. Operation 950 for finding the offset vector is described further as process 1000 of FIG. 10. FIG. 11 conceptually illustrates operation 950 in column 1175. For example, as shown in column 1175, stage 1110, operation 950 evaluates all vectors within one pixel of the origin to find the offset vector that provides the closest alignment between the bitmaps at this resolution (30×20). The arrow in column 1175 at stage 1110 indicates that the closest alignment is generated by offset (1, 1). In the lowest resolution stage 1110, operation 950 aligns bitmaps that are ¹⁄₆₄th the resolution (in each dimension) of the original image. The values of the identified offset vectors double at each stage, therefore the contribution of a candidate offset vector in one stage doubles in every subsequent stage. For example, the selected candidate offset vector in stage 1110, column 1180 is (1, 1). This vector doubles in each subsequent stage (6 times), making its total contribution to the final offset vector (64, 64). Similarly, the selected candidate offset vector in stage 1120 (−1, −1) doubles 4 times making its total contribution to the final offset vector a vector of (−16, −16).

Effectively, in terms of the actual offset vector between the full resolution (1920×1280) images, in stage 1110, operation 950 finds that the offset between the two full resolution images is (64, 64) (i.e., 64 times the identified offset vector). The offset (64, 64) is a rough determination that will be refined in the later stages. For example, operation 950 in stage 1115 could change the offset vector by 0 or ±32 in each direction (vertical and horizontal); in stage 1120, it could change the offset vector by 0 or ±16 in each direction, and so on until stage 1140 that can change the offset vector by 0 or ±1 in each direction. Accordingly, assuming a full range of possible offsets in the later stage, rather than the specific offset vectors shown in FIG. 11, given an offset of (1, 1) at the lowest resolution, in later stages, operation 950 could find a final offset for the images of between 1 and 127 pixels in the horizontal direction and between 1 and 127 pixels in the vertical direction. Similarly, in stage 1115, operation 950 aligns bitmaps that are 1/32nd the resolution (in each dimension) of the actual image. In terms of the actual offset vector between the full resolution (1920×1280) images, in stage 1115, operation 950 finds that the offset between the two full resolution images is (96, 64) (i.e., 32 times the identified offset vector). The offset (96, 64) is still a rough determination that will be refined in the later stages 1120-1140. The later stages could adjust either value of the vector up or down by up to 31 pixels. Assuming a full range of possible offsets in the later stage, rather than the specific offset vectors shown in FIG. 11, given that the offset is (3, 2) at this resolution (60× 40) the process 900 in the later stages could find a final offset for the images of between 33 and 95 pixels in the horizontal direction and between 65 and 127 pixels in the vertical direction.

Once an offset vector has been found at a given resolution, process 900 determines (at 960) whether more bitmaps remain to be aligned. If the process determines (at 960) that more bitmaps need to be evaluated, then the process selects (at 970) the next lowest resolution bitmap as the current bitmap. For example, in FIG. 11, after stage 1110, operation 970 selects the next lowest resolution bitmaps, 60×40. The process then doubles (at 980) the offset vector identified in operation 950 to use as a starting point for evaluating candidate offset vectors for the bitmaps with the new resolution. For example, in FIG. 11, the offset vector (1, 1) in stage 1110, column 1180 is doubled from (1, 1) to (2, 2) in column 1170 of stage 1115. In each stage, the starting offset vector is twice the new offset vector from the preceding stage to account for the fact that the resolution of a stage is twice the resolution of the preceding stage. Effectively, every coordinate of the bitmap doubles from one resolution to the next and the new starting offset vector doubles accordingly.

If the process determines (at 960) that no more bitmaps need to be evaluated (i.e., when the most recently compared bitmaps were the full resolution bitmaps), the process 900 has found the offset vector that will align the two original images. For example, in FIG. 11, after stage 1140, there are no more bitmaps to evaluate. Accordingly, the offset vector in stage 1140, column 1180, specifically (87, 48) is the offset vector that aligns the two images. With the images successfully aligned, the process 900 then ends.

As mentioned above, operation 950, which aligns a particular pair of bitmaps at a given resolution is shown in more detail in FIG. 10. FIG. 10 illustrates a process 1000 for finding an offset vector for aligning two bitmaps. The process 1000 compares pixels of the two bitmaps, as shifted by various candidate offset vectors (and a starting offset vector, if any), and finds which candidate offset vector produces the closest alignment. The process 1000 is part of process 900 of some embodiments.

The process 1000 selects (at 1010) a candidate offset vector. The candidate offset vector is a vector selected from a set of possible offset vectors. The possible offset vectors are all vectors offset from the origin by zero or plus or minus one pixel vertically and by zero or plus or minus one pixel horizontally. The candidate offset vectors are (−1, −1), (−1, 0), (−1, 1), (0, −1), (0, 0), (0, 1), (1, −1), (1, 0), and (1, 1). The candidate offset vectors are illustrated in column 1175 of FIG. 11.

The process adds (at 1020) the candidate offset vector to a starting offset vector to generate a combined vector. The starting offset vector is the offset vector found by process 1000 as aligning the bitmaps of the previous resolution (if any). In FIG. 11, in stage 1110, the lowest resolution bitmaps are aligned. There is no previous resolution, so the starting offset vector is (0, 0). In the first stage with a non-zero starting offset vector (i.e., stage 1115) the process 1000 evaluates all possible offset vectors within one pixel of the starting offset vector (2, 2). That is, in stage 1115, the process 1000 tests vectors (1, 1), (1, 2), (1, 3), (2, 1), (2, 2), (2, 3), (3, 1), (3, 2), and (3, 3).

As mentioned above, the arrows (and the circle in stage 1130) in column 1175 conceptually identify which candidate offset vector produces the least number of differences when comparing the two bitmaps in the example shown in FIG. 11. The arrow in column 1175 in stage 1115 indicates that the closest alignment is generated when candidate offset vector (1, 0) is added to the starting offset vector (2, 2). When candidate offset vector (1, 0) is added to starting offset vector (2, 2), the result is an offset vector (3, 2), as shown in column 1180 in stage 1115.

The process then compares (at 1030) the two bitmaps using the combined vector as a test offset vector. The comparison systematically compares each pixel in every non-discarded tile in the tiled bitmap with the corresponding pixel in the target bitmap. The corresponding pixel in the target bitmap is the pixel whose coordinates in the target bitmap are offset by the test offset vector from the coordinates of the pixel in the tiled bitmap. For example, with a test offset vector of (25, 30), a pixel at coordinates (x, y) of the tiled bitmap will be compared to a pixel at coordinates (x+25, y+30) of the target bitmap. An XOR operation is used in some embodiments to compare two 1-bit values (e.g., the values of pixels in the two bitmaps) to find out whether they are different from each other. If the pixels being compared are different (i.e., one pixel is black and the other pixel is white), then the XOR operation produces an output of one, if the pixels are the same (i.e., both pixels are black or both pixels are white), then the XOR operation produces an output of zero. For each test offset vector, the process 1000 of some embodiments counts the number of corresponding pixels that are different from each other. The closer the test offset vector is to the actual offset between the two bitmaps, the smaller the number of pixels in the two bitmaps that are different from the tiled bitmap to the (shifted) target bitmap.

In comparing the bitmaps by counting how many pixels are different from one bitmap to the (shifted) other bitmap, the process 1000 of some embodiments does not include the pixels in the discarded tiles in the comparison. Only pixels that are in tiles with a significant presence (e.g., more than 5% in some embodiments) of both black and while pixels are included in the comparisons. In some embodiments that discard tiles from only one of the bitmaps, the non-discarded tiles from the tiled bitmap specify which pixels will be compared. For example, with a test offset vector of (25, 30), a pixel at coordinates (x, y) of the tiled bitmap will usually be compared to a pixel at coordinates (x+25, y+30) of the target bitmap. However, if coordinates (x, y) lie within a discarded tile of the tiled bitmap the pixel of the tiled bitmap at those coordinates will not be compared with any pixel of the target bitmap. In other words, when the coordinates (x, y) lie within a discarded tile of the tiled bitmap, then the process of some embodiments will simply not run a comparison of the pixel at (x, y) of the tiled bitmap with the pixel at (x+25, y+30) of the target bitmap or any other pixel of the target bitmap.

In some embodiments, the reason for discarding the tiles that are almost all black or almost all white is that those tiles do not significantly affect the results. For example, if an all white tile is in an all white region, then any small offset would align the white pixels in that tile with another set of all white pixels in the corresponding region of the other bitmap. If each of the candidate vectors would cause that white tile to be compared to a different set of all white pixels, then comparisons of the pixels in the white tile with corresponding pixels in the target bitmap would not provide any data that could be used to differentiate the offset vector from the other candidate vectors.

The process stores (at 1040) a value determined by the number of pixels found to be different from one bitmap to the other with the given test offset vector. In some embodiments, the value is simply the number of pixels that are different. In other embodiments, the value is not the actual number of pixels that are different, but is derived from the number of pixels that are different.

The process then determines (at 1050) whether more candidate vectors need to be evaluated. If more candidate vectors need to be evaluated, then the process returns to 1010 and selects a new candidate vector. If all candidate vectors have been evaluated, the process identifies (at 1060) the candidate vector that provides the best alignment of the bitmaps based on the stored values for each. For example, in some embodiments, the candidate vector that resulted in the lowest number of differences between the tiled bitmap and the shifted target bitmap is identified as the candidate vector that provides the best alignment. The best candidate vector is added (at 1070) to the starting offset vector to provide a new offset vector. The process 1000 then ends and process 900 resumes at 960.

The next highest resolution pair of bitmaps represents the same image as the current resolution, but at a finer scale. Because of the finer scale, the new offset vector does not identify the exact offset of the next highest resolution pair of bitmaps. However, finding the new offset vector that best aligns bitmaps at one resolution narrows down the range of offset vectors that could possibly provide the best alignment of the bitmaps at the next highest resolution. In embodiments that double the resolution at each level, the precision of an alignment at a given resolution is only half the precision of an alignment at the next highest resolution. The new offset vector identified by process 1000 is accurate to within less than one pixel at the current resolution. Accordingly, when the new offset vector is scaled up to the next resolution (e.g., in operation 980), the uncertainty in the value of the alignment scales up as well. That is, if the next resolution is twice as high as the current resolution, then the starting offset vector will be within less than two pixels (in each direction) of the actual offset at that resolution. The set of all offset vectors that are less than two pixels away from the starting offset vector includes nine vectors. Specifically, the nine vectors are the vector sums of the starting offset vector and the nine candidate offset vectors.

The starting offset vector for each resolution is derived from the new offset vector that aligns the two bitmaps at the next lowest resolution. There is no next lowest resolution for the lowest resolution bitmaps. Accordingly, the process 1000 doesn't have a starting offset vector when it is aligning the lowest resolution bitmaps. For the lowest resolution bitmaps, the range of possible offsets has not been narrowed, therefore, the offset vector that aligns the bitmaps at the lowest resolution may be more than one pixel away from the starting point of the search. Accordingly, in some embodiments, the process 1000 evaluates a larger range of candidate offset vectors for the lowest resolution bitmaps than for the higher resolution bitmaps.

Depending on which candidate vectors are chosen at each stage, in an embodiment with 6 levels of decimation, the possible values of the offset vectors found by the hierarchical search of process 900 are from −127 to 127 horizontally, and −127 to 127 vertically. Each successive stage narrows down the range of possible offset vectors by approximately a factor of two. A value of 127 for the horizontal component of the offset will be reached if the candidate offset vector selected at each level has a value of 1. In such a case, the lowest resolution level contributes 64 pixels to the total; the next lowest resolution level contributes 32 pixels to the total, and so on until the highest resolution level contributes 1 pixel to the total.

While the preceding description included 9 candidate vectors at each resolution, one of ordinary skill in the art will understand that other embodiments use different numbers of candidate vectors. Some embodiments decimate by factors other than 2. In such embodiments, the number of candidate vectors increases to compensate for the larger increase in resolution when going from a lower resolution to a higher resolution. For example the images are decimated by a factor of 4 in each direction in some embodiments. In some such embodiments, the starting offset vector is scaled by a factor of 4 (from one resolution to the next) and the candidate vectors include all vectors within 3 pixels of the starting offset vector. Some such embodiments use 49 candidate vectors.

While the preceding description included discarding predominantly white tiles and predominantly black tiles at every resolution level, some embodiments discard tiles only at higher resolution levels. At low resolutions, the number of pixels in an image is smaller, so eliminating tiles is more likely to affect the outcome of the search. Additionally, the search for offset vectors that align low resolution bitmaps is reasonably fast even without discarding tiles. Due to the increased risk of error when discarding tiles at low resolutions, and the decreased benefit to the speed of the search for offset vectors, some embodiments discard tiles only for bitmaps above a certain resolution level. For example, some embodiments discard tiles only for bitmaps generated from images with 5 levels of decimation. Similarly, some embodiments discard tiles only for bitmaps generated from images with 4, 3, 2, 1, or 0 level(s) of decimation. Some embodiments that discard tiles only for higher resolution images do not tile the lower resolution bitmaps. Some such embodiments compare the entire bitmaps at low resolution levels. Some embodiments exclude pixels near one or more edges of one or more of the bitmaps in order to compare the same number of pixels for each offset.

V. Image Processing: HDR Image Generation and Scaling

A. Introduction

In photography, different scenes are photographed for different exposure durations. Long exposure durations provide a high level of detail for dim objects. Short exposure durations provide a high level of detail for bright objects. However, an exposure time that is not matched to the brightness of an object being photographed can create poor results. For example, when taking an image of a bright object, too long an exposure duration results in the saturation of the sensors on which the image of that bright object is focused. Detail is lost in that case because any light level above the saturation level simply appears as white (with the maximum value). When all pixels appear white, the differences in light levels that would otherwise provide details are not captured. Another example of poor results comes from taking an image of a dark object with too short an exposure duration. Too short an exposure duration provides inadequate light for the sensitivity of the sensors on which the image of the dark object is focused. The detail is lost because the sensors can't accurately identify small percentage differences in the already small amount of light received. Because different scenes look better with different exposure times, photographers and automatic cameras adjust exposure times to compensate for lighting conditions. The mobile devices of some embodiments also adjust exposure times in accord with the lighting conditions of the scenes they are photographing. Long exposure times are used to capture the detail of dark scenes; short exposure times are used to capture the detail of bright scenes; and medium exposure times to capture the details of scenes that are between bright and dark (midtones).

However, when one scene includes bright and dark objects as well as midtone objects, an exposure time long enough to capture the details of the dark object will leave the bright object saturated in the image and the midtone objects overly bright. An exposure time short enough to capture the details of the bright object will leave the dark object mostly black and the midtone objects too dark. An exposure time just right to catch the midtone items will leave the dark objects too dark and the bright objects too bright.

To avoid the saturation of bright objects and low detail of dark objects, some embodiments take three images at different exposures (overexposed, underexposed and normally exposed) and composite the images in a way that emphasizes the details in each of the exposures that that particular exposure captures well. The overexposed image shows good detail in the dark areas; therefore the composite is weighted toward using pixels from the overexposed image to generate pixels in the dark areas of the image. The underexposed image shows good detail in the bright areas; therefore the composite is weighted toward using pixels from the underexposed image to generate pixels in the bright areas of the image. The normally exposed image shows good detail in the midtone areas; therefore the composite is weighted toward using pixels from the normally exposed image for the midtone areas of the image.

After aligning the images, as described in section IV, the image processing module of some embodiments performs the compositing of the three aligned images to produce a composite HDR image. In different embodiments, the image processing module uses different techniques to composite the three images. Some embodiments composite the three images by performing separate sets of operations for a luma channel of these images than for the chroma channels of these images. In some embodiments, the separate operations on the chroma channel images are the same as or similar to the operations on the luma images. Also, in generating the HDR composite image, some embodiments might produce luma and chroma values that exceed a desired range of values. Accordingly, while generating the HDR image, some embodiments concurrently perform scaling operations to ensure that the luma and chroma values of the HDR image are generated within their desired ranges. In some embodiments, the generation of a final HDR image is conceptually divided into HDR capturing operations and HDR rendering operations. In the HDR capturing operations, an initial HDR image is generated from multiple images taken with different exposure times. In the HDR rendering operations of some embodiments, the initial HDR image is adjusted by one or more operations including boosting the image's shadows, attenuating the image's highlights, histogram stretching of the image, and chroma saturation of the chroma components of the image.

To identify which areas of each image should be used to generate the corresponding areas of a composite luma image, some embodiments generate three masks. The three masks correspond to the three exposure levels. To identify the areas of each exposure to use in the composite, each mask provides a weighting factor at each point of its corresponding exposure. In some embodiments, the normally exposed image is used to identify bright, dark, and midtone areas of the image in order to generate the three masks. A composite image is then generated, pixel by pixel, using the masks as a weighting factor for each pixel. A high value in a particular mask for a particular pixel means that the pixel in the exposure corresponding to that mask will strongly influence the corresponding pixel in the composite image. A low value in a particular mask for a particular pixel means that the pixel in the exposure corresponding to that mask will weakly influence the corresponding pixel in the composite image. At the extreme ends of the scale, a value of one for a particular pixel in a mask of a particular exposure means that the value of the corresponding pixel in the composite will entirely depend on the value of the corresponding pixel in that exposure. Similarly, a value of zero for a particular pixel in a mask of a particular exposure means that the value of the corresponding pixel in the composite will not depend at all on the value of the corresponding pixel in that exposure.

While the masks weight the individual pixels, some embodiments also weight all pixels in each image by a factor that compensates for the relative exposure times of each exposure. In some embodiments, the exposure times used in these calculations are provided by the camera of the mobile device.

In some embodiments, to make the colors scale properly with the luma values, the chroma values of the images are also composited with a similar weighting scheme as the luma values. That is, the chroma channels (Cb and Cr) of the exposures are composited with the same masks and scaling as the luma channels of the exposures. The colors of the midtones of the image are enhanced in some embodiments, either during the compositing or after the compositing.

B. Compositing Luma or Luminance

The mobile devices of some embodiments generate HDR images by compositing multiple images taken at different exposures. Compositing the images in some embodiments, generates an image in which the value of each pixel is a weighted average of the values of corresponding pixels in each of the three images. In some embodiments, the composite is a weighted average of luma components of the images. In other embodiments, the composite is a weighted average of luminance components of the images. That is, various embodiments composite images in various different image formats. Some embodiments perform all operations on images in a luma (Y') format. In other embodiments, all operations are performed on images in a luminance (Y) format. In still other embodiments, the mobile devices start with images in a luma (Y') format and convert the luma (Y') components to luminance (Y) components, then perform operations on the luminance (Y) components. After luminance images are composited, the mobile devices of some embodiments convert the resulting composite images from luminance (Y) to luma (Y'). The following description identifies some places in the compositing process where such conversions can take place; however, one of ordinary skill in the art will understand that in other embodiments, the conversions can take place during other parts of the process.

Figure 12:
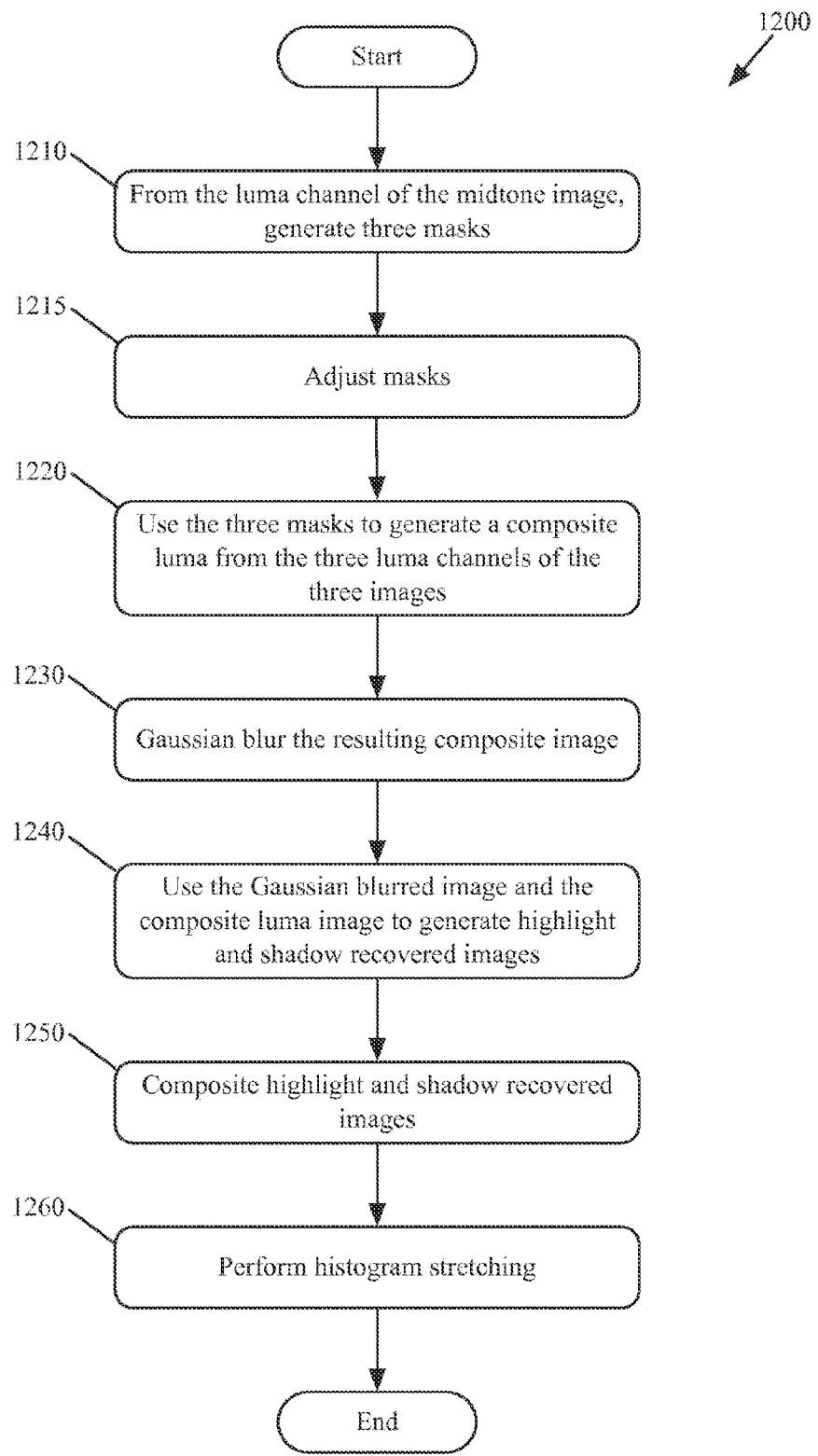
FIG. 12 illustrates a process for compositing the luma channel images of three different exposures of the same scene and adjusting various luma values of the resulting composite image.

FIG. 12 illustrates a process 1200 for compositing the luma channel images of three different exposures of the same scene and adjusting various luma values of the resulting composite image. Process 1200 is performed each time the compositing module 120 receives three (in some embodiments cropped) images from the alignment module 115. This process will be described by reference to FIG. 13A, which illustrates an example of performing the process 1200 on a particular scene. The process 1200 is explained with references to items in FIG. 13A, however one of ordinary skill in the art will understand that this is for ease of explanation and that the calculations are not limited to the particular scene in that figure.

Figure 13A:
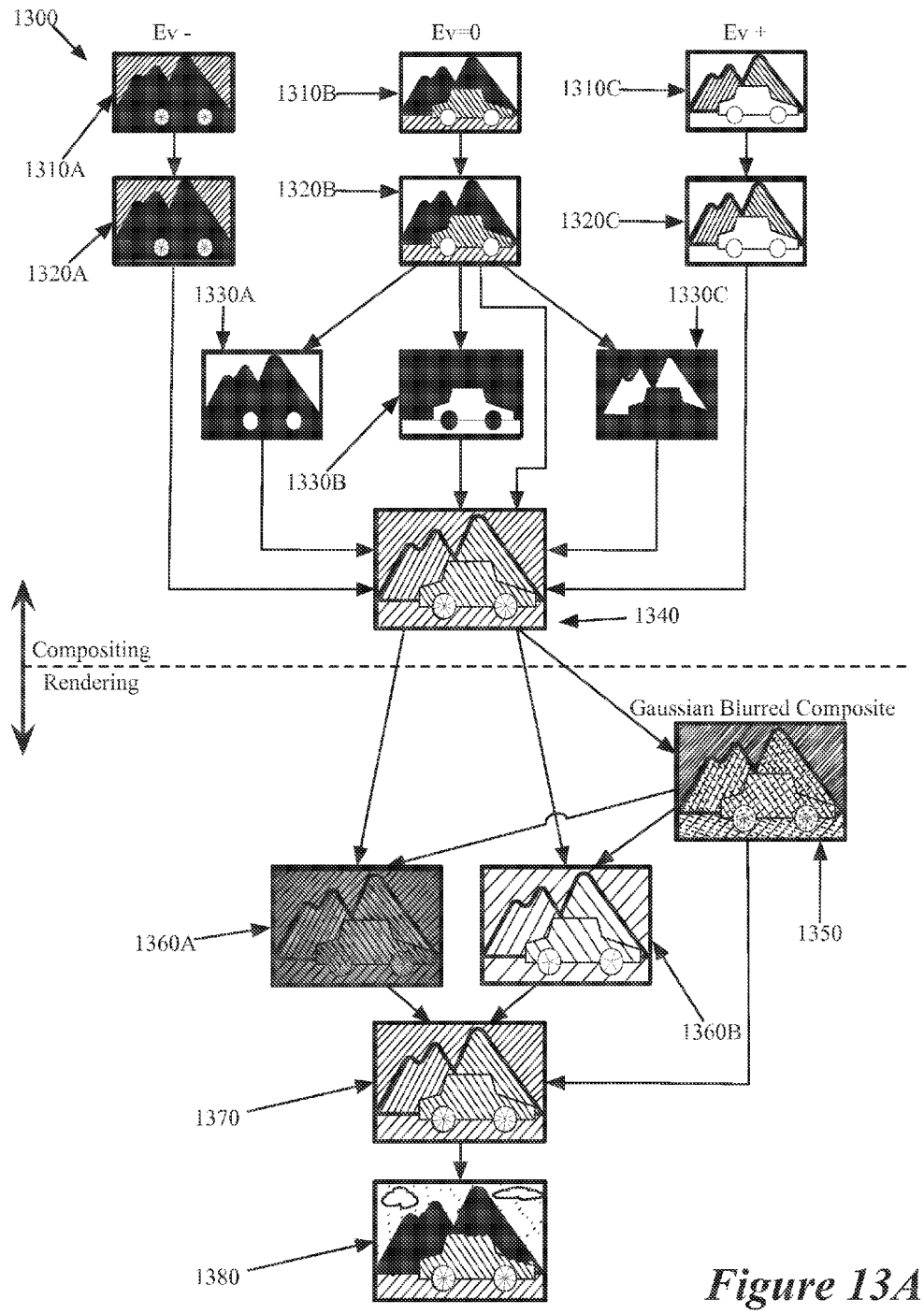
FIG. 13A illustrates an example of performing a compositing process on a particular scene.

The scene in FIG. 13A is a car sitting on a mountain road. The scene includes a bright sky and backlit mountains that are dark as well as a car and road that are midtoned. FIG. 13A includes three images (e.g., color images) taken at different exposures 1310A-1310C, the luma channel images (sometimes referred to as luma images) 1320A-1320C of each of the images, masks 1330A-1330C, composite luma image 1340, Gaussian blurred composite 1350, highlight-attenuated image 1360A and shadow-enhanced image 1360B, composite image 1370 and final luma image 1380. The three images taken at different exposures 1310A-1310C represent the color images taken at different exposure levels. Image 1310A is the underexposed image, 1310B is the normally exposed image, and 1310C is the overexposed image. In some embodiments, image 1310A is exposed for ¼ as long as image 1310B, and image 1310C is exposed for 4 times as long as image 1310B. The exposure time ratios may be numbers other than 4 in the same embodiment or in other embodiments. The luma channel images 1320A-1320C represent only the luma information of the color images 1310A-1310C. In some embodiments, the luma channel data is provided separately from the chroma channel data, while in other embodiments, the luma channel data is extracted from the color images.

As described in relation to FIG. 1, the mobile device of some embodiments generates the three images (e.g., images 1310A-1310C) using different exposure times for each image. In some embodiments, these exposure times are measured in terms of the exposure value compensation (EV). For a given aperture of a camera on a mobile device, the amount of exposure time is proportional to 2 to the power of the EV. For example, an EV of 3 increases the exposure time by a factor of 8. In some embodiments, relative to the normally exposed image, the overexposed image is shot with an EV of +2 and the underexposed image is shot with an EV of −2. In such embodiments, the overexposed image is exposed for 4 times as long as the normally exposed image and the underexposed image is exposed for ¼ as long as the normally exposed image. Various embodiments use different EV values than plus or minus 2. Some embodiments adjust EVs for different lighting conditions. For example, some embodiments determine which exposure values to use based on a histogram of the normally exposed image (e.g., a histogram generated from a normally exposed preview image). Some such embodiments maintain a constant difference between EV+ value and the EV− value. In some embodiments, the EV of the overexposure can be a different magnitude from the EV of the underexposure in some lighting conditions. For example, some embodiments use EV−3 and EV+1 for the underexposed and overexposed images respectively in very bright scenes. Some embodiments use EV−1 and EV+3 for the underexposed and overexposed images respectively in very dark scenes.

The compositing process 1200 of FIG. 12 initially performs the HDR capture operations, beginning with three luma images taken with different exposure times (e.g., luma images 1320A-1320C). The process generates (at 1210) three masks, corresponding to the three luma images 1320A-1320C, from the normally exposed luma image 1320B. The normally exposed luma image 1320B is used to identify which parts of the scene being photographed are bright, which parts are midtoned, and which parts of the scene are dark. In FIG. 13A, the bright areas of the normally exposed luma image 1320B include the sky and the wheels of the car, the dark areas include the mountains, and the midtone areas include the body of the car and the road. The masks are a set of weights for compositing the pixels. In some embodiments, each mask has the same resolution as the images to be composited. The masks can be represented as an image, and it is convenient to describe the values in a mask as pixel values, however the data in the masks is intended for use in compositing calculations, not primarily for visual display.

The three masks correspond to the three luma images 1320A-1320C. The underexposed luma image 1320A provides the best detail in bright areas. Therefore, the mask 1330A for the underexposed luma image 1320A has high values for pixels that correspond to bright pixels in the normally exposed luma image 1320B and low values for pixels that correspond to medium and dark pixels in the normally exposed luma image 1320B. The overexposed luma image 1320C provides the best detail in dark areas. Therefore, mask 1330C for the overexposed luma image 1320C has high values for pixels that correspond to dark pixels in the normally exposed luma image 1320B and low values for pixels that correspond to medium and bright pixels in the normally exposed luma image 1320B. The normally exposed luma image 1320B provides the best detail in midtone areas. Therefore, mask 1330B for the normally exposed luma image 1320B has high values for pixels that correspond to midtone pixels in the normally exposed luma image 1320B and low values for pixels that correspond to bright and dark pixels in the normally exposed luma image 1320B.

Some embodiments provide masks with a range of values to blend the pixels from different luma images 1320A-1320C, rather than using separate pixels from each image. The higher the value of a pixel in a mask, the more influence the corresponding pixel in the corresponding image has on the value of the corresponding pixel in the composite image. For ease of identification of the areas of each image, the masks 1330A-1330C only have black areas and white areas in FIG. 13A, however a visual representation of the masks of some embodiments would include grey pixels. Such grey pixels would represent pixels that influence, but do not completely determine, the value of the corresponding pixel in the composite image.

The following equations (1)-(3) are used in some embodiments to generate the masks. These equations result in three curves based on hyperbolic tangents that provide three sets of weighting values that provide an initial bias to composite the HDR image by taking details of dark areas from the overexposed image, taking details of bright areas from the underexposed image, and taking details of midtones from the normally exposed image, as mentioned above. Instead of using equations/curves based on hyperbolic tangents, other embodiments use other types of sigmoidal or other non-linear functions/curves to specify the masking values used for selectively weighting the images to produce a composite image.

The equations herein follow a convention that each variable is represented by a single capital letter, in some cases the capital letter is followed by a single lower case letter, especially when variables that serve the same function for different masks or images are being used. Variables that have different values for different individual pixels in the images are denoted by a [x,y] following the initial letters to indicate that their value in the equation is determined on a per pixel basis with the x and y representing the coordinates of the pixel in the image. The variables with different values for different pixels are calculated for each pixel over the entire range of pixels in the image. The equations are explained with references to items in FIG. 13A, however one of ordinary skill in the art will understand that this is for ease of explanation and that the calculations are not limited to the particular scene in that figure.

In some embodiments, the values of the pixels in the masks 1330A-1330C are generated using the following equations:

$$Mb[x,y]=0.5*(\tan h(-Sb*(Ln[x,y]-Tb))+1) \quad (1)$$

$$Mu[x,y]=0.5*(\tan h(Su*(Ln[x,y]-Tu))+1) \quad (2)$$

$$Mn[x,y]=1-Mb[x,y]-Mu[x,y] \quad (3)$$

In equation (1), Mb[x,y] represents the value of the overexposure mask 1330C at coordinates [x,y] and is a function of the luma value Ln[x,y] of the corresponding pixel of the normally exposed luma image 1320B. Tb is a threshold luma value for the overexposed image. Sb affects the slope of the function. In any equation in which it appears herein, tan h is the hyperbolic tangent. Instead of performing a tan h calculation in real-time, some embodiments use a look-up table to identify values produced by tan h for a given input. Some embodiments use look-up tables in place of other calculations instead of, or as well as, tan h.

In equation (2), Mu[x,y] represents the value of the underexposure mask 1330A at coordinates [x,y]. Like Mb[x,y], it is also a function of the luma value Ln[x,y] of the corresponding pixel of the normally exposed luma image 1320B. Tu is a threshold luma value for the underexposed image. Su affects the slope of the function. In equation (3), Mn[x,y] represents the value of the normal exposure mask 1330B at coordinates [x,y].

The purpose of the overexposure mask 1330C, is to increase the influence of the pixels in dim areas (where the overexposed luma image 1320C provides good detail) and increase the influence of the pixels in bright areas (where the overexposed luma image 1320C is most likely saturated). Accordingly, in equation (1), the weighting of a pixel from overexposed luma image 1320C is a smooth, decreasing function of the luma value of the corresponding pixel in the normally exposed luma image 1320B. Sb has a negative sign in front of it, indicating that positive values of Sb, as used in some embodiments, will result in a function that decreases with luma value. For a positive value of Sb, the brighter a pixel in the normally exposed luma image 1320B is, the less weight is given to the corresponding pixel in the overexposed image when generating the composite image.

As mentioned above, Tb is a threshold luma value for the overexposed image. When a pixel in the normally exposed luma image 1320B has a value below Tb (darker than threshold), the corresponding pixel of overexposure mask 1330C has a value of more than ½. When a pixel in the normally exposed luma image 1320B has a value of Tb (at threshold), the corresponding pixel of overexposure mask 1330C has a value of ½. When a pixel in the normally exposed luma image 1320B has a value above Tb (brighter than threshold), the corresponding pixel of overexposure mask 1330C has a value of less than ½. In some embodiments, the value of Tb is determined by dividing 0.015 by the median value of the luma of the pixels in the normally exposed luma image 1320B. For example, if the median value for the lumas of the pixels in normally exposed luma image 1320B is 0.1, then the value of Tb would be 0.15. In some embodiments, the value of Tb is determined by dividing 0.02 (or some other value) by the median value of the luma of the pixels in the normally exposed luma image 1320B. Some embodiments have different ways of calculating Tb depending on characteristics of the images. For example, some embodiments calculate Tb based on the average (mean) luma of a luma image (e.g., 1320B) rather than from the median luma.

Sb determines how quickly the function Mb[x,y] changes around the threshold value Tb. A very high value for Sb, results in a rapid change. For a high value of Sb, pixels in the normally exposed luma image 1320B with a luma value just above the threshold Tb will result in the corresponding pixel in the mask 1330C having a very low value. The low value of the pixel in the mask means that the corresponding pixel in the overexposed luma image 1320C will have almost no influence on the value of the corresponding pixel of the composite image 1340. Pixels in the normally exposed luma image 1320B with a luma value just below the threshold will result in the corresponding pixel in the mask 1330C having a very high value (with a maximum of 1). The value of the corresponding pixel in the overexposed luma image 1320C will almost entirely determine the value of the corresponding pixel of the composite image 1340. In contrast, a low value of Sb will result in a gradual shift in influence when crossing the threshold. For a low value of Sb, pixels in the normally exposed luma image 1320B with a luma value just below the threshold will result in the corresponding pixel in the mask 1330C having slightly more than 50% influence on the corresponding pixel of the composite image 1340. For a low value of Sb, pixels in the normally exposed luma image 1320B with a luma value just above the threshold will result in the corresponding pixel in the mask 1330C having slightly less than 50% influence on the corresponding pixel of the composite image 1340. In some embodiments, the value of Sb is 10.

The purpose of the underexposure mask 1330A, is to increase the influence of the pixels in bright areas (where the underexposed luma image 1320A provides good detail) and decrease the influence of the pixels in dim areas (where the underexposed luma image 1320A is most likely too dark to show details). Accordingly, in equation (2) the values of the pixels in the underexposure mask 1330A should be an increasing function of the luma value of the corresponding pixel in the normally exposed luma image 1320B. The slope determiner Su does not have a minus in front of it, therefore positive values of Su result in a positive function of luma. The threshold Tu in equation (2) is different from the threshold Tb in equation (1). In some embodiments, the value of Tu is determined by multiplying the median luma value of the normally exposed luma image 1320B by 6 (or some other value). In some embodiments, when the product of the median luma value and the factor (e.g. 6) is greater than 1, the value of Tu is set to 1. Some embodiments have different ways of calculating Tu depending on characteristics of the images. Similar to the case for Sb, the magnitude of Su determines how fast the influence (on the composite image 1340) of the pixels of the underexposed luma image 1320A changes as a function of the luma value of the corresponding pixel in the normally exposed luma image 1320B. A high value for Su provides for a rapid change from no influence to large influence as the luma value of the pixels of normally exposed luma image 1320B go from below the threshold Tu to above the threshold. A low value for Su provides for a gradual change from no influence to large influence as the luma value of the pixels of normally exposed luma image 1320B go from below the threshold Tu to above the threshold.

The pixels of the normal exposure mask 1330B have a value of 1 minus the values of the corresponding pixels in the other masks 1330A and 1330C. The normal exposure mask 1330B has higher values where both the other masks have lower values and lower values where either of the other masks (or their aggregate) have higher values. For example, assuming that Su value is equal to the Sb value used to generate the other masks, the combined values of the other two masks is lowest for pixels at the average value of Tb and Tu. Therefore, normal exposure mask 1330B has its highest value for pixels in corresponding to pixels in normally exposed luma image 1320B with luma values at the average value of Tb and Tu.

A visual representation of a mask that has a gradual transition (e.g., with a low magnitude of Su or Sb) from one mask dominating the value of a pixel to another mask dominating the value of the pixel would contain grey areas corresponding to areas of the composite that were influenced partly by one mask and partly by another mask. In contrast, a visual representation of a mask that has abrupt transitions (e.g., with a high magnitude of Su or Sb) from one mask to another would be almost entirely black pixels and white pixels, with few grey pixels (if any). The masks 1330A-1330C were generated using very high values of Su and Sb, therefore they have no grey pixels. A pixel in the normally exposed luma image 1320B that is any dimmer than the threshold Tb results in a white pixel in the overexposure mask 1330C. A pixel in the normally exposed luma image 1320B that is any brighter than the threshold Tb results in a black pixel in the overexposure mask 1330C. A pixel in the normally exposed luma image 1320B that is any dimmer than the threshold Tu results in a black pixel in the underexposure mask 1330A. A pixel in the normally exposed luma image 1320B that is any brighter than the threshold Tu results in a white pixel in the overexposure mask 1330A. A pixel in the normally exposed luma image 1320B that is between the thresholds Tu and Tb results in a white pixel in the normal exposure mask 1330B. A pixel in the normally exposed luma image 1320B that is not between thresholds Tu and Tb results in a black pixel in the normal exposure mask 1330B. In sum, the underexposure mask 1330A provides the entire weight (in the composite) of the bright pixels, the normal exposure mask 1330B provides the entire weight of the midrange pixels, and the overexposure mask provides the entire weight of the dark pixels. The extreme cutoffs in masks 1330A-1330C are provided because they make it easy to identify the various areas of high and low weight in a black and white figure. However, in embodiments with lower values of Sb and Su, the corresponding masks would include a range of values. In visual terms, the masks would include grey areas that represent shared influence over the luma of the pixel in the composite.

To generate an overexposed image mask, some embodiments adjust the threshold luma value Tb from the value described above. Some embodiments adjust the threshold luma value Tb because the signal-to-noise ratio of the overexposed image decreases with increasing exposure time (e.g., longer exposure times cause more noise in the image). Accordingly, to reduce the noise in the composite image, some embodiments adjust the threshold luma value Tb to include less of the overexposed image in the final composite. In some embodiments, the following equation is used to adjust the threshold $$Tb = Tb * 0.5 * (\tan h(4*(Fb-Ft))+1) \qquad (4)$$

In equation (4), the first Tb is the threshold luma value after adjustment; the second Tb is the threshold luma value before adjustment. Fb is the signal-to-noise ratio in decibels (dB) of the overexposed image. Ft is a threshold signal-to-noise ratio. Signal-to-noise ratios above the Ft threshold increase the threshold luma of the overexposed image, which increases the number of pixels in the overexposed image that have a high influence on the composite image 1340. In some embodiments, Ft is 24 dB. During calibration of the mobile device (or a prototype of the mobile device) in some embodiments, the signal-to-noise ratio is measured for a series of light levels (e.g., 5 light levels). These measured signal-to-noise ratios are used to determine the signal-to-noise ratio for a given image. In some embodiments, the calibration is performed on each mobile device. In other embodiments, the calibration is performed on a sample (one or more) of the mobile devices to determine the calibration points for that type of mobile device, these calibration points are then used for other mobile devices of the same type. Some embodiments have default calibration points but allow new calibration points to be calculated for a particular mobile device. The light level of a particular image is determined by the mobile device when the image is captured. In embodiments with a calibrated mobile device, based on the light level, the signal-to-noise ratio of the image is interpolated from the signal-to-noise ratio of the calibration points.

In some embodiments, masking based on individual pixels can result in a loss of contrast. More detail will be preserved when pixels that don't match the nearby pixels (bright pixels in otherwise dark areas, etc.) are more heavily influenced by the images that provide the best detail for that area, rather than the image that provides the best detail for that pixel value. For example, in such embodiments, the composite value for a dark pixel in a bright background would be most influenced by the corresponding pixel of the underexposed image that is better for providing details for bright pixels (like the background) rather than by the overexposed image, which is better for providing details for dark pixels. Furthermore, compositing without blurring the mask can result in high frequency transitions in the composite between pixels derived from different exposures because the weights are not spatially smooth. Therefore, some embodiments blur the masks to reduce high frequency transitions in the composite by making the weights spatially smooth, in addition to or instead of blurring the masks to improve contrast at the boundaries between light and dark areas. Therefore, in some embodiments, process 1200 adjusts (at 1215) the masks to improve contrast at the boundaries between light and dark areas and/or to reduce high frequency transitions in the composite. Accordingly, the masks of some embodiments are blurred before being applied as weights for the composite image 1340. In some such embodiments, the masks are blurred using a equation such as:

$$Mb[x,y] = \text{filter}(Mb[x,y], k) \qquad (5)$$

$$Mu[x,y] = \text{filter}(Mu[x,y], k) \qquad (6)$$

In equation (5), the first Mb[x,y] represents the mask after the blurring filter is applied; the second Mb[x,y] represents the mask before the blurring filter is applied. The filter in equations (5) and (6) is a 2D filter operation using filter k.

Item k is a 2D Gaussian filter kernel. In some embodiments, a 7×7 or a 9×9 filter kernel is used with a pixel variance of 3. In equation (6), the first Mu[x,y] represents the mask after the blurring filter is applied; the second Mu[x,y] represents the mask before the blurring filter is applied.

The size of the filter kernel (k) can affect the results of the blurring operation. Large values of k can result in large halo effects, but small values of k can result in a loss of contrast within an area. The blurring ensures that the masks will provide weights based on the brightness of the area a pixel is in, rather than providing weights based on the brightness of the individual pixel. In some embodiments, this improves contrast within areas that have pixels from multiple ranges (dark, midtone, and/or bright). Equations (5) and (6) are performed before equation (3), in some embodiments, so that the normal exposure mask 1330B is generated from the blurred masks generated by equations (5) and (6) rather than by the masks generated by equations (1) and (2).

Figure 13B:
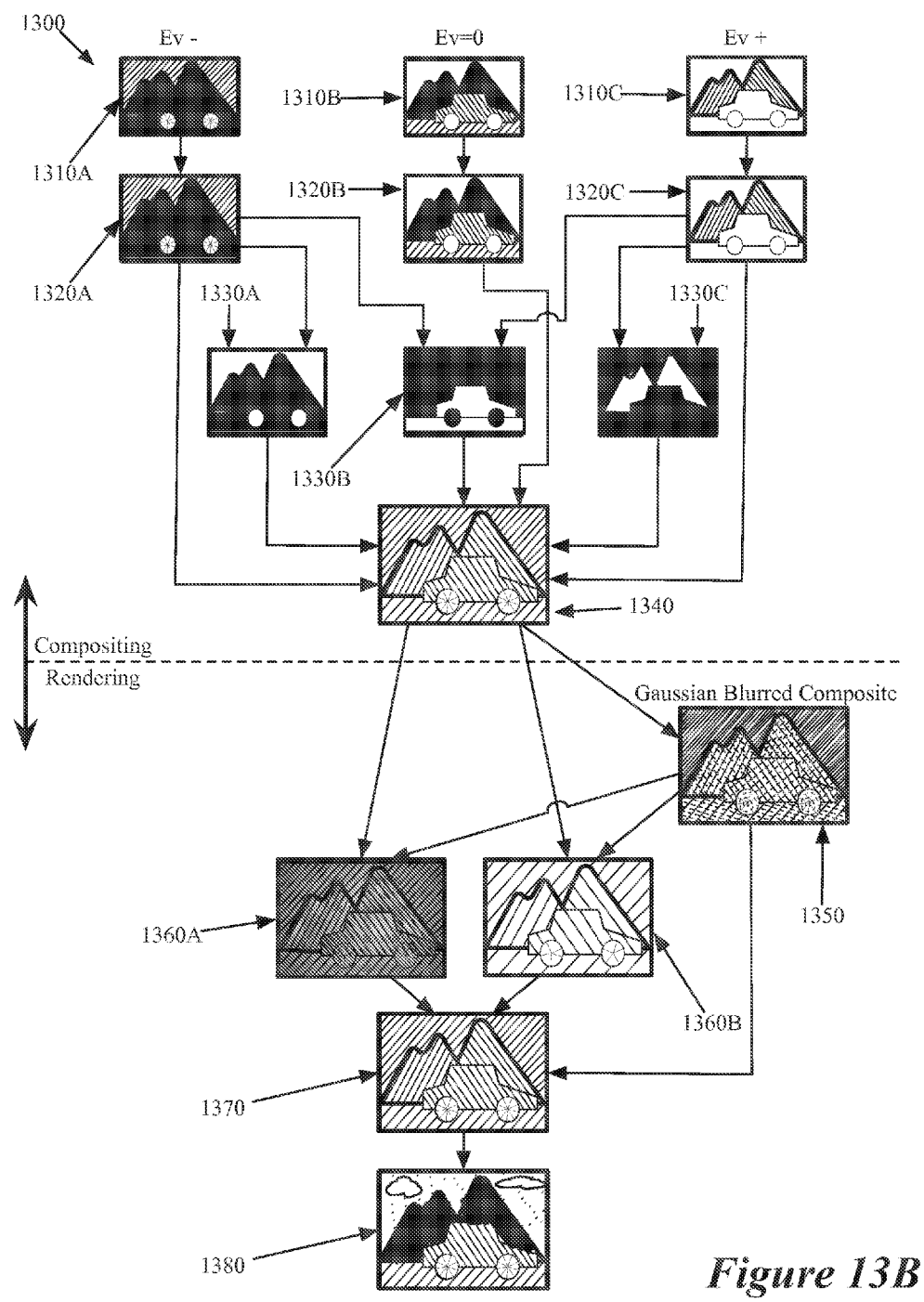
FIG. 13B illustrates an example of performing the compositing process while generating masks from separate images.

The above description of mask generation describes the generation of masks using data from a normally exposed luma image 1320B, but not the other luma images 1320A and 1320C. However, using the normally exposed luma image 1320B to generate all three masks 1330A-1330C can lead to situations where over-blown (e.g., saturated) areas of the overexposed image are used. It can also lead to situations where areas of the underexposed image that are too dark are used. Therefore, in some embodiments, masks generated from luma images are generated using luma values from the overexposed and underexposed images instead of or in addition to luma values from the normal image. FIG. 13B illustrates an example of performing the process 1200 and generating masks 1330A-1330C from each image. In FIG. 13B, the underexposure mask 1330A is generated from the underexposed luma image 1320A, the overexposure mask 1330C is generated from the overexposed luma image 1320C and the normal exposure mask 1330B is generated from the overexposed luma image 1320C and underexposed luma image 1320A. Though FIG. 13B shows the normal exposure mask as being generated using the underexposed luma image 1320A and the overexposed luma image 1320C, in some embodiments, the normal exposure mask 1330B is generated from the underexposure mask 1320A and the overexposure mask 1320C using equation (3). In some embodiments, the normal exposure mask 1330B is generated from the underexposure mask 1320A and the overexposure mask 1320C after the underexposure mask 1320A and the overexposure mask 1320C are blurred.

In some embodiments that generate masks from the underexposed and overexposed images, the masks are generated using similar equations to equations (1)-(6), but with the luma values (Lb[x,y]) from the overexposed images substituting for the Ln[x,y] for the overexposure mask, the luma values (Lu[x,y]) from the underexposed image substituting for the Ln[x,y] for the underexposure mask, and the thresholds adjusted accordingly. In some such embodiments, the threshold values for calculating the overexposure and underexposure masks are derived from the median luma values of the respective images. In other embodiments, the threshold values are derived from the median luma value of the normally exposed image (e.g., in the same way as in the above described embodiments that generate masks from the normally exposed image). In other embodiments, the threshold values are set to default values of 0.4 for Tb (for the overexposure mask) and 0.5 for Tu (for the underexposure mask). In still other embodiments, the threshold values are set to default values of 0.5 for Tb (for the overexposure mask) and 0.5 for Tu (for the underexposure mask).

After the process 1200 has generated (at 1210) the masks (e.g., masks 1330A-1330C). The process then generates (at 1220) a composite luma image (e.g., luma image 1340), which includes details taken from each individual luma exposure (e.g., 1320A-1320C). In composite luma image 1340 the details from the car body and road of normally exposed luma image 1320B, the details from the mountains of the overexposed luma image 1320C, and the details from the sky and wheels of underexposed luma image 1320A are all present. In some embodiments, the luma images 1330A-1330C are composited using the following equation:

$$Lc[x, y] = Eb * Lb[x, y] * Mb[x, y] + \qquad (7A)$$
$$En * Ln[x, y] * Mn[x, y] + Eu * Lu[x, y] * Mu[x, y]$$

In equation (7A), Lc[x,y] is the luma value of the pixel at coordinates [x,y] in the composite image 1340. Lb[x,y] is the luma value of the pixel at coordinates [x,y] in the overexposed (bright) luma image 1320C. Ln[x,y] and Lu[x,y] are the luma values for the normally exposed luma image 1320B and underexposed luma image 1320A, respectively. Eb is an exposure scaling factor for the exposure of the overexposed luma image 1320C. En and Eu are the corresponding scaling factors for the normally exposed luma image 1320B and underexposed luma image 1320A, respectively. Mb[x,y] represents the value of the overexposure mask 1330C at coordinates [x,y]. Mn[x,y] and Mu[x,y] represent the values for the normal exposure mask 1330B and underexposure mask 1330A, respectively. The value of a pixel in the mask 1330C determines how much effect the corresponding pixel in the overexposed luma image 1320C has on the composite image. The value of a pixel in the mask 1330B determines how much effect the corresponding pixel in the normally exposed luma image 1320B has on the composite image. The value of a pixel in the mask 1330A determines how much effect the corresponding pixel in the underexposed luma image 1320A has on the composite image. In each mask 1330A-1330C higher values mean more influence on the composite image.

The exposure scaling factors (Eu, En, and Eb) compensate for the different exposure times of the images (e.g., if the overexposed image has 4 times the exposure time than the normally exposed image then Eb=En/4). The more exposed images have higher luma values because they are exposed longer, not because their data is "better", or because they represent brighter parts of the image. Without compensating for the longer exposure time, the data from the overexposed image would dominate the results more than their informational value would indicate. In some embodiments, the ratio of the exposure times is something other than 4. The ratios of underexposed-duration to normal-exposure-duration are different than the ratios of normal-exposure-duration to overexposed-duration in some embodiments. In such embodiments, the exposure scaling factors would be adjusted to reflect the different ratios of exposure times.

In embodiments that use formats in which the values of the pixels are a linear function of the light that reaches the corresponding sensors, the exposure scaling factors compensate uniformly for the differences in pixel values caused by different exposure times. When the values of the pixels are a linear function of the light that reaches the sensors, then, in the absence of other factors (e.g., varying brightness of the part of the scene captured by a particular sensor), the value of a pixel would be four times greater in an overexposed image with four times the normal exposure time than the value of the corresponding pixel in a normally exposed image of the same scene. In such a format, the pixels in each exposure of the same scene have the same values relative to each other. That is, if one pixel in the normal exposed image is twice the value of another pixel in the normal exposed image, then the pixel of the overexposed image that corresponds to the first pixel in the normal image will have twice the value of the pixel in the overexposed image that corresponds to the second pixel in the normal image.

Some mobile devices capture images in a format that includes a component (e.g., luminance) that is a linear function of the amount of light that reaches the sensors (up to a saturation point). However, some such devices automatically convert the luminance images into luma images using a non-linear transformation (e.g., gamma correction). Because of the non-linear transformation from luminance to luma, luma values are not a linear function of exposure time. The luma values are not a linear function because gamma correction changes the values near the bottom of the luminance range more than values near the middle and high ends of the luminance range. Overexposed images, which are taken with long exposure times, are brighter than normally exposed images and have luminance values that cluster near the top of the luminance range of the camera. Underexposed images, which are taken with short exposure times are darker than average and have luminance values that cluster near the bottom of the luminance range of the camera. The images taken with normal exposures have luminance values that cluster near the middle of the luminance range of the camera. Because of the different levels of brightness of the different exposures, gamma correction can change the relative brightness of corresponding objects in the different exposures differently. Changing the relative brightness of objects in the different exposures affects the results of compositing the images.

Accordingly, to return the images to a format in which the values are a linear function of exposure time, some embodiments reverse the gamma correction of the luma (Y') components of the images to generate luminance (Y) images. Some such embodiments perform operations on the luminance images, then apply a new gamma correction after the operations to produce a final image with a luma (Y') component. The inverse gamma correction is performed during compositing in some embodiments. Some such embodiments generate the composite image using the following equation (7B) rather than using equation (7A)

$$Lc[x, y] = Eb*Lb[x, y]^{\wedge}(1/\gamma)*Mb[x, y] +$$
$$En*Ln[x, y]^{\wedge}(1/\gamma)*Mn[x, y] + Eu*Lu[x, y]^{\wedge}(1/\gamma)*Mu[x, y] \quad (7B)$$

Equation (7B) is almost the same as equation (7A), except that the luma values Lb[x,y], Ln[x,y], and Lu[x,y] have been raised to the power of (1/γ). And the Lc[x,y] values are luminance values rather than luma values. In some embodiments, the mobile device provides luma values that are based on luminance values of a captured image raised to the power of gamma (γ) (in some embodiments, gamma is equal to 1/2.2). The mobile devices of some embodiments provide the value of gamma as metadata of the provided images. In some such embodiments, the provided gamma is used in the equation (7B) to recreate the original luminance values while the images are being composited. Other such embodiments perform the inverse gamma correction before compositing the images and use equation (7A) on luminance values generated in a separate operation from the compositing operation.

Similarly, while the above equations are described in terms of masks generated from luma images, one of ordinary skill in the art will understand that the masks of some embodiments are generated from images in other formats. For example, in some embodiments the masks are generated from luminance versions of one or more of the images, rather than luma versions. In some embodiments, the type of image used to generate the masks (e.g., luma or luminance) is the same as the type of image used to generate the composite. In other embodiments, the type of image used to generate the masks (e.g., luma or luminance) is different from the type of image used to generate the composite.

To generate the composite image using equations (7A) or (7B), the scaling factor of the overexposed image (Eb) is adjusted from the actual ratio of exposure times in some embodiments. Some embodiments use the following equation to adjust the scaling factor of the overexposed image Eb to boost the shadows.

$$Eb=En/(Er+(\tfrac{2}{3}*(Ts-0.25)*(1-Er)*(1-\tan h(12N-3.5)))) \quad (8)$$

In equation (8), Eb is the scaling factor for the overexposed image; En is the scaling factor for the normally exposed image. Er is the ratio of the exposure time of the normally exposed image to the exposure time of the overexposed image (e.g., ¼ if the overexposed image has 4 times as long an exposure as the normally exposed image), Ts is a threshold factor. In some embodiments, Ts is set to 0.4. N is the median luma (on a luma scale from 0 to 1). The median luminance is used for N instead of the median luma in some embodiments.

In some embodiments, once equation (7A) or (7B) has been performed, the calculated composite image is mapped back (e.g., rescaled) to a particular range (e.g., 0-1, or 0-255) by a normalization:

$$Lc[x,y]=Ec*Lc[x,y]/\max(Lc) \quad (9A)$$

In equation (9A), the first Lc[x,y] is the luma of the pixel at coordinates [x,y] in the composite image 1340 after the normalization, the second Lc[x,y] is the luma of the pixel at coordinates [x,y] in the composite image before the normalization, max(Lc) is the maximum luma value of any pixel in the composite image before the normalization and Ec is a scaling factor specifying the range. Some embodiments normalize by the highest possible pixel value, which is 1*Eu. This is done to avoid changing the over brightness of the HDR image compared to EV0.

Some embodiments apply a different normalization factor rather than max(Lc). Equation (9B) provides an alternate equation for normalizing the composite image.

$$Lc[x,y]=Ec*Lc[x,y]/Eu \quad (9B)$$

In equation (9A), the first Lc[x,y] is the luma of the pixel at coordinates [x,y] in the composite image 1340 after the normalization, the second Lc[x,y] is the luma of the pixel at coordinates [x,y] in the composite image before the normalization, En/Eb is an exposure scaling factor for the exposure of the overexposed image (e.g., if the overexposed image has four times the exposure time of the normal exposure, then En/Eb=4) and Ec is a scaling factor specifying the range. In some embodiments, Ec is set to 1, in other embodiments Ec is set to 1.2, in other embodiments Ec is set to other values.

In some embodiments, the capturing operations end after the rescaling of equation (9A) or (9B). In such embodiments, the rendering operations then begin when process 1200 generates (at 1230) a Gaussian blurred composite 1350 version of the composite luma image 1340. The Gaussian blurred composite 1350 is created for a reason similar to the reason for creating the Gaussian blurs of the individual masks. The Gaussian blurred composite 1350 is used as a weight for adjusting other images in other parts of the process 1200 and the blurring enhances the effects (on the final images) of pixels that have very different values from the pixels around them. The Gaussian blur is generated by a similar process to the mask blurring of equations (5) and (6).

$$G[x,y]=\text{filter}(Lc[x,y],k) \tag{10}$$

In equation (10), the G[x,y] represents the Gaussian blurred composite 1350. Lc[x,y] represents the luma of a pixel at (x, y) of the composite image 1340. The filter is a 2D filter operation using filter k. Item k is a 2D Gaussian filter. In some embodiments, a 7×7 or a 9×9 filter is used with a pixel variance of 3. The same filter and kernel are used in some embodiments for blurring the masks in equations (5) and (6) and blurring the Gaussian blurred image in equation (10), in other embodiments, different filters and/or kernels are used.

As with the masks, large values of k can result in large halo effects, but small values of k can result in a loss of contrast within an area. The blurring ensures that the Gaussian blurred composite 1350 will weight based on the brightness of the area a pixel is in, rather than weighting based on the brightness of the individual pixel. In some embodiments, weighting based on the area improves contrast within areas that have pixels from multiple ranges (dark, medium, and/or bright).

Once the Gaussian blurred composite 1350 is generated, the process 1200 generates (at 1240) a highlight-attenuated image 1360A and a shadow-boosted image 1360B. The shadow-boosted image 1360B includes an expanded range of light levels in the dark areas of the image and a compressed range of light levels in the bright areas. In other words, in dark areas, the difference between luma values is expanded in the shadow-boosted image. For example, a pixel in the composite image 1340 with a luma of 0.02 might be converted into a pixel in the shadow-boosted image of 0.14 and a pixel in the composite image 1340 with a luma of 0.03 might be converted into a pixel in the shadow-boosted image of 0.19. In each case, the magnitude of the luma values of the pixels increase, but more significantly, the difference in magnitude of the luma values increases. For pixels in the brighter areas, the magnitude of the luma values for the pixels also increases, but the difference between the magnitudes of the luma values of two pixels decreases. In other words, the shadow boost increases brightness values throughout the range, but in the lower end of the range, the increase between neighboring values is more than in the higher end of the range (i.e., the increase in brightness of dark regions is more than the increase of the brightness of bright regions).

Similarly, the highlight-attenuated image 1360A expands the range of lumas for the brighter pixels and contracts the range of lumas for the darker pixels of composite image 1340. In other words, the highlight attenuation decreases brightness values throughout the range, but in the high end of the range, the decrease between neighboring values is more than in the lower end of the range (i.e., the decrease in brightness of bright regions is more than the decrease of the brightness of dark regions).

In some embodiments, the shadow-boosted image 1360B is generated by the following equation:

$$Ls[x,y]=Lc[x,y]/(Bs*G[x,y]+(1-Bs)) \tag{11}$$

In equation (11), Ls[x,y] is the luma value of the pixel at coordinates [x,y] in the shadow-boosted image 1360B. G[x,y] is the value of the pixel at coordinates [x,y] in the Gaussian blurred composite 1350. Bs is a scaling factor. Bs is equal to 0.83 in some embodiments. In other embodiments, other values are used.

The highlight-attenuated image 1360A is generated by the following equation in some embodiments:

$$Lh[x,y]=1-((1-Lc[x,y])/((1-Bh)*(1-G[x,y])+Bh)) \tag{12}$$

In equation (12), Lh[x,y] is the luma value of the pixel at coordinates [x,y] in the highlight-attenuated image 1360A. G[x,y] is the value of the pixel at coordinates [x,y] in the Gaussian blurred composite 1350. Bs is a scaling factor. In some embodiments, Bs is equal to 0.7. In other embodiments, other values are used for the scaling factor.

The process 1200 composites (at 1250) the shadow-boosted image 1360B and the highlight-attenuated image 1360A to create a composite image 1370. The composite image 1370 of some embodiments is generated using the following equation:

$$Lc[x,y]=(Ls[x,y]*(1-G[x,y]))+(Lh[x,y]*G[x,y]) \tag{13}$$

In equation (13), Lc[x,y] is the luma value of the pixel at coordinates [x,y] in the composite image 1370. Lh[x,y] is the luma value of the pixel at coordinates [x,y] in the highlight-attenuated image 1360A. G[x,y] is the value of the pixel at coordinates [x,y] in the Gaussian blurred composite 1350. Ls[x,y] is the luma value of the pixel at coordinates [x,y] in the shadow-boosted image 1360B. The combination of the shadow-boosted image 1360B and the highlight-attenuated image 1360A, as weighted in equation (13) has the net effect of emphasizing details in both the bright and the dark areas of the image. In some embodiments, as part of compositing the shadow-boosted image 1360B and the highlight-attenuated image 1360A, any pixels that have a luma greater than the top of the allowed range are reduced to the top of the allowed range (e.g., a luma of 1.1 in a range from 0 to 1 would be dropped to a luma of 1).

Some embodiments stop boosting and attenuating luma values at this point and move on to operation 1260. However, in some embodiments, compositing the images 1360A and 1360B also includes a boost of the midtone pixels. Some such embodiments implement the following equation to boost the midtones:

$$Lc[x,y]=Lc[x,y]^{(2^{((Bm*G[x,y]*(1-G[x,y]))^2)}} \tag{14}$$

In equation (14), the first Lc[x,y] is the luma of the pixel at coordinates [x,y] in the composite image 1370 after the boost of the midtone pixels. The second Lc[x,y] is the luma of the pixel at coordinates [x,y] in the composite image before the boost of the midtone pixels. G[x,y] is the value of the pixel at coordinates [x,y] in the Gaussian blurred composite 1350. Bm is a scaling factor that determines the boost curve. Some embodiments use other equations to boost the midtones. As mentioned above, some embodiments don't boost the midtones.

In some embodiments that generate a composite luminance image 1340 (e.g., using equation (7B)) rather than a composite luma image 1340 (e.g., using equation (7A)), the shadow-boosted image 1360B, the highlight-attenuated image 1360A, and the composite image 1370 is a luminance image rather than a luma image. That is, the images 1360A and 1360B and 1370 are all luminance images because they are generated (directly or indirectly) from a luminance image 1340 rather than a luma image 1340. In some such embodiments, luminance image 1370 is converted to luma image 1370 by a gamma correction (e.g., raising the luminance values of the image 1370 to the power of gamma). The mobile device of some embodiments provides the gamma value used to convert luminance image 1370 to luma image 1370. The gamma value is 1/2.2 in some embodiments.

The various compositing processes can lead to images with luma values clustered in one small area of the available range of values. For example, the image may have pixels that are almost all darker than 50% of the available scale or have pixels that are almost all brighter than 50% of the available scale. To increase the range of luma values in the image to take advantage of the available scale, the process 1200 of some embodiments applies (at 1260) a histogram stretching on the luma version of composite image 1370 to return it to the approximate luma distribution of the original normally exposed luma image 1320B. The histogram stretching generates a histogram of the lumas of the composite image 1370 and determines the range of luma between the 0.5th percentile and the 99.5th percentile for image 1370. The process then makes the same determinations for the pixels of the normally exposed luma image 1320B. The process then applies the following equation to the pixels of the composite image 1370:

$$Lf[x,y]=(Lc[x,y]-L1)*((H2-L2)/(H1-L1))+L2 \quad (15)$$

In equation (15), Lf[x,y] is the luma of the pixel at coordinates [x,y] in the final composite image 1380. The Lc[x,y] is the luma of the pixel at coordinates [x,y] in the composite image 1370. L1 is a luma value that is dimmer than 99.5% of the pixels in the composite image 1370. H1 is a luma value that is brighter than 99.5% of the pixels in the composite image 1370. L2 is a luma value that is dimmer than 99.5% of the pixels in the normally exposed luma image 1320B. H2 is a luma value that is brighter than 99.5% of the pixels in the normally exposed luma image 1320B. In some embodiments, the percentiles may be different.

This histogram stretching gives the picture the same overall lighting range as the normally exposed luma image 1320B. The reason for the percentile cutoffs is to prevent any pixels with outlying lumas from making an image with too compressed or too broad a range compared to the original normally exposed luma image 1320B. Some embodiments then change the luma values of pixels with luma values above the top of the available range to the top value of the range. Some embodiments change the luma values of pixels with luma values below the bottom of the available range to the bottom value of the range.

Some embodiments broaden the luma values to an arbitrary range (e.g., full available range) in order to take advantage of the full range of available lumas. For example, some embodiments broaden the luma to the full range when the original normally exposed luma image 1320B has a narrow range of lumas. After the histogram stretching, the process 1200 then ends.

The above description of the histogram stretching describes embodiments that apply the histogram to a luma composite image 1370. However, in some embodiments, the histogram stretching is applied to the luminance composite image 1370 and the gamma correction is applied to a luminance version of final composite image 1380 to produce a luma version of composite image 1380.

C. Compositing Chroma Channel Images

Figure 14:
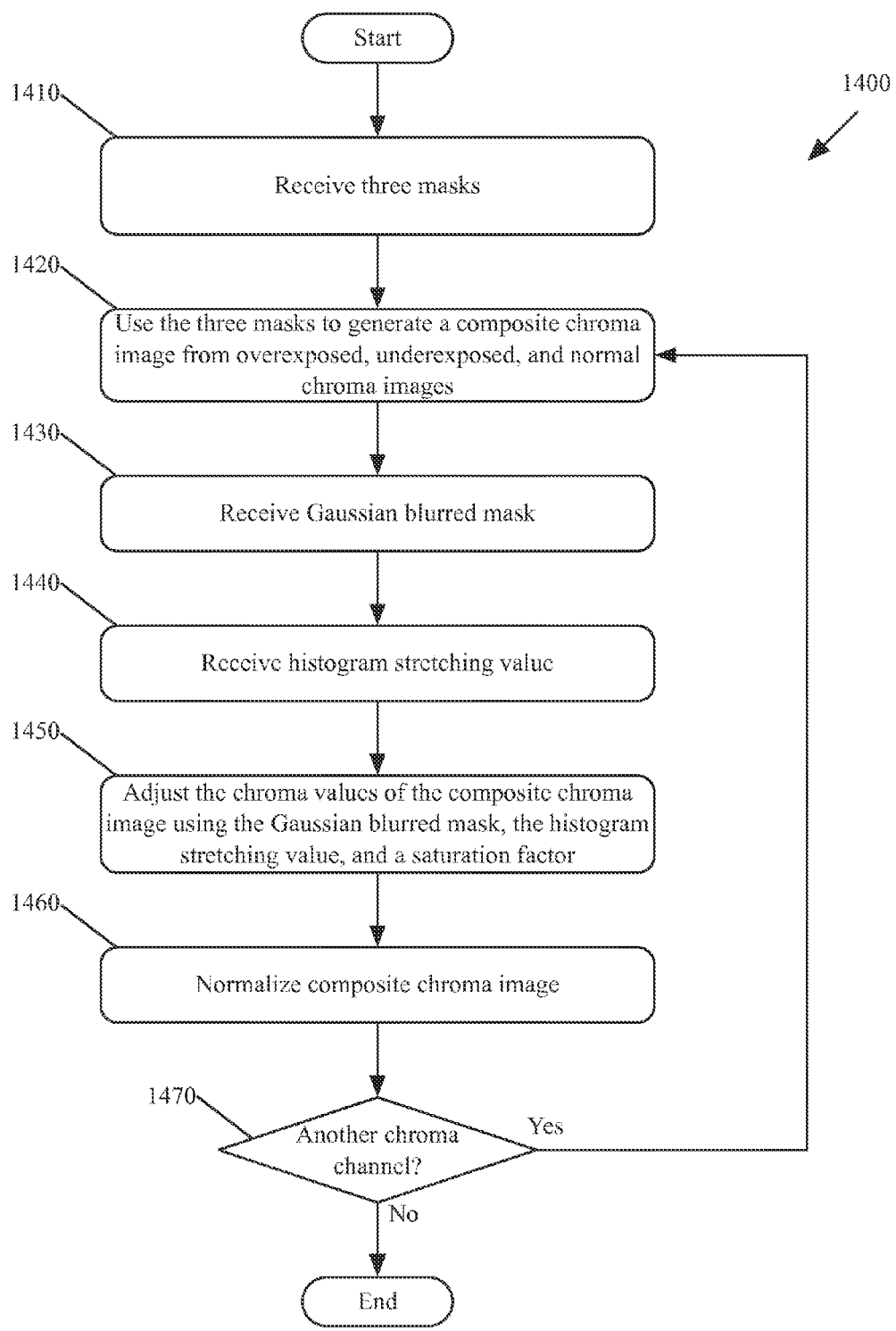
FIG. 14 illustrates a process of some embodiments for compositing chroma channel images.
Figure 15:
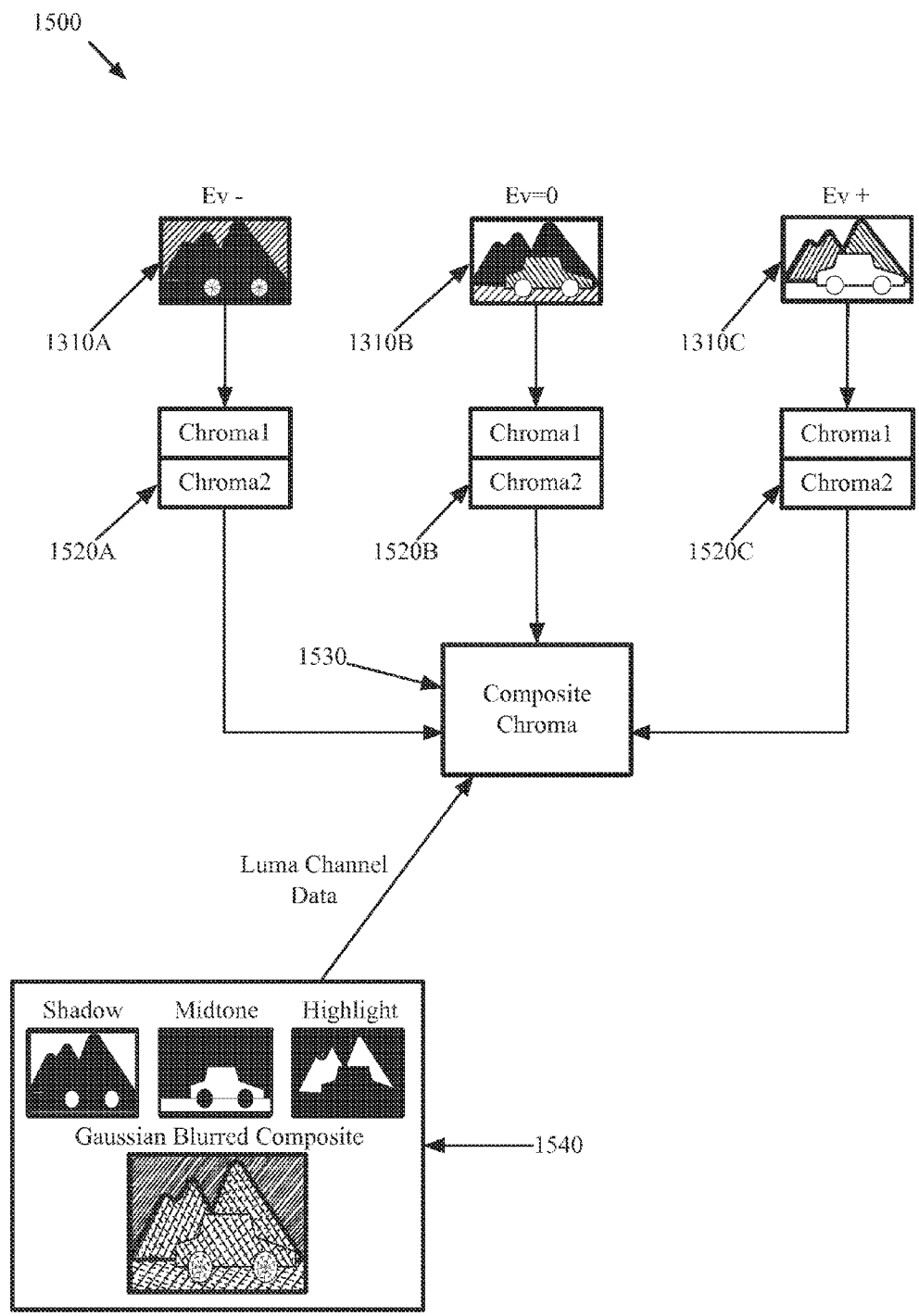
FIG. 15 illustrates an example of compositing chroma channel images in some embodiments.

Images in a luma, blue-chroma, red-chroma (Y'CbCr) format or luminance, blue-chroma, red-chroma (YCbCr) format have chrominance components (Cb & Cr) that carry color information. Process 1200 composites the luma (or luminance) components of images in those formats, but some embodiments composite the chrominance channel images of the images 1310A-1310C separately from the compositing of the luma components. In some embodiments, the same masks that are used in compositing the luma images are used in compositing the chrominance images. FIG. 14 illustrates the process 1400 of some embodiments for compositing chroma channel images. FIG. 14 will be described in relation to FIG. 15. FIG. 15 illustrates an example of compositing chroma channel images in some embodiments. FIG. 15 includes underexposed chroma channel images 1520A, normally exposed chroma channel images 1520B, overexposed chroma channel images 1520C, composite chroma channel image 1530, and imported data 1540 from luma compositing. Underexposed chroma channel images 1520A include chroma values (e.g., Cr and Cb) from image 1310A. Normally exposed chroma channel images 1520B include chroma values (e.g., Cr and Cb) from image 1310B. Overexposed chroma channel images 1520C include chroma values (e.g., Cr and Cb) from image 1310C. In some embodiments, each set of chroma channel images (Cb and Cr) has the same operations performed on it. The composite chroma image 1530 of some embodiments also includes two channels of chroma data. One of ordinary skill in the art will understand that in some such embodiments, the compositing process is performed separately on each chroma channel. However, for clarity, the description, below, of the chroma compositing process sometimes refers to "pixels of the composite image", rather than "pixels of one channel of the composite image".

The process 1400 begins by receiving (at 1410) overexposure, underexposure and normal exposure masks (e.g., the masks generated during the luma compositing process 1200). In FIG. 15, the imported data 1540 includes these masks. In some embodiments, such masks are generated separately for the process 1400, rather than being copies of the masks in the luma compositing process. Different masks are used for the chroma compositing than the luma compositing in some embodiments. For example, in some embodiments, the masks for the chroma compositing are generated from the final luma composite image. Some embodiments generate one set of masks from the normally exposed luma image and another set of masks from the individual luma images and use each set for compositing a different type of image component (e.g., one for luma and the other for chroma).

After the masks are received (or generated), the process 1400 generates (at 1420) one chroma channel of a composite image from the masks (e.g., masks 1330A-1330C) and one channel (i.e., either the Cb or Cr) of the chroma images 1520A-1520C. In some embodiments, the channel of the chroma images 1520A-1520C are composited using the following equation:

$$Cc[x, y] = Eb*Cb[x, y]*Mb[x, y] + \\ En*Cn[x, y]*Mn[x, y] + Eu*Cu[x, y]*Mu[x, y] \quad (16)$$

In equation (16), Cc[x,y] is the chroma value of the pixel at coordinates [x,y] in the composite chroma channel image 1530 (of FIG. 15). Cb[x,y] is the chroma value of the pixel at coordinates [x,y] in the overexposed (bright) chroma channel image 1520C. Cn[x,y] and Cu[x,y] are the chroma values for the normal chroma channel image 1520B and underexposed chroma channel image 1520A, respectively. Eb is an exposure scaling factor for the exposure of the overexposed chroma channel image 1520C. En and Eu are the exposure scaling factors for the normal chroma channel image 1520B and underexposed chroma channel image 1520A, respectively. Mb[x,y] represents the value of the overexposure mask 1330C at coordinates [x,y]. Mn[x,y] and Mu[x,y] represent the values for the normal exposure mask 1330B and underexposure mask 1330A, respectively. The value of a pixel in the mask 1330C determines how much effect the corresponding pixel in the overexposed chroma channel image 1520C has on the composite chroma. The value of a pixel in the mask 1330B determines how much effect the corresponding pixel in the normal chroma channel image 1520B has on the composite chroma. The value of a pixel in the mask 1330A determines how much effect the corresponding pixel in the underexposed chroma channel image 1520A has on the composite chroma. In each mask 1330A-1330C higher values mean more effect. By using the same masks as the luma images, the chroma adjustment ensures that the color data of each pixel in the chroma channel images 1520A-1520C will match the corresponding luma data for each pixel in the luma images. For example, a particular pixel that gets 62% of its luma value from the corresponding pixel in the overexposed luma image 1320C will also get 62% of its chroma values from the corresponding pixel of the overexposed chroma channel images 1520C.

The process 1400 receives (at 1430) a Gaussian blurred mask. In some embodiments this is a copy of the same Gaussian blurred composite 1350 generated from the luma composite image 1340. One of ordinary skill in the art will understand that the Gaussian blurred composite 1350 can also be received at an earlier or later point in process 1400. The process 1400 receives (at 1440) a histogram stretching value (e.g., (H2−L2)/(H1−L1), as seen in equation (15)). This value is calculated independently in some embodiments during process 1400 rather than stored during process 1200 and received during process 1400.

The process 1400 then uses the Gaussian blurred composite 1350 and the histogram stretching value to adjust (at 1450) the composite chroma. This adjustment also involves multiplying the composite chroma image by a saturation factor in some embodiments. Some embodiments provide a pre-programmed saturation factor. A user adjustable saturation factor is provided in addition to or instead of the pre-programmed saturation factor in some embodiments. In still other embodiments the chroma image adjustment is determined by equations (17)-(19):

$$F[x,y]=1+(H2-L2)/(H1-L1)*X*G[x,y]*(1-G[x,y])) \quad (17)$$

The saturation factor, F[x,y], in equation (17) is used in some embodiments to adjust the chroma of a pixel at coordinates [x,y] as shown in equation (19), below. L1 is a luma value that is dimmer than 99.5% of the pixels in the composite image 1370 (of FIG. 13A or FIG. 13B). H1 is a luma value that is brighter than 99.5% of the pixels in the composite image 1370. L2 is a luma value that is dimmer than 99.5% of the pixels in the normally exposed luma image 1320B. H2 is a luma value that is brighter than 99.5% of the pixels in the normally exposed luma image 1320B. X is a saturation factor (e.g., 1.2) that is different in different embodiments and can be changed (e.g., by the user or the mobile device) in some embodiments. In some embodiments, the percentiles used to calculate the histogram stretching factor may be different than those shown above. G[x,y] is the value of the pixel at coordinates [x,y] in the Gaussian blurred composite 1350. The factor G*(1−G) is maximized when G=0.5 and minimized when G=1 or G=0. Accordingly, using the Gaussian blurred composite 1350 in this way boosts the chroma values of those parts of the image that have midtone lumas more than the chroma values of those parts of the image that have bright or dark pixels. Boosting the colors of the midtone pixels provides a different final image than uniformly boosting the color.

In some embodiments, the composite chroma is normalized (at 1460) by dividing the chroma values by a normalization factor generated using the following equation:

$$N[x,y]=(Eb*Mb[x,y])+(En*Mn[x,y])+(Eu*Mu[x,y]) \quad (18)$$

The normalization factor, N[x,y], in equation (18) is used in some embodiments to adjust the chroma of a pixel at coordinates [x,y] as shown in equation (19). Eb is an exposure scaling factor for the overexposed chroma channel image 1520C. En and Eu are the exposure scaling factors for the normal chroma channel image 1520B and underexposed chroma channel image 1520A, respectively. Mb[x,y] represents the value of the overexposure mask 1330C at coordinates [x,y]. Mn[x,y] and Mu[x,y] represent the values of the normal exposure mask 1330B and underexposure mask 1330A, respectively.

Accordingly, in some embodiments, the final composite chroma channel image 1530 is determined by the following equation:

$$Cf[x,y]=Cc[x,y]*F[x,y]/N[x,y] \quad (19)$$

In equation (19), Cf[x,y] is the chroma value of the pixel at coordinates [x,y] in the composite chroma channel image 1530 (after saturation). N[x,y] is a normalization factor (e.g., the normalization factor from equation (18)) used to divide the chroma values of the composite chroma image. Cc[x,y] is the chroma value of the pixel at coordinates [x,y] in the composite chroma channel image 1530. F[x,y] is a saturation factor (e.g., the saturation factor from equation (17)) used to multiply the chroma of a pixel at coordinates [x,y]. In embodiments that make these adjustments, the adjustments produce the final composite chroma channel image 1530. One of ordinary skill in the art will understand that some embodiments that use equation (19) calculate F[x,y] or N[x,y] using different equations from equations (17) and (18).

The process 1400 then determines (at 1470) whether there is another chroma channel image to composite. If there is another chroma channel to composite (e.g., if the process 1400 has finished compositing the Cb chroma image, but not the Cr chroma image, then it will adjust the Cr chroma image), the process 1400 returns to operation 1420 to apply the masks to the new chroma channel images. In some embodiments, the individual operations are performed in turn on each chroma channel image rather than performing operations 1420-1460 on one chroma channel image and then performing 1420-1460 on the other chroma channel image. The process 1400 is performed on all chroma channels in some embodiments.

While the above chroma related equations describe the compositing of chroma components of images that have the same resolution as the corresponding luma (or luminance) components of the images, one of ordinary skill in the art will understand that in some embodiments, the chroma components of the images have a different resolution than the luma (or luminance) components of the images. In some such embodiments, the masks are adjusted to account for the differences in the resolution. For example, some embodiments employ a 4:2:2 format with each pixel in the chroma component of the image corresponding to two horizontally adjacent pixels in the luma/luminance component of the image. Because the masks of some embodiments have the same resolution as the luma/luminance components of the image, each pixel in a chroma component of the image corresponds to two horizontally adjacent pixels in the corresponding mask. In some such embodiments, the value of a chroma pixel of an image is weighted by the average value of the corresponding pair of horizontally adjacent pixels in the corresponding mask. In other such embodiments, the value of a chroma pixel is weighted by the value of one or the other of the corresponding pair of horizontally adjacent pixels in the mask (e.g., the value of the leftmost pixel of the pair). Similarly, some embodiments use a 4:2:0 format, in which each chroma pixel corresponds to a two-by-two square of pixels in the luma/luminance component (and in the masks). In some such embodiments, the value of a chroma pixel is weighted by the average value of the corresponding four pixels in the mask. In other such embodiments, the value of a chroma pixel is weighted by the value of one of the four corresponding pixels in the mask (e.g., the value of the upper-left pixel of the four). Alternatively, in some embodiments, the compositing of the chroma components is performed at the resolution of the mask, generating a composite chroma component with the same resolution as the composite luma/luminance component. In some such embodiments, the composite chroma component is converted back to the resolution of the original chroma component at some point.

The compositing module of some embodiments joins the final luma image 1380 (of FIG. 13A or FIG. 13B) and each channel of the final composite chroma channel image 1530 (of FIG. 15) to produce a final HDR image. Alternatively, the compositing module in some embodiments converts the final luma image 1380 and the final composite chroma channel image 1530 to an RGB format (e.g., sRGB) to produce a final HDR image.

D. Adjusting for Exposure Conditions

The mobile devices of some embodiments automatically adjust the exposure time of the normally exposed images to account for the local lighting conditions at the time that the mobile device is taking images. In some embodiments, the exposure time is the time between refreshes of the CMOS sensor of the camera. The mobile device compensates for lower lighting conditions by increasing the exposure time of the normal duration exposure. In some such embodiments, the mobile device also has an upper limit on the duration of an exposure. The exposure duration for the overexposed image in some embodiments is a multiple of the normal exposure duration (e.g., four times the normal exposure duration). In low light conditions, the increased duration of the normal exposure and the default multiplier for the exposure time of the overexposed image may result in an exposure time for the overexposed image that is longer than the upper limit allowed by the mobile device. To adjust for these conditions, some embodiments use an exposure multiplier for the overexposed image that is lower than the default value (e.g., a multiplier of 2 rather than the default multiplier of 4). The compositing processes of some embodiments increase the scaling factor Eb accordingly.

In some cases, the light is so dim that the normal exposure duration is at or near the upper limit of allowed exposure times. In such cases, the overexposure duration is forced to be no longer than the same length (or almost the same length) as the normal exposure duration. The mobile device of some embodiments takes the overexposed image for the same amount of time (or for almost the same amount of time) as the normally exposed image and performs the compositing anyway. One of ordinary skill in the art will understand that in cases where the normally exposed image and the overexposed image are taken with the same exposure duration the images could be referred to as two normally exposed images rather than as a normally exposed image and an overexposed image.

In cases where the normal exposure duration is the maximum allowed exposure of the mobile device, some embodiments composite two normally exposed images taken with the same exposure duration in order to reduce noise levels in the final image. In cases where the normal exposure duration is near the maximum allowed exposure of the mobile device, the overexposed image is taken with an exposure duration which is only slightly longer than the exposure duration of the normally exposed image. Because of the low ratio of exposure durations, the overexposed image in such a case does not increase the dynamic range as much as it ordinarily would. However, some embodiments composite the overexposed image and the normally exposed image for the small increase in dynamic range and/or to reduce noise levels in the final image.

In embodiments that limit the exposure duration, the scaling factor Eb is increased in accord with the changed ratio of exposure times when the overexposure duration is capped. In some of the same or other embodiments, the mobile device uses a flash while taking the overexposed image and does not use the flash while taking the normally exposed image in order to compensate for the lack of a longer exposure time for the overexposed image. In some embodiments, the flash is used when the normal exposure duration is within some particular threshold of the maximum exposure duration. For example, in some embodiments, the flash is used when the normal exposure duration is more than 50% of the maximum exposure duration. In other embodiments, other percentages are used as the threshold. In some embodiments, when the normal exposure duration is above the threshold, the overexposure duration is set to the maximum exposure duration (e.g., a lower multiple of the normal exposure duration than would be used in brighter lighting conditions) and the flash is used for the overexposed duration, but not the normal duration or the underexposed duration. In some embodiments, in cases where the flash is used, the mobile device captures and composites the overexposed and normally exposed images, but does not capture an underexposed image and/or does not composite an underexposed image with the other two images.

The mobile devices of some embodiments have a lower limit on the length of an exposure. In such embodiments, in bright light conditions, the default multiplier for the exposure time of the underexposed image may result in an exposure time shorter than the lower limit that the mobile device allows. In some such embodiments, the underexposed image uses an exposure multiplier higher than it otherwise would (e.g., an exposure multiplier of ½ rather than a default exposure multiplier of ¼). In some cases, the light is so bright that the normal exposure time is at the lower limit of allowed exposure times. In such cases, the underexposure is taken for the same amount of time as the normally exposed image (resulting in two normally exposed images) and used in the compositing in order to reduce noise levels in the final image. In some such embodiments, the scaling factor Eu is decreased in accord with the changed ratio of exposure times.

While the description of many of the embodiments described herein referred to taking and compositing three images (e.g., an underexposed image, a normally exposed image, and an overexposed image), one of ordinary skill in the art will understand that in other embodiments other numbers of images can be taken and/or composited. For example, some embodiments composite two images (e.g., an underexposed image and a normally exposed image) instead of three images.

Furthermore, some embodiments take different numbers of images depending on the lighting conditions. For example, some such embodiments composite three images when the mobile device is capturing images of a scene with both dark areas and light areas and composite two images when the mobile device is capturing images with little or no dark areas or little or no bright areas. When a scene has little or no dark areas, some such embodiments composite a normally exposed image and an underexposed image. When a scene has little or no bright areas, some such embodiments composite a normally exposed image and an underexposed image. Some such embodiments use a histogram of one or more images (e.g., a preview image) to determine whether a scene has little or no bright areas or little or no dark areas. Some embodiments that composite two images when either bright or dark areas are small or absent still use three images when both bright and dark areas are small or absent (i.e., a scene that is predominantly midtones). Alternatively, rather than excluding types of images based on qualities of the individual areas of a scene to be captured, some embodiments exclude the overexposed image when capturing scenes that are above a certain total light level and some embodiments exclude the underexposed image when capturing scenes that are below a certain total light level.

While the above descriptions included the term "image" or "images" for many sets of data (e.g., Gaussian blurred image, shadow-boosted image, overexposed image, etc.), one of ordinary skill in the art will understand that in some embodiments, the data in these "images" is not displayed in a visual form in the normal course of practicing the embodiment. In such embodiments, the data in the "images" is used to manipulate and adjust other data that ultimately is displayed in visual form. Some embodiments display only the final product, the HDR image. However, other embodiments display one or more of the other images as well as the final HDR image.

The embodiments that combine one flash illuminated image with one or more non-flash illuminated images allow the device's HDR image capture mode to operate in conjunction with the device's flash mode. Other embodiments, however, only allow the device to operate in either the flash mode or the HDR mode. Accordingly, when the automatic flash mode is enabled, these embodiments disable the HDR image capture mode.

E. Image Formats

Many of the embodiments described above are described in terms of one or more image formats. One of ordinary skill in the art will understand that different embodiments provide and manipulate images in different formats. In some embodiments, color images are provided as three channels of information, such as a luma channel and two chroma channels. One color format used for this type of information is the Y'CbCr (luma, blue-chroma, and red-chroma) color format. The camera function of the mobile device of some embodiments automatically provides the images in a Y'CbCr format. Light sensors (e.g., a charge coupled device) of the mobile device measure the intensity of light that reaches each sensor and generate a luminance value (Y) proportional to the intensity. The mobile device generates the Y' component of the image by taking luminance data received from light sensors of the camera and applying a gamma correction to the luminance data (e.g. mathematically raising the luminance value to some power such as 1/2.2).

In the Y'CbCr format, the luma (Y') channel carries the brightness information of the image; the Cb (sometimes written in outside references as $C_B$) channel carries the information on how much the blue values of the image differ from the luma (Y') value; and the Cr (sometimes written in outside references as $C_R$) channel carries the information on how much the red values of the image differ from the luma (Y') value. Effectively, the luma channel (Y') provides a black & white (and grey) image and the chroma channels (Cb and Cr) add color to the image. In some embodiments, the scale of the Y'CbCr values can be changed arbitrarily. For the calculations described herein, the luma (Y') is scaled to a maximum of 1 and a minimum of 0 for the calculations and the chroma (Cb & Cr) are scaled from −0.5 to 0.5. However, other scales are possible within the scope of some embodiments. For example, luma (Y') is scaled from 0 to 255 in some embodiments. Other embodiments scale luma from 16 to 235 and scale chroma from 16 to 240. Other color formats, such as YUV, etc. are used in some embodiments.

Some mobile devices capture images in the YCbCr color format directly and then convert the images to RGB images (e.g., standard RGB) or to Y'CbCr images. In some embodiments, the operations described above are performed on the images as captured in Y'CbCr format (with any necessary rescaling from the scale of the mobile device). In other embodiments, the operations are performed on images initially received in an RGB format and converted to Y'CbCr. The operations and mathematical equations below assume a Y'CbCr color format, however other embodiments use other color formats (e.g., YUV, etc.). In some embodiments with other color formats, the operations and equations are adjusted accordingly. Similarly, some embodiments use luminance values rather than luma values when generating the decimated images and the bitmaps used to align the images as described above.

While the processes and equations described above are described in terms of specific image formats, one of ordinary skill in the art will understand that the processes and equations can be used on other image formats in some embodiments. For example, in some places, the above description refers to luma data and in some places it refers to luminance data. However, unless otherwise specified, the equations and processes described herein as applying to luma values in some embodiments are applied to luminance values in other embodiments and vice-versa. One of ordinary skill in the art will understand that luma and luminance are only two examples of formats for image intensity data and that the described processes and equations described herein in relation to luminance and luma can be applied in some embodiments to other formats that store intensity information. For example, some embodiments perform the above described operations on the red, blue, and green components of images in an RGB format, an sRGB format, an R'G'B' format (i.e., a gamma corrected RGB format), or other formats that do not provide intensity data and color data as separate components. Some embodiments that perform such operations on red, blue, and green components convert between gamma corrected and non-gamma corrected formats using the same operations described above or similar operations.

Similarly, the equations and processes described herein as applying to chroma data can be applied in some embodiments to other formats that store color data separately from intensity data. Furthermore, although the description above points out some specific parts of processes at which conversion from one format to another (e.g., luma to luminance or RGB to luma) can take place, one of ordinary skill in the art will understand that conversion from one image format to another can take place at any stage or stages of the processes in some embodiments.

VI. Mobile Device

Figure 16:
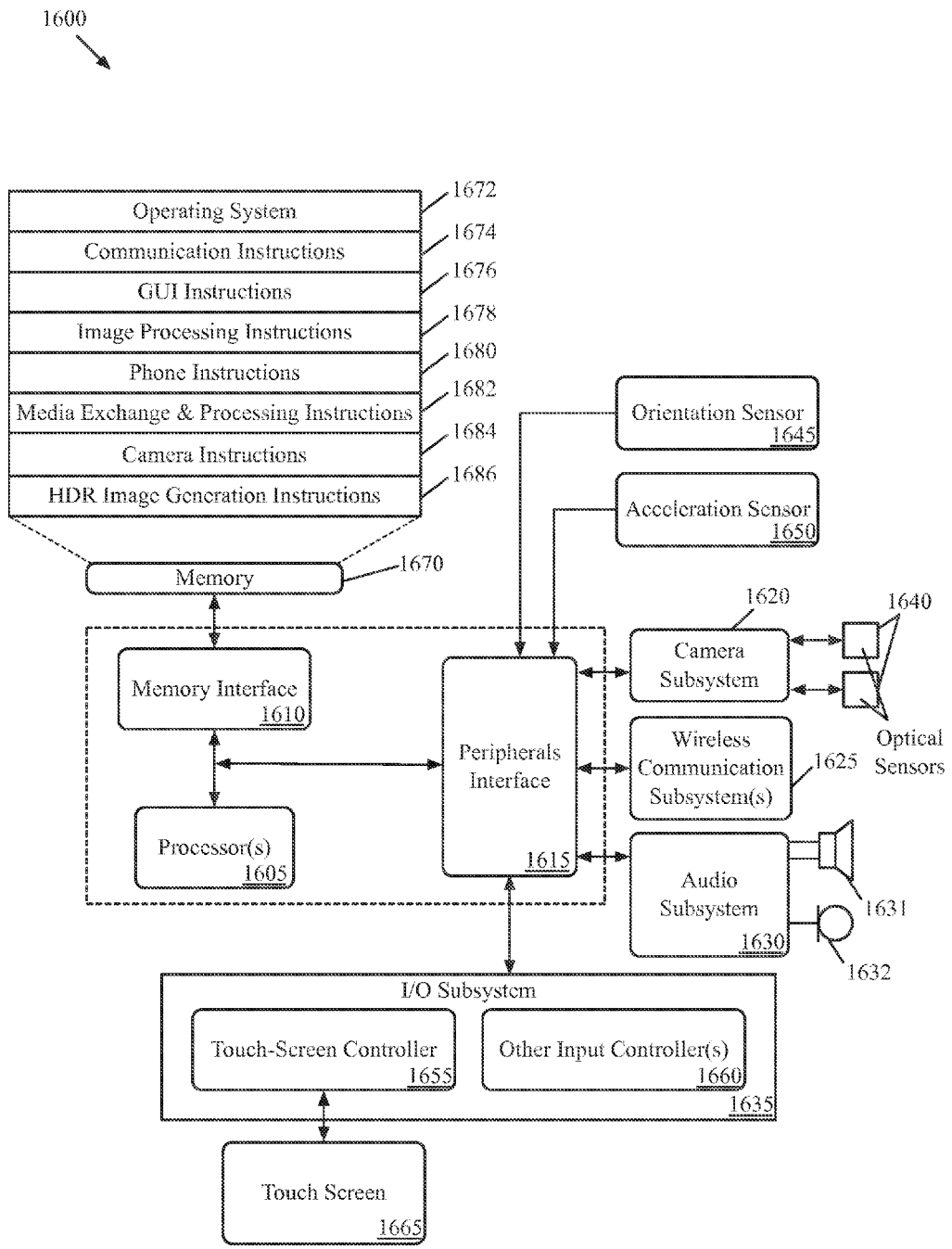
FIG. 16 is an example of a mobile computing device 1600 of some embodiments.

FIG. 16 is an example of a mobile computing device 1600 of some embodiments. The implementation of a mobile computing device includes one or more processing units 1605, memory interface 1610 and a peripherals interface 1615. Each of these components that make up the computing device architecture can be separate components or integrated in one or more integrated circuits. These various components can also be coupled together by one or more communication buses or signal lines.

The peripherals interface 1615 couple to various sensors and subsystems, including a camera subsystem 1620, a wireless communication subsystem(s) 1625, audio subsystem 1630, I/O subsystem 1635, etc. The peripherals interface 1615 enables communication between processors and peripherals. Peripherals such as an orientation sensor 1645 or an acceleration sensor 1650 can be coupled to the peripherals interface 1615 to facilitate the orientation and acceleration functions.

The camera subsystem 1620 can be coupled to one or more optical sensors 1640 (e.g., a charged coupled device (CCD) optical sensor, a complementary metal-oxide-semiconductor (capture modules) optical sensor) for one or more cameras of the device. In some embodiments, the device has just one camera, while in other embodiments the device has more than one (e.g., two) cameras. In some embodiments, the device has cameras on multiple sides of the device (e.g., a camera on the front side of the device and a camera on the back side of the device). The camera subsystem 1620 coupled with the sensors may facilitate camera functions, such as image and/or video data capturing. Wireless communication subsystems 1625 may serve to facilitate communication functions. Wireless communication subsystems 1625 may include radio frequency receivers and transmitters, and optical receivers and transmitters. They may be implemented to operate over one or more communication networks such as a GSM network, a Wi-Fi network, Bluetooth network, etc. The audio subsystems 1630 is coupled to a speaker 1631 and a microphone 1632 to facilitate voice-enabled functions, such as voice recognition, digital recording, etc.

I/O subsystem 1635 involves the transfer between input/output peripheral devices, such as a display, a touch screen, etc., and the data bus of the CPU through the peripherals interface 1615. I/O subsystem 1635 can include a touch-screen controller 1655 and other input controllers 1660 to facilitate these functions. Touch-screen controller 1655 can be coupled to the touch screen 1665 and detect contact and movement on the screen using any of multiple touch sensitivity technologies. Other input controllers 1660 can be coupled to other input/control devices, such as one or more buttons.

Memory interface 1610 can be coupled to memory 1670, which can include high-speed random access memory and/or non-volatile memory such as flash memory. Memory can store an operating system (OS) 1672. The OS 1672 can include instructions for handling basic system services and for performing hardware dependent tasks.

Memory can also include communication instructions 1674 to facilitate communicating with one or more additional devices; graphical user interface instructions 1676 to facilitate graphical user interface processing; image processing instructions 1678 to facilitate image related processing and functions; phone instructions 1680 to facilitate phone-related processes and functions; media exchange and processing instructions 1682 to facilitate media communication and processing-related processes and functions; camera instructions 1684 to facilitate camera-related processes and functions; and HDR image generation instructions 1686 to facilitate in the HDR generation processes and functions. The above identified instructions need not be implemented as separate software programs or modules. Various functions of mobile computing device can be implemented in hardware and/or in software, including in one or more signal processing and/or application specific integrated circuits.

Figure 17:
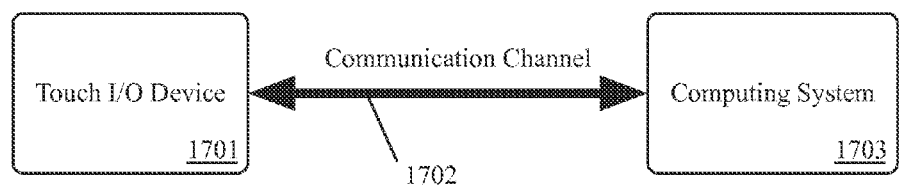
FIG. 17 illustrates a touch I/O device.

FIG. 17 illustrates a touch I/O device. The above-described embodiments may include the touch I/O device 1701 that can receive touch input for interacting with computing system 1703, as shown in FIG. 17, via wired or wireless communication channel 1702. Touch I/O device 1701 may be used to provide user input to computing system 1703 in lieu of or in combination with other input devices such as a keyboard, mouse, etc. One or more touch I/O devices 1701 may be used for providing user input to computing system 1703. Touch I/O device 1701 may be an integral part of computing system 1703 (e.g., touch screen on a laptop) or may be separate from computing system 1703.

Touch I/O device 1701 may include a touch sensitive panel which is wholly or partially transparent, semitransparent, non-transparent, opaque or any combination thereof. Touch I/O device 1701 may be embodied as a touch screen, touch pad, a touch screen functioning as a touch pad (e.g., a touch screen replacing the touchpad of a laptop), a touch screen or touchpad combined or incorporated with any other input device (e.g., a touch screen or touchpad disposed on a keyboard) or any multi-dimensional object having a touch sensitive surface for receiving touch input.

In one example, touch I/O device 1701 embodied as a touch screen may include a transparent and/or semitransparent touch sensitive panel partially or wholly positioned over at least a portion of a display. According to this embodiment, touch I/O device 1701 functions to display graphical data transmitted from computing system 1703 (and/or another source) and also functions to receive user input. In other embodiments, touch I/O device 1701 may be embodied as an integrated touch screen where touch sensitive components/devices are integral with display components/devices. In still other embodiments a touch screen may be used as a supplemental or additional display screen for displaying supplemental or the same graphical data as a primary display and receiving touch input.

Touch I/O device 1701 may be configured to detect the location of one or more touches or near touches on device 1701 based on capacitive, resistive, optical, acoustic, inductive, mechanical, chemical measurements, or any phenomena that can be measured with respect to the occurrences of the one or more touches or near touches in proximity to device 1701. Software, hardware, firmware or any combination thereof may be used to process the measurements of the detected touches to identify and track one or more gestures. A gesture may correspond to stationary or non-stationary, single or multiple, touches or near touches on touch I/O device 1701. A gesture may be performed by moving one or more fingers or other objects in a particular manner on touch I/O device 1701 such as tapping, pressing, rocking, scrubbing, twisting, changing orientation, pressing with varying pressure and the like at essentially the same time, contiguously, or consecutively. A gesture may be characterized by, but is not limited to a pinching, sliding, swiping, rotating, flexing, dragging, or tapping motion between or with any other finger or fingers. A single gesture may be performed with one or more hands, by one or more users, or any combination thereof Computing system 1703 may drive a display with graphical data to display a graphical user interface (GUI). The GUI may be configured to receive touch input via touch I/O device 1701. Embodied as a touch screen, touch I/O device 1701 may display the GUI. Alternatively, the GUI may be displayed on a display separate from touch I/O device 1701. The GUI may include graphical elements displayed at particular locations within the interface. Graphical elements may include but are not limited to a variety of displayed virtual input devices including virtual scroll wheels, a virtual keyboard, virtual knobs, virtual buttons, any virtual UI, and the like. A user may perform gestures at one or more particular locations on touch I/O device 1701 which may be associated with the graphical elements of the GUI. In other embodiments, the user may perform gestures at one or more locations that are independent of the locations of graphical elements of the GUI. Gestures performed on touch I/O device 1701 may directly or indirectly manipulate, control, modify, move, actuate, initiate or generally affect graphical elements such as cursors, icons, media files, lists, text, all or portions of images, or the like within the GUI. For instance, in the case of a touch screen, a user may directly interact with a graphical element by performing a gesture over the graphical element on the touch screen. Alternatively, a touch pad generally provides indirect interaction. Gestures may also affect non-displayed GUI elements (e.g., causing user interfaces to appear) or may affect other actions within computing system 1703 (e.g., affect a state or mode of a GUI, application, or operating system). Gestures may or may not be performed on touch I/O device 1701 in conjunction with a displayed cursor. For instance, in the case in which gestures are performed on a touchpad, a cursor (or pointer) may be displayed on a display screen or touch screen and the cursor may be controlled via touch input on the touchpad to interact with graphical objects on the display screen. In other embodiments in which gestures are performed directly on a touch screen, a user may interact directly with objects on the touch screen, with or without a cursor or pointer being displayed on the touch screen.

Feedback may be provided to the user via communication channel 1702 in response to or based on the touch or near touches on touch I/O device 1701. Feedback may be transmitted optically, mechanically, electrically, olfactory, acoustically, or the like or any combination thereof and in a variable or non-variable manner.

These functions described above can be implemented in digital electronic circuitry, in computer software, firmware or hardware. The techniques can be implemented using one or more computer program products. Programmable processors and computers can be included in or packaged as mobile devices. The processes and logic flows may be performed by one or more programmable processors and by one or more programmable logic circuitry. General and special purpose computing devices and storage devices can be interconnected through communication networks.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," "machine readable medium," or "machine readable media" are entirely restricted to tangible, physical objects that store information in a form that is readable by a computer, computing device, or other electronic device with one or more processing units. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. For instance, while several embodiments are described above for mobile devices, one of ordinary skill in the art will realize that the device in other embodiments might be a non-mobile device such as a desktop computer.

In addition, a number of the figures (including FIGS. 4, 6, 7, 9, 10, 12, and 14) conceptually illustrate processes. The specific operations of these processes may not be performed in the exact order shown and described. The specific operations may not be performed in one continuous series of operations, and different operations may be performed in different embodiments. Furthermore, the process could be implemented using several sub-processes, or as part of a larger macro process. Also, operations that appear sequentially may be performed in an interlaced manner. Thus, one of ordinary skill in the art would understand that the invention is not to be limited by the foregoing illustrative details, but rather is to be defined by the appended claims.

What is claimed is:

1. A non-transitory machine readable medium of a device that captures images, the medium storing a program that when executed by at least one processing unit captures an image of a high dynamic range (HDR) scene, the program comprising sets of instructions for:

capturing a plurality of images of the HDR scene at different exposure levels, wherein the different exposure levels are selected based at least in part upon detected lighting conditions within the HDR scene, including:

capturing and storing, prior to receiving a command to capture the HDR scene, at least one image at a first exposure level;

detecting the lighting conditions within the HDR scene based on an analysis of at least one of the at least one image captured and stored; and capturing, upon receiving a command to capture the HDR scene, at least a first image at a second exposure level selected based at least in part upon the detected lighting conditions within the HDR scene; and compositing the plurality of images to produce a composite image of the HDR scene.

2. The machine readable medium of claim 1, wherein the sets of instructions for capturing a plurality of images of the HDR scene at different exposure levels comprises sets of instructions for:
capturing and storing, upon the device entering an HDR mode, a first plurality of images at the first exposure level; and
capturing, upon receiving the command to capture the HDR scene, at least one image at one or more different exposure levels, wherein the one or more different exposure levels are selected based at least in part upon the detected lighting conditions within the HDR scene.

3. The machine readable medium of claim 2, wherein the program further comprises sets of instructions for:
computing the first exposure level based on the detected lighting conditions within the HDR scene; and
computing the one or more different exposure levels based on the first exposure level.

4. The machine readable medium of claim 2, wherein the set of instructions for capturing and storing, upon the device entering the HDR mode, the first plurality of images at the first exposure level comprises a set of instructions for analyzing at least one of the first plurality of images to detect the lighting conditions within the HDR scene.

5. The machine readable medium of claim 2, wherein:
capturing at least one image at one or more different exposure levels comprises:
capturing at least the first image at the second exposure level when the device is determined to be operating in a first set of lighting conditions, where the determination is based at least in part upon analyzing at least one image of the captured first plurality of images; and
capturing at least a second image at the same first exposure level when the device is determined to be operating in low light conditions, where the determination is based at least in part upon analyzing at least one image of the captured first plurality of images; and
compositing the plurality of images to produce a composite image of the HDR scene comprises:
compositing at least the first image and a third image from the captured first plurality of images, when the device is determined to be operating in the first set of lighting conditions, in order to produce a first composite HDR image; and
compositing at least the second image and the third image when the device is determined to be operating in low light conditions in order to produce a second composite HDR image with reduced noise.

6. The machine readable medium of claim 1, wherein the sets of instructions for compositing the plurality of images to produce a composite image of the HDR scene comprises sets of instructions for:
compositing at least one particular image selected from a plurality of images captured at a particular exposure level of the different exposure levels.

7. The machine readable medium of claim 6, wherein the set of instructions for selecting the particular image from the plurality of images comprises a set of instructions for selecting a sharpest image of the plurality of images.

8. A method of operating a device to capture an image of a high dynamic range (HDR) scene, the method comprising:
capturing a plurality of images of the HDR scene at a plurality of selected exposure levels, wherein the exposure levels are selected based at least in part upon detected lighting conditions within the HDR scene, including:
capturing and storing, prior to receiving a command to capture the HDR scene, at least one image at a first exposure level;
detecting the lighting conditions within the HDR scene based on an analysis of at least one of the at least one image captured and stored; and
capturing, upon receiving a command to capture the HDR scene, at least a first image at a second exposure level selected based at least in part upon the detected lighting conditions within the HDR scene; and
compositing the plurality of images to produce a composite image of the HDR scene.

9. The method of claim 8, wherein capturing a plurality of images of the HDR scene at different exposure levels comprises:
capturing and storing, upon the device entering an HDR mode, a first plurality of images at the first exposure level; and
capturing, upon receiving a command to capture the HDR scene, at least one image at one or more different exposure levels, wherein the one or more different exposure levels are selected based at least in part upon the detected lighting conditions within the HDR scene.

10. The method of claim 9, comprising:
computing the first exposure level based on the detected lighting conditions within the HDR scene; and
computing the one or more different exposure levels based on the first exposure level.

11. The method of claim 9, wherein capturing and storing, upon the device entering an HDR mode, the first plurality of images at the first exposure level comprises analyzing at least one of the first plurality of images to detect the lighting conditions within the HDR scene.

12. The method of claim 9, wherein:
capturing at least one image at one or more different exposure levels comprises:
capturing at least the first image at the second exposure level when the device is determined to be operating in a first set of lighting conditions, where the determination is based at least in part upon analyzing at least one image of the captured first plurality of images; and
capturing at least a second image at the same first exposure level when the device is determined to be operating in low light conditions, where the determination is based at least in part upon analyzing at least one image of the captured first plurality of images; and
compositing the plurality of images to produce a composite image of the HDR scene comprises:
compositing at least the first image and a third image from the captured first plurality of images, when the device is determined to be operating in the first set of lighting conditions, in order to produce a first composite HDR image; and
compositing at least the second image and the third image when the device is determined to be operating in low light conditions in order to produce a second composite HDR image with reduced noise.

13. The method of claim 8, wherein the sets of instructions for compositing the plurality of images to produce a composite image of the HDR scene comprises sets of instructions for:
compositing at least one particular image selected from a particular plurality of images captured at a particular exposure level of the different exposure levels.

14. The method of claim 13, wherein selecting the particular image from the particular plurality of images comprises selecting a sharpest image of the particular plurality of images.

15. A mobile device that captures images, the device comprising:
   a camera configured to capture a plurality of images of a scene at different image exposure durations, wherein the different image exposure durations are selected based at least in part upon detected lighting conditions of the scene, including the camera configured to:
      capture and store, prior to receiving a command to capture the HDR scene, at least one image at a first exposure duration;
      detect the lighting conditions within the HDR scene based on an analysis of at least one of the at least one image captured and stored; and
      capture, upon receiving a command to capture the HDR scene, at least a first image at a second exposure duration selected based at least in part upon the detected lighting conditions within the HDR scene; and
   an image processing module configured to composite the plurality of captured images to generate a composite image of the scene.

16. The mobile device of claim 15, wherein to capture a plurality of images of a scene at different image exposure durations, the camera is configured to:
   capture, upon the mobile device entering an HDR mode, a plurality of images at the first exposure duration; and
   capture, upon receiving a command to capture the scene, at least one image at one or more different exposure durations, wherein the one or more different exposure durations are selected based at least in part upon the detected lighting conditions of the scene.

17. The mobile device of claim 16, comprising an image capture module configured to:
   compute the first exposure duration based on the detected lighting conditions of the scene; and
   compute the one or more different exposure durations based on the first exposure level.

18. The mobile device of claim 17, wherein, to compute the first exposure duration based on the detected lighting conditions within the scene, the image capture module is configured to analyze at least one of the plurality of images to detect the lighting conditions of the scene.

19. The mobile device of claim 15, wherein to composite the plurality of captured images to generate a composite image of the scene, the image processing module is configured to:
   composite at least one particular image selected from a particular plurality of images captured at a particular exposure duration of the one or more different exposure durations.

20. The mobile device of claim 19, wherein, to composite at least one particular image selected from a particular plurality of images captured at a particular exposure duration, the image processing module is configured to select a sharpest image of the particular plurality of images.

* * * * *